United States Patent
Ueda et al.

(10) Patent No.: US 6,828,041 B2
(45) Date of Patent: Dec. 7, 2004

(54) ROLLING APPARATUS

(75) Inventors: Koji Ueda, Fujisawa (JP); Hideyuki Uyama, Fujisawa (JP); Tsuyoshi Saito, Chigasaki (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/069,076

(22) PCT Filed: Jul. 18, 2001

(86) PCT No.: PCT/JP01/06232

§ 371 (c)(1),
(2), (4) Date: Feb. 21, 2002

(87) PCT Pub. No.: WO02/08623

PCT Pub. Date: Jan. 31, 2002

(65) Prior Publication Data

US 2002/0191878 A1 Dec. 19, 2002

(30) Foreign Application Priority Data

| Jul. 18, 2000 | (JP) | 2000-217285 |
| Jul. 31, 2000 | (JP) | 2000-230183 |
| Jul. 31, 2000 | (JP) | 2000-230184 |
| Oct. 13, 2000 | (JP) | 2000-312757 |
| Nov. 2, 2000 | (JP) | 2000-336390 |
| Nov. 24, 2000 | (JP) | 2000-357514 |
| Feb. 20, 2001 | (JP) | 2001-042901 |
| Mar. 19, 2001 | (JP) | 2001-077833 |
| May 16, 2001 | (JP) | 2001-146044 |
| Jun. 14, 2001 | (JP) | 2001-180507 |

(51) Int. Cl.[7] .................. B32B 15/00; B32B 15/04; F16C 19/00; F16C 23/00; F16C 33/58

(52) U.S. Cl. .............. 428/660; 428/627; 428/632; 428/687; 428/336; 384/206; 384/492; 384/564; 384/527; 384/23

(58) Field of Search ............... 428/408, 660, 428/627, 632, 609, 687, 213, 336, 704, 457; 384/206, 492, 564, 527, 565, 569, 572, 625, 23; 148/906

(56) References Cited

U.S. PATENT DOCUMENTS

| 4,848,934 A | * | 7/1989 | Blakely et al. ........... 384/206 |
| 5,154,401 A | * | 10/1992 | Schramm et al. ......... 254/416 |
| 6,250,812 B1 | * | 6/2001 | Ueda et al. ............... 384/492 |
| 6,391,128 B2 | * | 5/2002 | Ueda et al. ............... 148/669 |
| 2001/0036328 A1 | * | 11/2001 | Yamamoto et al. ....... 384/462 |
| 2002/0073547 A1 | * | 6/2002 | Sasaki et al. ......... 29/898.061 |

FOREIGN PATENT DOCUMENTS

| JP | 5014641 U | | 2/1993 |
| JP | 07103247 | | 4/1995 |
| JP | 11153140 | | 6/1999 |
| JP | 11-153140 | * | 6/1999 |
| JP | 11223221 | | 8/1999 |
| JP | 11247863 | | 9/1999 |
| JP | 2000035043 | | 2/2000 |
| JP | 2000-035043 | * | 2/2000 |

* cited by examiner

*Primary Examiner*—Michael La Villa

(57) ABSTRACT

The bearing rings 1 and 2 of a rolling bearing is formed of one kind of titanium alloys of β type titanium alloys, near β type titanium alloys and α+β type titanium alloys. The titanium alloy has a surface hardness of Hv 400 or more and less than Hv 600 for increasing the corrosion resistance and wear resistance of the bearing ring. Spherical rolling elements 3 rolling on the raceway surfaces 1a and 2a of the bearing rings 1 and 2 are formed of ceramics such as silicon nitride. When β type titanium alloys or α+β type titanium alloys after a solution treatment and applied with an oxidation treatment at a low temperature of 400 to 600° C. are used as the material for the bearing ring, a bearing ring made of titanium alloy suitable to use under a circumstance requiring corrosion resistance is obtained.

28 Claims, 23 Drawing Sheets

F I G. 14
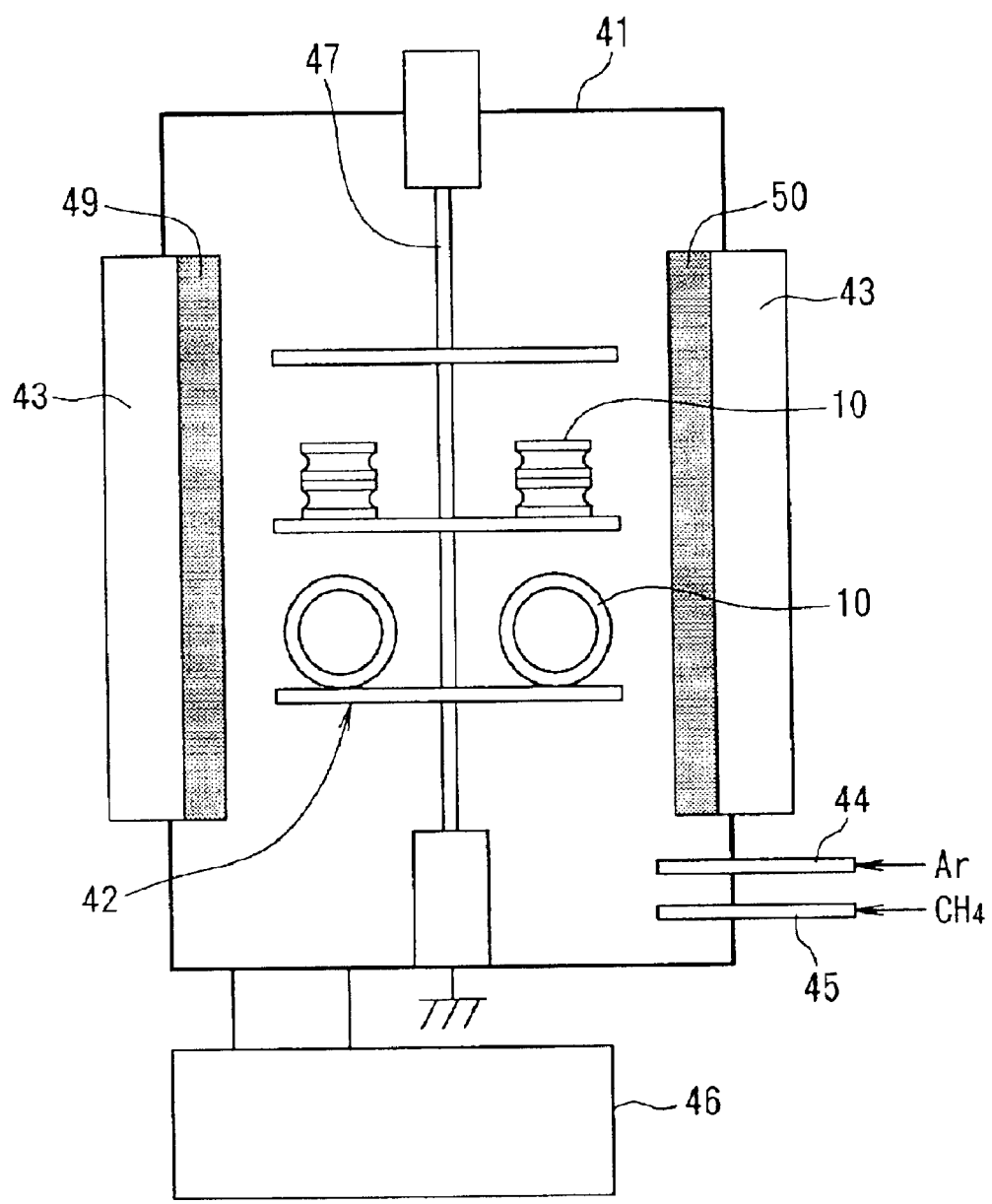

Exhaustion

Number of rotation: 50rpm
Load: 4 N
Repetition for 150,000 cycles

75: secondary electron beam

ROLLING APPARATUS

TECHNICAL FIELD

This invention concerns a rolling device such as a rolling bearing, a ball screw and a linear guide and, more in particular, it relates to a rolling device suitable to use, for example, in semiconductor production apparatus, chemical fiber production machines, liquid crystal panel production apparatus, and equipments using electron beams or X-rays.

BACKGROUND ART

In rolling bearings such as ball bearings, bearing rings and rolling elements thereof are generally formed of iron and steel materials such as high carbon chromium bearing steels and case hardening steels and rolling bearings are used in various working circumstances. Accordingly, in machines that use water or sea water such as food machines or chemical fiber production machines, since rust is formed on the surfaces of bearing rings and rolling elements due to water or sea water intruding into the inside of bearings making them no more usable, rolling bearings in which bearing rings or rolling elements are formed of austenitic stainless steels such as SUS 440C are mainly used.

While such rolling bearings have good corrosion resistance to water or sea water, corrosion resistance to chemicals, for example, acidic solutions such as sulfuric acid or alkaline solutions can not be said favorable. In view of the above, rolling bearings in which bearing rings are formed of titanium alloys have often been used in machines that use chemicals, for example, acidic solutions such as sulfuric acid or alkaline solutions, for example, semiconductor production apparatus and liquid crystal panel production apparatus. However, titanium alloys lack in the surface hardness when merely applied with usual solution treatment or aging treatment and can not be used as they are as the material for the bearing ring of the rolling bearing. Accordingly, when titanium alloy is used as the material for the bearing ring of the rolling bearing, it is necessary to increase the surface hardness of the titanium alloy by some or other methods.

As a method of increasing the surface hardness of the titanium alloys, a method of increasing the surface hardness of β-titanium alloy to the surface hardness of Hv 600 or more is disclosed in Japanese Published Unexamined Patent Application No. Hei 11-22221. However, according to the method disclosed in this publication, α-phase has to be precipitated in excess in the β type titanium alloy and since the α-phase is poor in the corrosion resistance compared with the β-phase, the corrosion resistance is sometimes insufficient depending on the working circumstance. Further, in the method disclosed in this publication, it is necessary to apply shot peening after cold working to result in a problem of increasing the cost by the increase in the number of steps such as cold working or shot peening.

Further, in equipments used in semiconductor production steps, for example, an electron beam lithography system or a wafer inspection apparatus, laser beams have been used so far as a means for writing circuit patterns on a wafer but along with the micro-miniaturization of the circuit patterns, electron beams having shorter wavelength and higher resolution power than the laser beams have been used in recent years. In the electron beam lithography system or the wafer inspection equipment using the electron beams, the electron beams are deflected easily when disturbance is present in peripheral magnetic fields to sometimes lower the writing accuracy or inspection accuracy. Accordingly, in a case of using rolling bearings to such apparatus, it requires such a rolling bearing that does not disturb the peripheral magnetic fields by the rotation of the bearing ring and, in order to satisfy such a demand, use of non-magnetic stainless steel or beryllium copper as the material for the bearing ring of the rolling bearing has been investigated.

However, since the permeability of the non-magnetic stainless steel is about 1.04 to 1.002, when the non-magnetic stainless steel is used as the material for the bearing ring of the rolling bearing, it has a possibility of causing disturbance in the peripheral magnetic fields when the bearing ring is magnetized even slightly. On the other hand, beryllium copper has a permeability of 1.001 or less and has less possibility of causing disturbance in the peripheral magnetic fields as in the non-magnetic stainless steel. However, since a portion of elements or compounds thereof constituting beryllium copper is considered as environmental load substances, its use may sometimes suffer from restriction. Further, since it is expected that the environmental problem will be considered more important in the future, use of beryllium copper itself may possibly be limited. Further, since beryllium copper has a highest hardness of about Hv 400, it involves a problem of tending to cause early wear during use under large load.

OBJECT OF THE INVENTION

A first object of the present invention is to provide a rolling device that can be used favorably over an extended period of time even in a highly corrosive circumstance.

A second object of the present invention is to provide a rolling device suitable to use in machines that use strongly acidic solutions such as sulfuric acid or strongly alkaline solutions.

A third object of the present invention is to provide a rolling device that can be used favorably over an extended period of time also in a circumstance where non-magnetic property is required.

A fourth object of the present invention is to provide a rolling device suitable to use in equipments using electron beams or X-rays such as a wafer inspection apparatus or nuclear magnetic resonance diagnostic apparatus.

A fifth object of the present invention is to provide a rolling device that can be used favorably over an extended period of time also in a circumstance where a lubricant such as grease can not be used.

SUMMARY OF THE INVENTION

A rolling device according to this invention comprises an outer member and an inner member each having a raceway surface and rolling elements rolling on the raceway surface by rotational or linear movement of the outer member or the inner member in which the outer member and/or the inner member is constituted with at least one kind of titanium alloys of β type titanium alloys, near β type titanium alloys and α+β type titanium alloys.

In a preferred embodiment of the present invention, the titanium alloy has a surface hardness of Hv 400 or more and less than Hv 600. Further, the titanium alloy has a core hardness of Hv 420 or more, preferably, Hv 450 or more and has an oxygen compound layer on the surface in which the oxygen compound layer comprises a titanium oxide containing rutile type $TiO_2$ and has a thickness of 20 nm or more and, preferably, 50 nm or more.

In a preferred embodiment of the present invention, the rolling element is constituted with at least one kind of materials of titanium alloys, silicon nitride, silicon carbide, zirconia series ceramics, alumina series ceramics and SIALON series ceramics.

In another preferred embodiment of the present invention, the rolling device further comprises a cage for holding the rolling elements and the cage has a heat conductivity of 20 W/(m·K) or more. Further, the cage is constituted, preferably, with one kind of materials of copper, tellurium copper, brass, aluminum bronze, phosphorus bronze, nickel silver, cupro nickel and beryllium copper.

In a further preferred embodiment of the present invention, at least one of the outer member, the inner member and the rolling elements is constituted with a titanium alloy and the titanium alloy has a ω phase with the size of the crystal particles of 1 μm or less, preferably, 800 nm or less and, further preferably, 10 nm or less.

In a further preferred embodiment of the present invention, the outer member and/or the inner member has a hard film on the raceway surface. The hard film is constituted with at least one kind of materials of TiN, TiC, TiCN, TiAlN, CrN, SiC and diamond-like carbon, and the raceway surface formed with the hard film has a surface hardness of Hv 350 or more and, preferably, Hv 450 or more. Further, the outer member and/or the inner member has a lubricating film of 0.1 μm to 10 μm and, preferably, 0.1 μm to 5 μm on the hard film.

In a further preferred embodiment of the present invention, the rolling element is constituted with a superhard alloy and or cermet and has a heat conductivity of 35 W/(m·K) or more, preferably, 50 W/(m·K) or more.

In a further preferred embodiment of the present invention, the rolling element is constituted with an iron and steel material and has the surface hardening layer having corrosion resistance on the surface and the surface hardening layer is formed by applying a chromium diffusion penetration treatment or a nitridation treatment to the surface of a base material constituting the rolling element.

In a further preferred embodiment of the present invention, the titanium alloy is a titanium alloy satisfying the condition: $3.7 \leq (H/E)$, preferably, $4.0 \leq (H/E)$ and, further preferably, $(H/E) \leq 4.5$ where E (Gpa) represents the Young's modulus and H (Hv) represents the minimum hardness for the portion from the raceway surface to a depth corresponding to $2/100$ to $5/100$ for the diameter of the rolling element.

In a further preferred embodiment of the present invention, the ratio $\alpha_2/\alpha_1$ between the heat expansion coefficient $\alpha_1$ of the titanium alloy and the heat expansion coefficient $\alpha_2$ of the rolling element is within a range of 0.4 to 1.3.

In a further preferred embodiment of the present invention, a sealed plate for shielding an opening formed between the outer member and the inner member is formed of titanium at a purity of 99.5% or higher and the outer member and the inner member each has an oxide film comprising $TiO_x$ (in which $0<x<2$) on the surface.

The β-type titanium alloy and the α+β type titanium alloy increase the hardness by fine precipitation of the α-phase in the β-phase by applying a solution treatment to the titanium alloy from the vicinity of the temperature at which the α-phase transforms into the β-phase to transform the metal structure substantially into the β-phase and then applying an aging treatment to the titanium alloy. However, when the α-phase is precipitated by the aging treatment, β-stable alloying elements are concentrated in the β-phase along with preparation of the α-phase. Accordingly, local corrosion tends to occur due to the difference of the corrosion resistance between the α-phase and the β-phase along with increase in the precipitation amount of the α-phase. Accordingly, it is necessary that the β-phase in the β-type titanium alloy or the α+β type titanium alloy remains to some extent in order that the alloy can be used suitably also in a highly corrosive circumstance but, since the β-phase is soft compared with the α-phase, the wear resistance is insufficient when the amount of the β-phase is excessive while the corrosion resistance is improved.

The present inventors have made an earnest study on the solution treatment and the aging treatment of the titanium alloy and have found that a titanium alloy which is satisfactory as the material for the bearing ring of a rolling element can be obtained by applying a low temperature oxidation treatment to the titanium alloy after the solution treatment such that the surface hardness of the titanium alloy is Hv 400 or more and less than Hv 600. Then, since the hardness of Hv 400 or more and less than 600 is a hardness comparable with that of the stainless steels such as SUS 630 or YHD50 (trade mark) used so far as the bearing material for the special circumstances, it can be used sufficiently as the material for the bearing element in a circumstance where a large load is not applied by so much.

The surface of a portion of the bearing ring that is in contact with the rolling element has an elliptic shape that is referred to as a contact ellipse and the area is extremely small. Accordingly, when stress is applied to the bearing ring, an extremely large surface pressure exerts on the contact ellipse. When the bearing ring of the rolling bearing is formed of a titanium alloy (Young's modulus: about 100 Gpa) and the rolling element is formed of a stainless steel (Young's modulus: about 200 Gpa), this means that the bearing ring deforms more greatly than the rolling element and the area of the contact ellipse in contact with the rolling element increase. In view of calculation, the area of the contact ellipse of a bearing ring made of titanium alloy is larger than that of the bearing ring made of a stainless steel and the maximum contact surface pressure at the contact ellipse of the bearing ring made of titanium alloy is about 0.8 times that of the bearing ring made of stainless steel. Accordingly, since the contact area with the rolling element is larger in the bearing ring made of the titanium alloy than in the bearing ring made of the stainless steel, the contact pressure surface is lowered and the rolling fatigue is moderated preferably.

However, when the surface hardness of the bearing ring made of the titanium alloy is less than Hv 400, wear tends to be caused abruptly even when the surface pressure is low. Further, indentations are tend to be caused upon intrusion of obstacles such as dusts to shorten the life of the rolling bearing. Accordingly, it is necessary for the bearing ring made of the titanium alloy that the surface hardness is Hv 400 or more and the surface hardness of the bearing ring made of the titanium alloy is more preferably Hv 450 or more when higher wear resistance is required. Further, when corrosion resistance or wear resistance is further required, the titanium alloy can be provided with higher hardness and corrosion resistance by surface hardening heat treatment such as a nitridation treatment or an oxidation treatment.

The permeability of a titanium alloy is 1.001 or less and the value is nearly equal with that for the substantially complete non-magnetic property. Accordingly, since peripheral magnetic fields suffer from no effects by the rotation of the bearing ring, it can be used favorably to equipments using electron beams or X-rays. However, if the rolling element or the cage is not a non-magnetic body, magnetization thereof causes deterioration of the accuracy in the apparatus described above by magnetization thereof. Accordingly, when a substantially complete non-magnetic property is required for the rolling device, it is necessary that the permeability of the rolling element and the cage should also be 1.001 or less like that in the permeability of the bearing ring made of the titanium alloy.

The material for the rolling element with the magnetic permeability of 1.001 or less can include titanium alloys, as well as ceramics such as silicon nitride, silicon carbide, zirconia series ceramics, alumina series ceramics and SIALON series ceramics or titanium alloys. Further, the material for the cage with the permeability of 1.001 or less can include resins such as polyamide and fluoro resins or non-magnetic metals such as brass and SUS 304.

When the materials are investigated in details, in the cage made of stainless steels typically represented by SUS 304, martensite is formed by strain induced transformation upon pressing. Accordingly, the cage is tended to be magnetized to result in a possibility of increasing the magnetic field fluctuation due to the rotation of the cage. Further, in recent years, specific permeability lower than 1.01 to 1.1 of the non-magnetic stainless steel, specifically, about 1.001 is demanded and the use of the cage made of the non-magnetic stainless steel is sometimes restricted. Accordingly, it is desirable that the rolling element is made of ceramics, while the cage is made of a copper series alloy.

The titanium alloy is a substantially complete non-magnetic body and ceramics are also complete non-magnetic body. On the other hand, the copper alloy is a non-magnetic material with the permeability lower than that of the non-magnetic stainless steel and the specific permeability thereof is 1.001 or less. Accordingly, even when it is used under a magnetic circumstance, since rotation of the cage does not cause fluctuation of magnetic fields, it is suitable as a cage made of metal in a rolling device used under a non-magnetic circumstance.

Further, since the copper alloy has self-lubricity, friction characteristics at the contact surface with the rolling element and at the guiding surface of the bearing ring are improved and the amount of wear is small even under a circumstance where a lubricating oil or grease can not be used or a non-magnetic and vacuum circumstance as in electron beam equipments or semiconductor production apparatus.

Further, since the cage made of the copper alloy has a high heat conductivity and causes no heat accumulation on the sliding guide surface, adhesive wear can be suppressed. Further, the copper alloy has high heat dissipation, can promote heat dissipation along with rotation of the cage and can suppress the temperature elevation of the bearing. On the contrary, in a case where the bearing is made of the titanium alloy and the cage is made of austenitic non-magnetic stainless steel such as SUS 304, since the heat conductivity and the specific heat of SUS 304 are small, temperature locally rises remarkably at a sliding portion between the cage and the bearing ring guide surface tending to cause adhesive wear relative to the bearing ring. Since the heat conductivity of the austenitic non-magnetic stainless steel such as SUS 304 is 16 W/(m·K), it is preferred, for the cage made of the copper alloy to use a cage made of a copper alloy having a heat conductivity of 20 W/(m·K) or more and, more preferably, 35 W/(m·K) or more.

Referring to the kind of the copper alloy, any of copper alloys can be used suitably so long as it has the heat conductivity of 20 W/(m·K) or more, for example, copper alloy castings such as pure copper, tellurium copper, brass, freely cutting brass, high strength brass, and aluminum bronze or stretchable copper alloys such as pure copper, tellurium, phosphorus bronze, nickel silver and cupro nickel or precipitation hardening type beryllium copper. However, since low alloys such as pure copper and tellurium copper have low strength and hardness, it is desirable to use copper alloys excluding them in a case where particular importance is attached to the wear resistance.

It is considered that the surface treatment such as an oxidation treatment or a nitridation treatment should be applied at a high temperature of 600° C. or higher for insuring the thickness of the compound layer and diffusion promotion of intruded elements. However, when the titanium alloy is heated in oxygen or oxygen-containing gas for a predetermined period of time, since titanium has a high affinity with oxygen, an oxygen compound such as $TiO_2$ or $Ti_3O$ is formed on the surface even at a relatively low temperature of 400 to 600° C.

The oxygen compound such as $TiO_2$ formed on the surface of the titanium alloy by the oxidation treatment is a highly chemically stable substance. On the other hand, the surface of the titanium compound tends to become highly reactive by sliding movement with the rolling element or the like, by which adhesive wear tends to be caused so that it is considered to be poor in the wear resistance. However, since the surface is covered with the highly chemically stable compound by applying the oxidation treatment to the titanium alloy, surface activation is suppressed and, as a result, seizure less occurs to improve the sliding property and the wear resistance.

Further, when the thickness of the oxygen compound layer formed on the surface of the titanium alloy by the oxidation treatment is 20 nm or more, the load carrying capacity increases to remarkably improve the effect of the wear resistance and sliding property. However, when the thickness of the oxygen compound layer is less than 20 nm, the effect of improving the wear resistance and the sliding property is small. Accordingly it is desirable that the thickness of the oxygen compound layer is 20 nm or more. Further, for obtaining better wear resistance and sliding property, it is preferred that the thickness of the oxygen compound layer is 50 nm or more.

When the titanium alloy is put to the oxidation treatment at a high temperature of 700° C. or higher, the oxygen compound layer formed on the surface of the titanium alloy mainly comprises rutile type $TiO_2$ and the thickness of the oxygen compound layer also increases. Accordingly, durability to great load is improved, but the surface roughness of the titanium alloy is sometimes deteriorated on the other hand to increase the rotational torque of the bearing.

On the other hand, when the titanium alloy is put to the oxidation treatment at a temperature of 400 to 600° C., the oxygen compound layer formed on the surface of the titanium alloy is in a state where $TiO_x$ oxide such as rutile type $TiO_2$ and $Ti_3O$ ($x: 0<x<2$) and Ti are present together, which is more dense compared with the oxygen compound layer mainly comprising rutile type $TiO_2$. Accordingly, the surface roughness after the oxidation treatment is favorable and, as a result, the rotational torque of the bearing is lowered and detachment of the compound layer or the like is less caused.

FIG. 10A shows a heat treatment step for the solution treatment and the aging treatment conducted generally as a method of hardening the β type titanium alloy and the α+β type titanium alloy. In this heat treatment method, since the titanium alloy tends to be oxidized abruptly, heating is often conducted in a high vacuum atmosphere or in an inert gas atmosphere such as argon.

FIG. 10B shows a gas oxidation treatment at high temperature. In this case, it is often used after the oxidation treatment as it is but, since heating is conducted at a high temperature for a long time without the solution treatment and the aging treatment, the core hardness is lowered to sometimes give undesired effects on the rolling life. Further, as described above, it may be a worry of causing degradation in the surface roughness and brittlement of the compound layer.

FIG. 10C shows a method of an oxidation treatment at a low temperature of 400 to 600° C. for the titanium compound after the solution treatment. Since the temperature for the oxidation treatment of 400 to 600° C. is within a range of the temperature identical to that upon aging treatment after the solution treatment of the β type titanium alloy and the α+β type titanium alloy, it can serve both as the oxidation treatment and the aging treatment. Accordingly, it does not increase the cost due to the increase in the number of steps.

Further, since the hardness is improved to Hv 420 or more by the aging treatment not only for the surface of the titanium alloy but also for the core of the titanium alloy, the rolling life is improved. Further, since the processing temperature is low, thermal deformation is small to give less possibility of deteriorating the dimensional accuracy of the bearing ring. However, when the core hardness is less than Hv 420, since the effect for extending the rolling life of the bearing is small even when it has the oxygen compound layer on the surface, it is desirable that the hardness of the core obtained by the oxidation treatment also serving as the aging treatment is Hv 420 or more. Further, for obtaining a more stable extending effect of the rolling life, it is preferred to increase the core hardness of the titanium alloy to Hv 450 or more.

The oxidation treatment is conducted in a gas atmosphere such as in oxygen or an oxygen-containing gas. For example, it is conducted in atmospheric air, in a 90% $N_2$+10% $O_2$ gas or in a gas in which a predetermined amount of $H_2O$ gas is mixed to an Ar gas. However, the kind of the gas in the oxidation treatment atmosphere is not restricted so long as the oxygen compound layer containing rutile type $TiO_2$ and having a thickness of 20 nm or more can be formed on the surface by applying the oxidation treatment. Further, in order to prevent abrupt oxidation, the oxidation can also be conducted using the gas described above in a state of reducing the pressure in the heating furnace.

As the titanium alloy for which the oxidation treatment is applied, α+β titanium alloy or β type titanium alloy that increases the hardness by the solution treatment and the aging treatment can be used suitably. They include, for example, Ti-6Al-4V, Ti-15V-3Cr-3Sn-3Al, Ti-22V-4Al and Ti-15Mo-5Zr-3Al. There is no restriction on the kind so long as the titanium alloy forms an oxygen compound layer containing rutile type $TiO_2$ and having a thickness of 20 nm or more on the surface with the core hardness being Hv 420 or more by applying the oxidation treatment.

BRIEF EXPLANATION OF THE DRAWINGS

FIG. 14 is a schematic view of an apparatus for forming a hard film on the surface of a bearing ring made of a titanium alloy.

DESCRIPTION OF THE INVENTION

The rolling device according to the present invention is to be explained more specifically with reference to the appended drawings.

Figure 1:
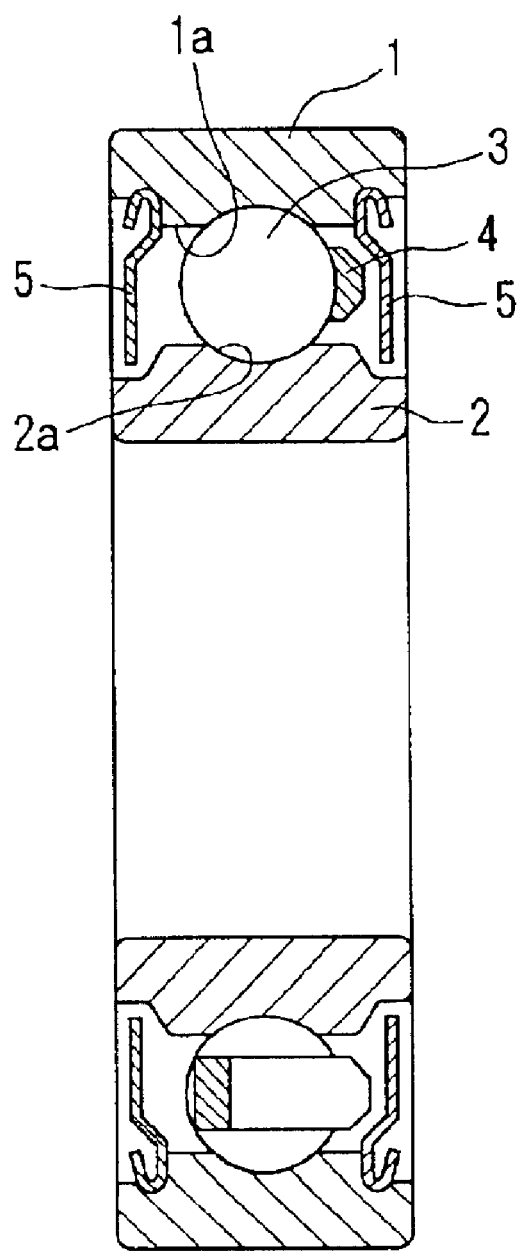
FIG. 1 is a vertical cross sectional view of a rolling bearing according to an embodiment of the present invention.

FIG. 1 is a cross sectional view of a rolling bearing according to an embodiment of the present invention. A rolling bearing shown in FIG. 1 is a ball bearing of bearing No. 6001 (12 mm inner diameter, 28 mm outer diameter and 8 mm width) comprising an outer ring 1, an inner ring 2, rolling elements 3, a cage 4 and seals 5.

The bearing rings 1 and 2 are formed of one kind of titanium compounds of Ti-6Al-4V, Ti-15Mo-5Zr-3Al and Ti-15Mo-5Zr. A spherical rolling element 3 conducts rolling movement on rolling surfaces 1a and 2a during rotation of one of the bearing rings 1 and 2. The rolling element 3 is formed of silicon nitride and the cage 4 holding the rolling element 3 is formed of a fluoro resin.

The bearing rings 1 and 2 made of titanium alloy are machined into a predetermined shape and then applied with a solution treatment and an aging treatment. The rolling surfaces 1a and 2a of the bearing rings 1 and 2 are applied with grinding after applying the solution treatment and the aging treatment. The solution treatment was applied by keeping the titanium alloy at a temperature of 950° C. to 1000° C. in a case where the titanium alloy is Ti-6Al-4V and at a temperature of 800° C. to 850° C. in a case where the titanium alloy is Ti-15Mo-5Zr-3Al or Ti-15Mo-5Zr for one hour and then the titanium alloy was cooled with water for solution treatment.

The aging treatment for the titanium alloy was conducted under the treating conditions at 350° C. to 500° C. for 3 hours to 40 hours. Cooling was conducted usually by air cooling and the cooling rate was retarded by furnace cooling for those titanium alloys which are required to improve the hardness by making the precipitated tissue finer. Further, for those titanium alloys which are required to precipitate the α-phase more uniformly and finely, a two step aging treatment of applying an aging treatment under the conditions at 425° C. for 17 hours at first and then applying an aging treatment under the conditions at 475° C. for 7 hours was adapted.

Corrosion Resistance Test

Test specimens were manufactured with materials for bearing rings shown in Table 1 and the following corrosion resistance test was conducted for each of the manufactured test pieces. That is, each of the test specimens in Table 1 was immersed in a 5N—$H_2SO_4$ sulfuric acid solution at about 25° C., the weight of the test specimens before immersing in the sulfuric acid solution and after immersing for about 24 hours in the sulfuric acid solution were measured and the decrease in the weight with the sulfuric acid solution was evaluated.

TABLE 1

| | No. | Material for bearing ring | Aging condition | Surface hardness (Hv) | corrosion loss in $H_2SO_4$ (g) | Rolling life ratio in salt water |
|---|---|---|---|---|---|---|
| Example | 1 | Ti-6Al-4V | 500° C. × 6 h | 406 | 0.0002 | 2.2 |
| | 2 | Ti-6Al-4V | 450° C. × 20 h (Furnace cooling) | 427 | 0.0002 | 2.5 |
| | 3 | Ti-15Mo-5Zr-3Al | 450° C. × 16 h | 453 | 0.0001 | 2.4 |
| | 4 | Ti-15Mo-5Zr-3Al | 425° C. × 17 h + 475° C. × 7 h (Furnace cooling) | 479 | 0.0001 | 2.9 |
| | 5 | Ti-15Mo-5Zr | 450° C. × 20 h (Furnace cooling) | 552 | 0.0002 | 3.0 |
| | 6 | Ti-15Mo-5Zr | 350° C. × 40 h | 592 | 0.0001 | 3.5 |
| Comp. Example | 1' | Ti-6Al-4V | 500° C. × 3 h | 361 | 0.0002 | 1.0 |
| | 2' | Ti-15Mo-5Zr-3Al | 450° C. × 8 h | 393 | 0.0001 | 1.3 |
| | 3' | Ti-15Mo-5Zr-3Al | Cold cooling + 450° C. × 20 h | 605 | 0.0005 | 3.2 |
| | 4' | Ti-15Mo-5Zr | Cold cooling + 450° C. × 20 h | 615 | 0.0008 | 3.7 |
| | 5' | Ti-15Mo-5Zr | Cold cooling + 350° C. × 40 h | 630 | 0.001 | 3.5 |
| | 6' | SUS440C | — | 670 | 0.5 | 0.9 |
| | 7' | SUS630 | — | 455 | 0.1 | 1.2 |
| | 8' | Beryllium copper | — | 397 | 0.009 | 1.0 |

Rolling Life Test

Figure 2:
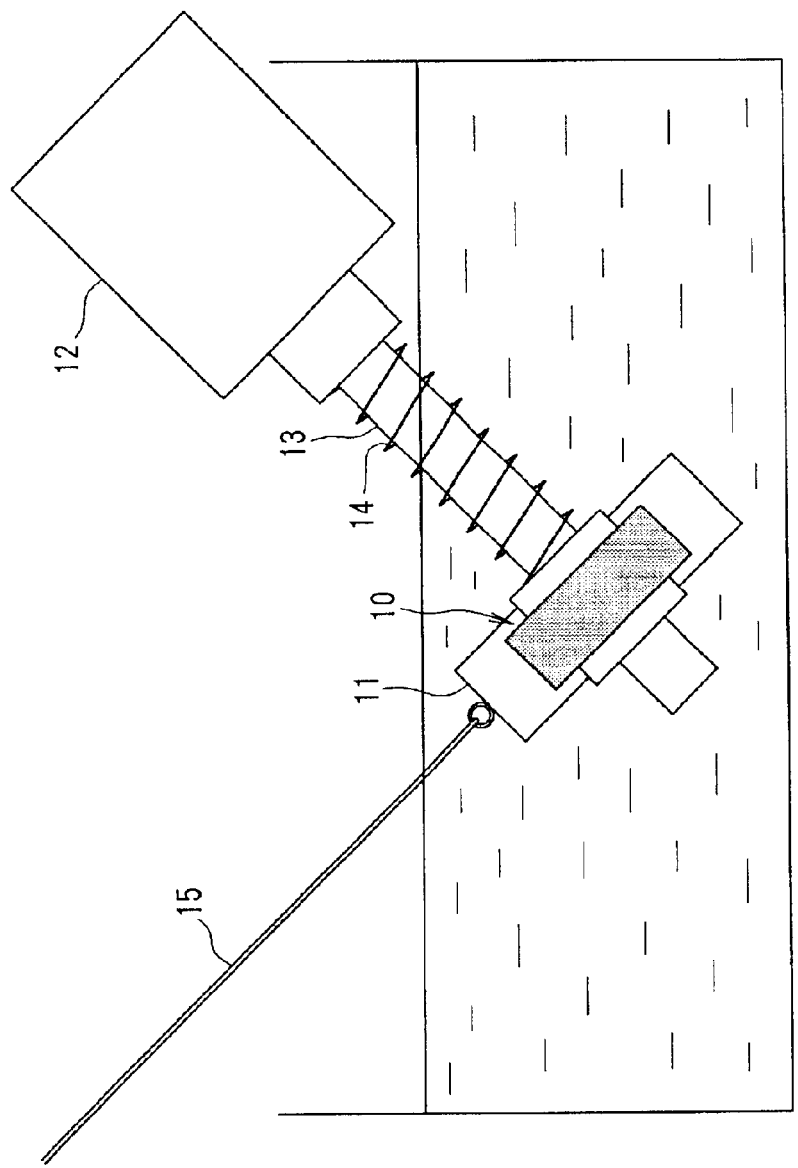
FIG. 2 is a view showing a test apparatus used upon testing of a rolling life of a rolling bearing.

Then, rolling bearings for use in the test were manufactured with the materials shown in Table 1 and the following rolling life test was conducted in an aqueous NaCl solution at 5% by weight concentration for each of the manufactured test bearings. That is, as shown in FIG. 2, after setting a test bearing 10 to a rotational shaft 13 of a tester, an axial load of about 19.6 N and an axial load of about 49 N were loaded by a spring 14 and a wire 15 and, in this state, the rotational shaft 13 was rotated at a speed of about 1000 rpm by a motor 12. Then, after rotating the inner ring of the test bearing by a predetermined number of cycles, the wearing amount on the rolling surface was measured.

Figure 3:
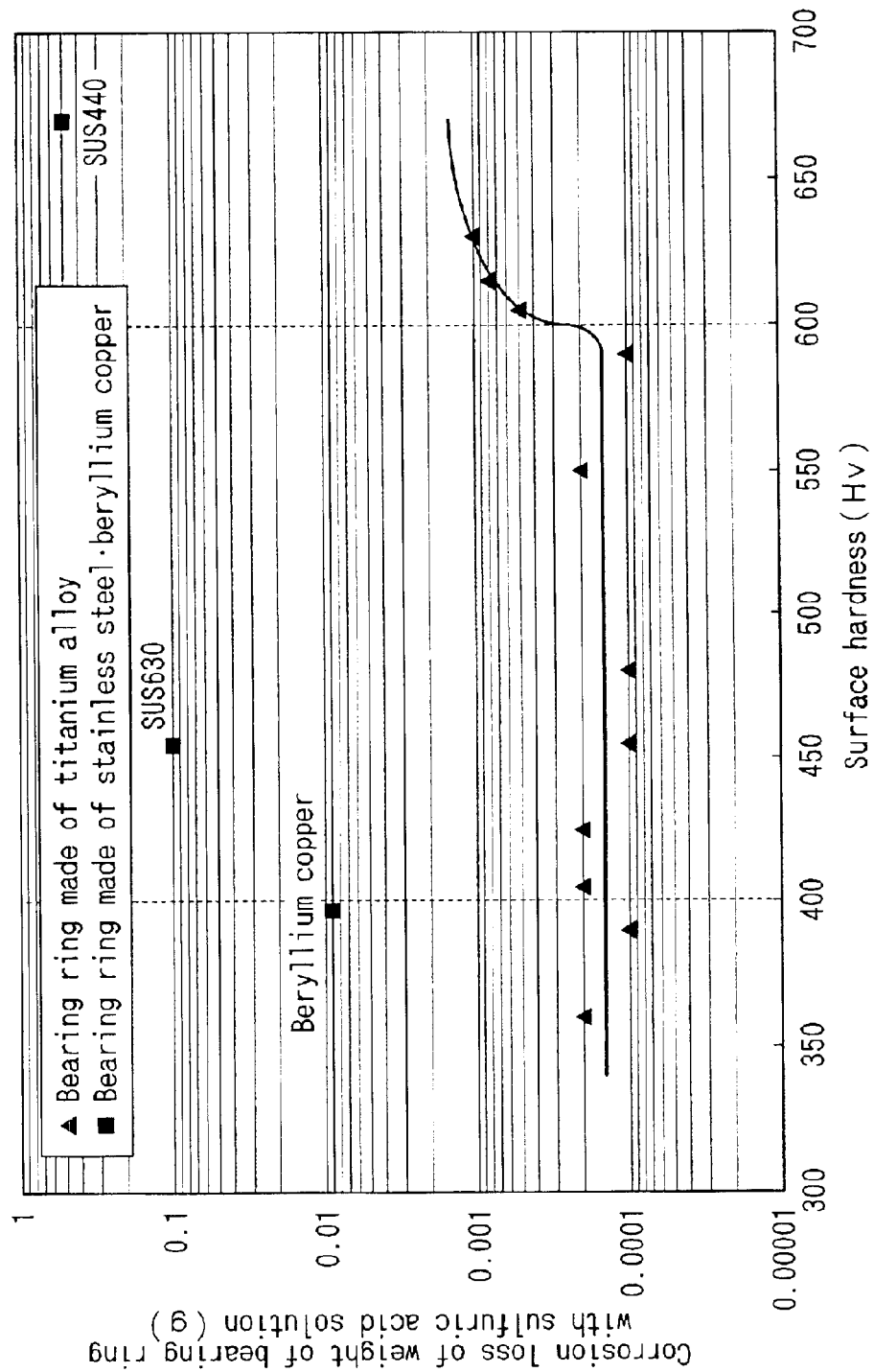
FIG. 3 is a view showing a relation between the result of a corrosion resistant test of rolling bearing and the surface hardness of bearing rings made of titanium alloy.

Table 1 shows the test result in the corrosion resistance test (decrease in the weight) and FIG. 3 shows a relation between the test result of the corrosion resistance test and the surface hardness of titanium alloys.

As can be seen from Table 1 and FIG. 3, Nos. 1–6 corresponding to the examples of the present invention show smaller values for the reduction of weight in the sulfuric acid solution compared with Nos. 6' to 8' as the comparative examples. This is because the bearing rings of Nos. 6' to 8' are formed of stainless steel or beryllium copper, whereas bearing rings of Nos. 1 to 6 are formed of a titanium alloys.

Further, Nos. 1 to 6 corresponding to the examples of the present invention show smaller values for the reduction of weight in the sulfuric acid solution compared with Nos. 3' to 5' as the comparative examples. This is because the surface hardness of the bearing rings made of titanium alloys is Hv 600 or more in Nos. 31 to 5', whereas the surface hardness of the bearings rings made of the titanium alloy is less than Hv 600 in Nos. 1 to 6.

Figure 4:
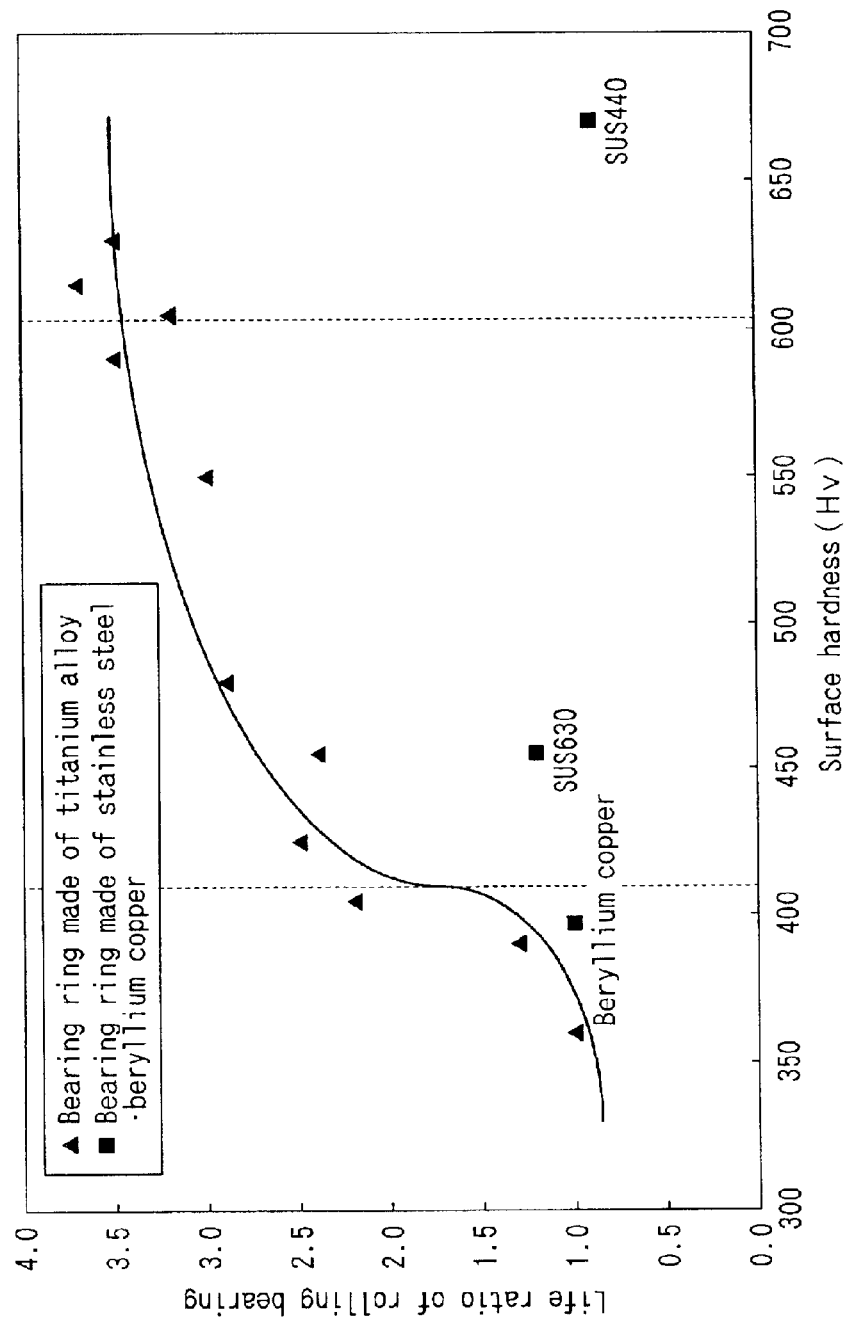
FIG. 4 is a view showing a relation between the result of a rolling life test of rolling bearing and the surface hardness of bearing rings made of titanium alloy.

Then, Table 1 shows the test result of the rolling life test (rolling life ratio) and FIG. 4 shows a relation between the test result of the rolling life test and the surface hardness of the rolling bearing made of the titanium alloy. The rolling life ratios in Table 1 and FIG. 4 are comparative values in a case of evaluation based on the rolling life of No. 1' being assumed as 1.

As can be seen from Table 1 and FIG. 4, Nos. 1 to 6 corresponding to the examples of the present invention show larger values for rolling life ratio in salt water compared with Nos. 1' and 2' as the comparative examples. This is because the surface hardness of the bearing rings made of the titanium alloy is less than Hv 400 in Nos. 1' to 2', whereas the surface hardness of the bearing rings of the titanium alloy is Hv 400 or more in Nos. 1 to 6.

From the foregoings, it can be seen that rolling bearings that can be used suitably for a long period of time even under such a circumstance where corrosion resistance is required against corrosive fluids such as saline or sulfuric acid can be obtained by making the bearing ring of the rolling bearing of the titanium alloy and setting the surface hardness for the bearing ring material to less than Hv 600 and Hv 400 or more.

Measuring Test for the Change of Magnetic Flux Density

Figure 5:
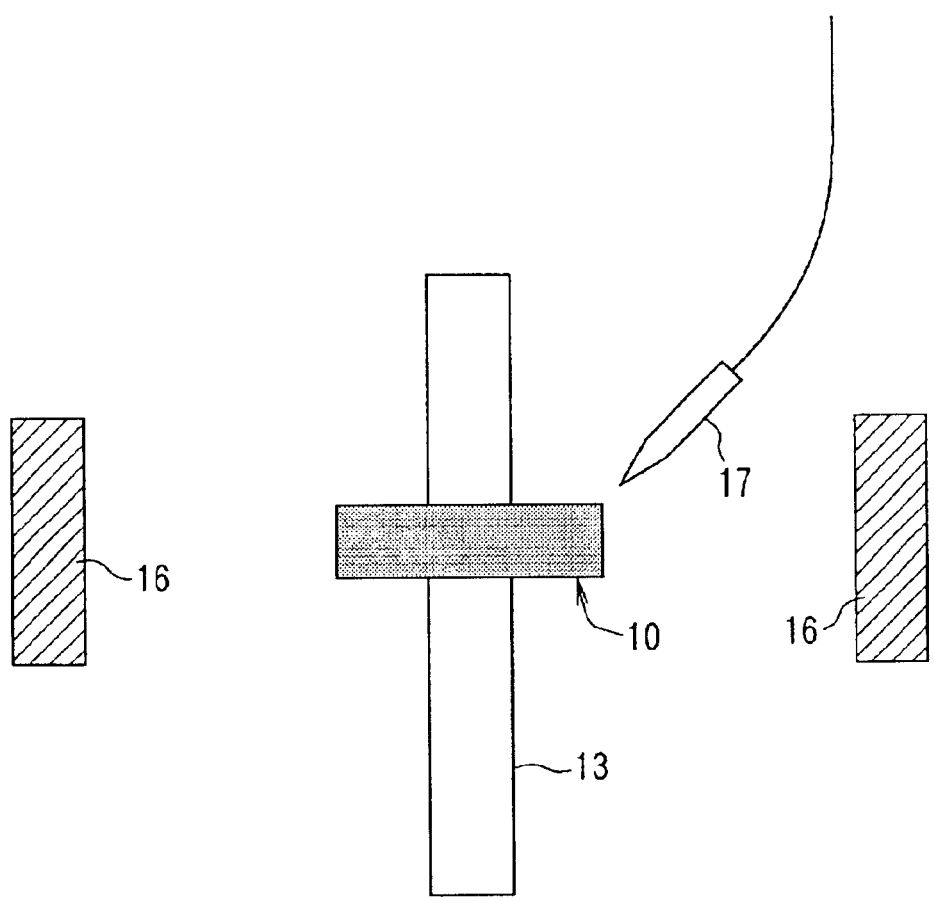
FIG. 5 is a view showing a method of measuring the change in magnetic flux density in peripheral magnetic fields.
Figure 6:
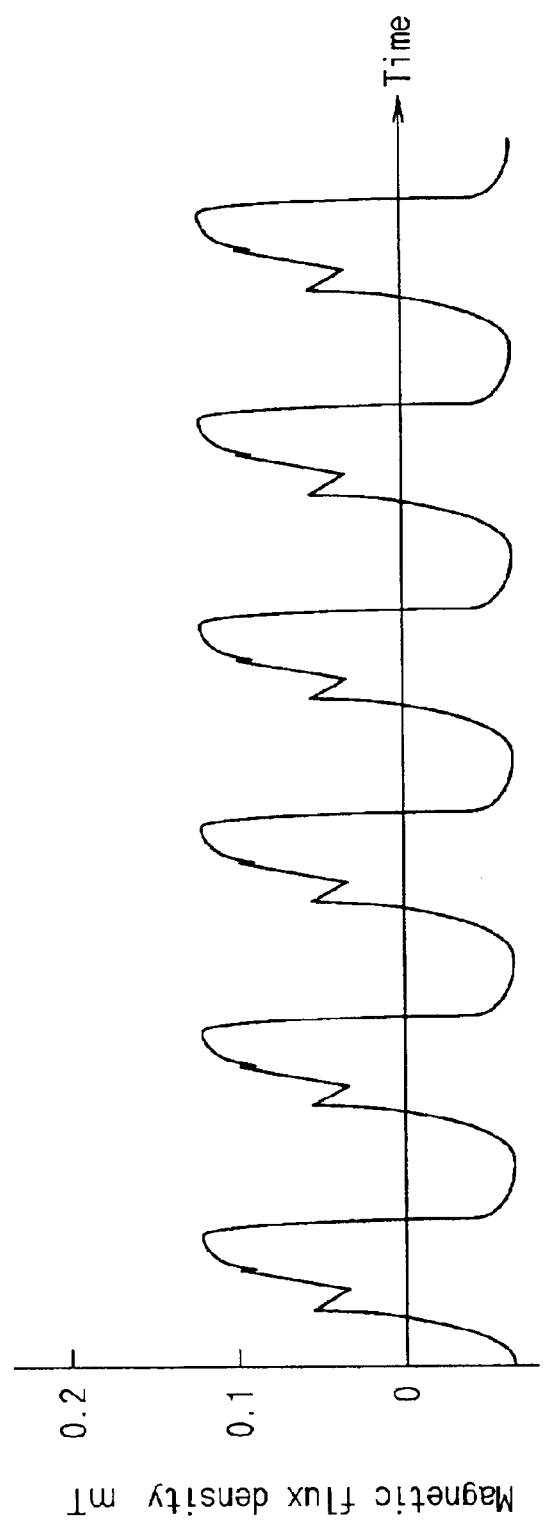
FIG. 6 is a view showing a signal waveform outputted from a tesla meter shown in FIG. 5.

Rolling bearings for use in test were manufactured with materials shown in Table 2A and Table 2B, and the following test for measuring the change of magnetic flux density was conducted to each of the manufactured test bearings. That is, as shown in FIG. 5, after attaching a test bearing 10 to a rotational shaft 13 rotated in an magnetic field of a permanent magnet 16, the rotational shaft 13 was rotated at a speed of about 500 rpm and the change of the magnetic flux density was measured by a tesla meter 17. Then, those showing the maximum output of the tesla meter 17 (refer to FIG. 6) of 0.1 mT or more were evaluated as with change of the magnetic flux density, whereas those showing the maximum output of less than 0.1 mT were evaluated as with no change of the magnetic flux density.

Table 2A shows the test result for the test of measuring the change of magnetic flux density while Table 2B shows the magnetic permeability of materials shown in Table 2A.

TABLE 2A

|  | Test No. | Bearing ring | Rolling element | Cage | Magnetic flux change |
|---|---|---|---|---|---|
| Example | 11 | Ti-6Al-4V | $Si_3N_4$ | Resin | No |
|  | 12 | Ti-6Al-4V | Alumina ceramics | Resin | No |
|  | 13 | Ti-15Mo-5Zr-3Al | $Si_3N_4$ | Resin | No |
|  | 14 | Ti-15Mo-5Zr-3Al | SiC | Resin | No |
|  | 15 | Ti-15Mo-5Zr | $Si_3N_4$ | Resin | No |
|  | 16 | Ti-15Mo-5Zr | Zirconia ceramics | Resin | No |
| Com. Example | 11' | Ti-6Al-4V | $Si_3N_4$ | SUS304 | Changed |
|  | 12' | Ti-15Mo-5Zr-3Al | SUS440C | Resin | Changed |
|  | 13' | Ti-15Mo-5Zr | SUS440C | Resin | Changed |
|  | 14' | Be copper | $Si_3N_4$ | SUS304 | Changed |
|  | 15' | Non-magnetic stainless steel | $Si_3N_4$ | Resin | Changed |

TABLE 2B

|  | Material | Permeability |
|---|---|---|
| Bearing ring | Ti-6A1-4V | 1.001 or less |
|  | Ti-15Mo-5Zr-3Al | 1.001 or less |
|  | Ti-15Mo-5Zr | 1.001 or less |
|  | Be copper | 1.001 or less |
|  | Non-magnetic stainless steel | More than 1.001 |
| Rolling element | $Si_3N_4$ | 1.001 or less |
|  | SiC | 1.001 or less |
|  | Zirconia ceramics | 1.001 or less |
|  | Alumina ceramics | 1.001 or less |
|  | SUS440C | More than 1.001 |
| Cage | Resin | 1.001 or less |
|  | SUS304 | More than 1.001 |

As can be seen from the test result of Table 2A, Nos. 1 to 6 corresponding to the examples of the present invention show less change of magnetic flux density compared with Nos. 11' and 14' as the comparative example. This is because the cage is formed of SUS 304 in Nos. 11' and 14', whereas the cage of is formed of a resin in Nos. 1 to 6.

Further, Nos. 1 to 6 corresponding to the examples of the present invention show less change of magnetic flux density compared with Nos. 12' and 13' as the comparative examples. This is because the rolling elements are formed of SUS 440C in Nos. 12' and 13', whereas the rolling elements are formed of ceramics such as silicon nitride in Nos. 1 to 6.

Further, Nos. 1 to 6 corresponding to the examples of the present invention show less change of magnetic flux density compared with No. 15' as the comparative example. This is because the bearing ring is formed of the non-magnetic stainless steel in No. 15', whereas the bearing rings are formed of the titanium alloy in Nos. 1 to 6.

Accordingly, it can be seen that since the magnetic flux density of peripheral magnetic fields does not change greatly by the rotation of the bearing by making the bearing ring with the titanium alloy, the rolling elements with the ceramics and the cage with the resin, rolling bearings favorable for the use under the circumstance where non-magnetic property is required can be obtained.

Wear Test for Cage

Cages were manufactured with materials shown in Table 3, which were incorporated into test bearings where the bearing ring comprised Ti-15Mo-5Zr-3Al and the rolling element comprised $Si_3N_4$ and a wearing test for the cage was conducted. Specifically, each of the test bearings was rotated under the conditions at a rotational speed: 200 rpm, under a radial load: 49.0 N, axial load: 19.6 N, at a vacuum degree: 1×10–5 Torr and in lubrication state: non-lubrication. Then, the weight of the cage before rotation of the test bearing and the weight of the cage at the instance the rotation of the test bearing reached 1×10$^7$ were measured, and the difference was evaluated as the amount of wear of the cage.

material for the cage (copper alloy) is 20 W/(m·K) or more in Nos. 21 to 35.

Further, Nos. 21 to 35 corresponding to the examples of the present invention show less change of magnetic flux density compared with No. 22' as the comparative example. This is because the specific permeability of the material for the cage shows a value exceeding 1.001 in No. 22', whereas the specific permeability of the material for the cage shows the value of 1.001 or less in Nos. 21 to 35.

Accordingly, rolling bearings that can be used favorably even under a circumstance where a lubricant such as grease can not be use and non-magnetic property is required can be obtained by increasing the heat conductivity of the material of the cage to 20 W/(m·K) or more and lowering the specific permeability of the material for the cage as 1.001 or less.

TABLE 3

| No. | Name of material | Cu | Zn | Pb | Sn | Al | Fe | Mn | Ni | P | Others |
|---|---|---|---|---|---|---|---|---|---|---|---|
| 21 | YBsC1 | 85.3 | 14.2 | 0.3 | — | — | — | — | — | — | |
| 22 | YBsC2 | 67.8 | 28.8 | 2.5 | 0.5 | 0.2 | — | — | — | — | |
| 23 | HBsC1 | 58.8 | 36.5 | 0.2 | 0.2 | 0.7 | 0.7 | 2.3 | 0.2 | — | |
| 24 | HBsC2 | 58.5 | 37.3 | 0.2 | 0.2 | 1.3 | 0.5 | 1.6 | — | — | |
| 25 | AlBC1 | 77.2 | — | — | — | 8.3 | 3.3 | 0.9 | 2.2 | — | |
| 26 | AlBC3 | 79.7 | — | — | — | 9.6 | 4.4 | 1 | 4.8 | — | |
| 27 | LBC3 | 78.7 | 0.8 | 9.7 | 10 | — | — | — | 0.4 | — | |
| 28 | LBC4 | 74.6 | 0.5 | 14.8 | 9.6 | — | — | — | 0.2 | — | |
| 29 | C5191 | 93 | — | — | 6.5 | — | — | — | — | 0.27 | 0.27 |
| 30 | C5210 | 91.5 | — | — | 8.1 | — | — | — | — | 0.27 | Be: 1.89 |
| 31 | C17210 | 97.6 | — | — | — | — | — | — | — | — | |
| 32 | Cupronickel | 69.8 | — | — | — | — | — | — | 29.8 | — | |
| 33 | Echobrass | 75.4 | 21.2 | — | — | — | — | — | — | — | Si: 3.0 |
| 34 | C1100 | 99.9 | — | — | — | — | — | — | — | — | |
| 35 | C14500 | 99.3 | — | — | — | — | — | — | — | 0.008 | Te: 0.51 |

The bearing rings made of titanium alloys for the test bearings used were formed of titanium alloys applied with a solution treatment under the conditions at 800 to 850° C.×1 hr, cooled by water and then applied with a first age hardening treatment under the conditions at 425° C.×20 hrs and further applied with a second age hardening treatment under the conditions at 475° C.×7 hrs for obtaining a surface hardness of Hv 480 or more.

No. 33 "Echobrass" in Table 3 is a name of commercial products manufactured by Sanpo Shindo Kogyo Co., Ltd.

Table 4 shows the test result for the cage wear test (wear ratio). The wear ratios for respective cages in Table 4 are comparative values in a case of evaluation based on the wear amount of No. 21' being assumed as 1.

Wear Evaluation Test

Figure 7:
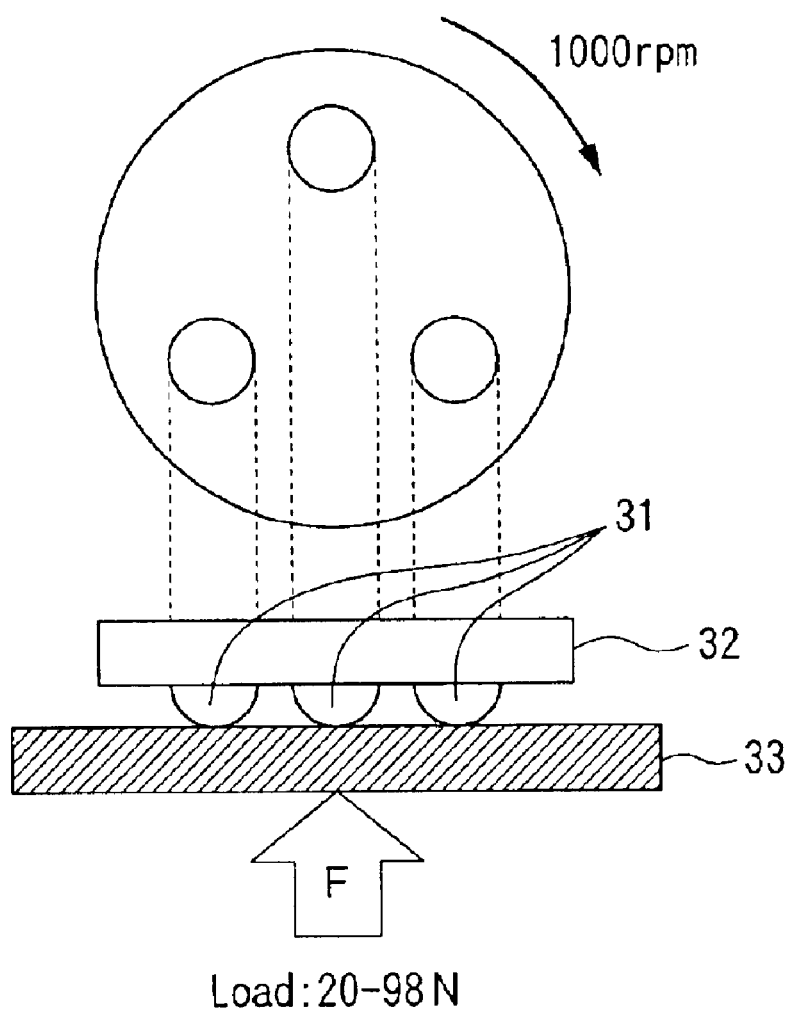
FIG. 7 is a view showing a method of testing the wear resistance of a bearing ring made of titanium alloy.

Disk-shaped test specimen each of 50 mm diameter were manufactured with materials shown in Table 5 and wear evaluation test was conducted to each of the test specimens. Specifically, as shown in FIG. 7, a load was applied by way of rolling elements 31 made of silicon nitride to the surface of a disk-shaped test specimen 33 and a cage 32 made of brass was rotated at a speed of 1000 rpm while gradually increasing the load applied to the test specimen 33 in a range

TABLE 4

| | | Material for cage | Specific permeability | change of magnetic field | Heat conductivity W/(m · K) | Wear ratio |
|---|---|---|---|---|---|---|
| Example | 21 | YBsC1 | 1.001 or less | No | 159 | 0.75 |
| | 22 | YBsC2 | ↑ | ↑ | 115 | 0.69 |
| | 23 | HBsC1 | ↑ | ↑ | 87 | 0.56 |
| | 24 | HBsC2 | ↑ | ↑ | 123 | 0.54 |
| | 25 | AlBC1 | ↑ | ↑ | 50 | 0.45 |
| | 26 | AlBC3 | ↑ | ↑ | 36 | 0.48 |
| | 27 | LBC3 | ↑ | ↑ | 47 | 0.75 |
| | 28 | LBC4 | ↑ | ↑ | 52 | 0.81 |
| | 29 | C5191 | ↑ | ↑ | 80 | 0.55 |
| | 30 | C5210 | ↑ | ↑ | 63 | 0.52 |
| | 31 | C17200 | ↑ | ↑ | 84 | 0.1 |
| | 32 | Cupronickel | ↑ | ↑ | 29 | 0.75 |
| | 33 | Echobrass | ↑ | ↑ | 38 | 0.24 |
| | 34 | C1100 | ↑ | ↑ | 390 | 0.88 |
| | 35 | C14500 | ↑ | ↑ | 380 | 0.87 |
| Comp. Example | 21' | SUS304 | 1.001 or more | Changed | 15 | 1 |
| | 22' | SPCC | 1 | ↑ | 59 | 1.3 |

As can be seen from the result of Table 4, Nos. 21–35 corresponding to the examples of the present invention show smaller values for the wear ratio compared with No. 21' as the comparative examples. This is because the heat conductivity of the material for the cage (stainless steel) is less than 20 W/(m·K) in No. 21', whereas the heat conductivity of the from 20 N to 90 N. Then, the load at the instance the rotational resistance of the cage 32 reached 0.69 N-m was evaluated as a seizure load and the maximum wear indentation depth on the surface of the test specimen was measured simultaneously. In a case where the rotational resistance of the cage 32 did not reach 0.69 N-m even when the load exceeded 98 N, the seizure load at the instance the load reached at 98 N was evaluated as the rotational resistance of the cage 32.

Table 5 shows the seizure load and the maximum wear indentation depth for each of the test specimens obtained by the wear evaluation test.

because the test specimen made of the titanium alloy of No. 37' has a thickness of the oxygen compound layer of 110 nm, whereas the test specimens made of the titanium alloys of Nos. 36–43 have an oxygen compound layer with a thickness of 95 nm or less.

From the foregoings, it can be seen that the wear resistance of the bearing ring made of the titanium alloy can be increased by forming the oxide compound layer containing $TiO_x$ to the surface of the bearing ring made of the titanium alloy. Further, it can be seen that the wear resistance of the bearing ring made of the titanium alloy can be increased further by making the thickness of the oxide compound layer to 20 nm or more and 95 nm or less.

TABLE 5

|  | No. | Material for test piece | Oxidation condition | Kind of compound (0 < x < 2) | Compound layer thickness (nm) | Core hardness (Hv) | Seizure load (N) | Rotational resistance at 98 N (N.m) | Maximum wear indent depth ($\mu$m) |
|---|---|---|---|---|---|---|---|---|---|
| Example | 36 | Ti-6Al-4V | 500° C. × 40 h | $TiO_2$, $TiO_x$ | 75 | 455 | 98< | 0.23 | 1 |
|  | 37 | Ti-6Al-4 | 550° C. × 20 h | $TiO_2$, $TiO_x$ | 80 | 429 | 98< | 0.22 | 1 |
|  | 38 | Ti-6Al-4V | 600° C. × 10 h | $TiO_2$, $TiO_x$ | 95 | 421 | 98< | 0.24 | 1 |
|  | 39 | Ti-15V-3Cr-3Sn-3Al | 475° C. × 50 h | $TiO_2$, $TiO_x$ | 65 | 430 | 98< | 0.2 | 1 |
|  | 40 | Ti-22V-4Al | 475° C. × 50 h | $TiO_2$, $TiO_x$ | 70 | 441 | 98< | 0.21 | 1 |
|  | 41 | Ti-15Mo-5Zr-3Al | 400° C. × 60 h | $TiO_2$, $TiO_x$ | 25 | 467 | 98< | 0.18 | 2 |
|  | 42 | Ti-15Mo-5Zr-3Al | 450° C. × 60 h | $TiO_2$, $TiO_x$ | 55 | 503 | 98< | 0.17 | 1 |
|  | 43 | Ti-15Mo-5Zr-3Al | 500° C. × 60 h | $TiO_2$, $TiO_x$ | 90 | 452 | 98< | 0.21 | 1 |
| Comp. Example | 36' | Ti-6Al-4V | Only aging | — | 0 | 429 | 35 | — | 7 |
|  | 37' | Ti-6Al-4V | 600° C. × 20 h | $TiO_2$, $TiO_x$ | 110 | 411 | 61 | — | 5 |
|  | 38' | Ti-6Al-4V | 700° C. × 20 h | $TiO_2$ | 1800 | 373 | 98< | 0.46 | 2 |
|  | 39' | Ti-22Al-4V | Only aging | — | 0 | 480 | 43 | — | 6 |
|  | 40' | Ti-15Mo-5Zr-3Al | 400° C. × 20 h | $TiO_2$, $TiO_x$ | 15 | 448 | 46 | — | 4 |
|  | 41' | Ti-15Mo-5Zr-3Al | 300° C. × 40 h | $TiO_2$, $TiO_x$ | 10 | 384 | 38 | — | 6 |
|  | 42' | SUS630 | — | — | 0 | 465 | 98< | 0.42 | 4 |
|  | 43' | YHD50 | — | — | 0 | 432 | 98< | 0.45 | 5 |
|  | 44' | Be—Cu | — | — | 0 | 418 | 98< | 0.36 | 8 |

As can be seen from the test result in Table 5, the test specimens made of the titanium alloys of Nos. 36–43 show larger seizure load compared with the test specimens made of the titanium alloys of No. 36' and No. 39'. This is because an oxide compound layer is not formed on the surface of the test specimens made of the titanium alloys of Nos. 36' and 39', whereas the oxide compound layer is formed on the surface of the test specimens made of titanium alloys of Nos. 36–43.

Further, the test specimens made of the titanium alloys of Nos. 36–43 show less rotational resistance of the cage at the instance the load reaches 98 N compared with the test specimen made of the titanium alloy of No. 38' where the load reaches 98 N. This is because the test specimen made of the titanium alloy of No. 38' does not contain $TiO_x$ (0<x<2) in the oxygen compound layer, whereas the test specimens made of the titanium alloys in Nos. 36–43 contain $TiO_2$ and $TiO_x$ in the oxide compound layer.

Further, the test specimen made of the titanium alloys of Nos. 36–43 show larger seizure load compared with the test specimens made of the titanium alloys of Nos. 40' and 41'. This is because the test specimens made of the titanium alloys of Nos. 40' and 41' have a thickness of an oxygen compound layer of less than 20 nm, whereas the test specimens made of titanium alloys of Nos. 36 to 43 have a thickness of the oxygen compound layer of 20 nm or more.

Figure 8:
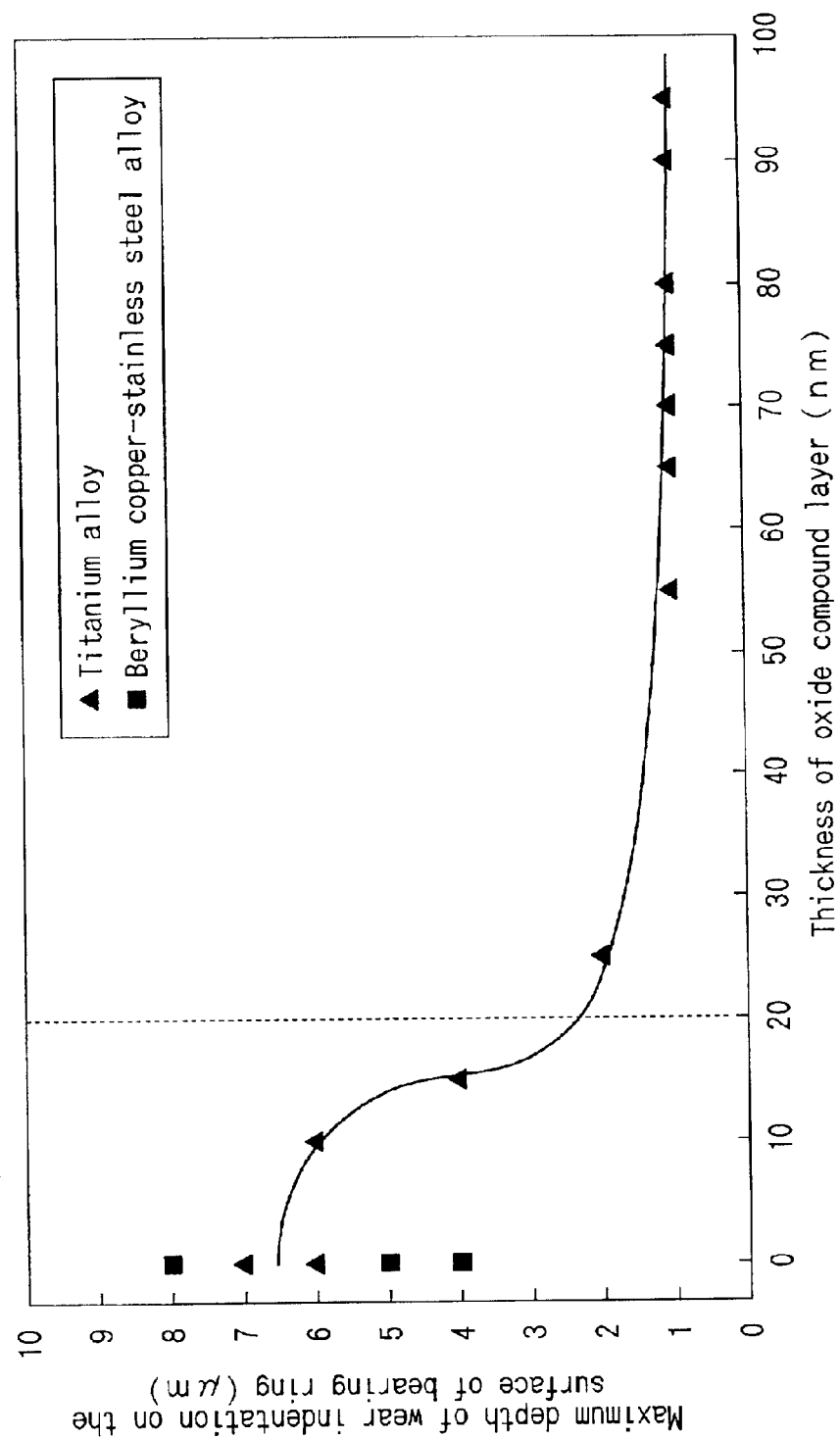
FIG. 8 is a view showing a relation between the result of a wear resistance test of bearing rings made of titanium alloy and the thickness of an oxygen compound.

Further, the test specimens made of the titanium alloys of Nos. 36–43 have larger seizure load compared with the test specimen made of the titanium alloy of No. 37'. This is FIG. 8 shows a relation between the thickness of the oxide compound layer and the maximum wear indentation depth of the test specimen made of the titanium alloy shown in Table 5. As shown in the figure, as the thickness of the oxygen compound layer is 20 nm or more, the maximum wear indentation depth is about 2 $\mu$m or less and as the thickness of the oxygen compound layer is 50 nm or more, the maximum wear indentation depth is about 1 $\mu$m or less. Accordingly, the wear resistance of the bearing ring made of the titanium can be increased further by defining the thickness of the oxygen compound layer to 20–95 nm, preferably, 50–95 nm.

Rolling Life Test

Bearing rings were manufactured with materials shown in Table 6, which were incorporated into test bearings in which the rolling element comprised $Si_3N_4$ and the cage comprised a fluoro resin, and a rolling life test in water for rolling bearing was conducted under the conditions at radial load: 98 N, axial load: 20 N, rotational speed: 1000 rpm and in a lubrication state: no lubrication.

Table 6 shows the rolling life for each of the test bearings obtained by the rolling life test in water. The rolling life ratios in Table 6 are comparative values in a case of evaluation based on the rolling life of No. 44' being assumed as 1.

TABLE 6

|  | No. | Material for test specimen | Oxidation condition | Kind of compound (0 < x < 2) | Compound layer thickness (nm) | Core hardness (Hv) | Rolling life ratio |
|---|---|---|---|---|---|---|---|
| Example | 36 | Ti-6Al-4V | 500° C. × 40 h | TiO₂, TiOx | 75 | 455 | 3.0 |
|  | 37 | Ti-6Al-4V | 550° C. × 20 h | TiO₂, TiOx | 80 | 429 | 3.2 |
|  | 38 | Ti-6Al-4V | 600° C. × 10 h | TiO₂, TiOx | 95 | 421 | 2.8 |
|  | 39 | Ti-15V-3Cr-3Sn-3Al | 475° C. × 50 h | TiO₂, TiOx | 65 | 430 | 3.1 |
|  | 40 | Ti-22V-4Al | 475° C. × 50 h | TiO₂, TiOx | 70 | 441 | 2.9 |
|  | 41 | Ti-15Mo-5Zr-3Al | 400° C. × 60 h | TiO₂, TiOx | 25 | 467 | 3.5 |
|  | 42 | Ti-15Mo-5Zr-3Al | 450° C. × 60 h | TiO₂, TiOx | 55 | 503 | 3.2 |
|  | 43 | Ti-15Mo-5Zr-3Al | 500° C. × 60 h | TiO₂, TiOx | 90 | 452 | 3.5 |
| Comp. | 36' | Ti-6Al-4V | Only aging | — | 0 | 429 | 1.6 |
| Example | 37' | Ti-6Al-4V | 600° C. × 20 h | TiO₂, TiOx | 110 | 411 | 2.1 |
|  | 38' | Ti-6Al-4V | 700° C. × 20 h | TiO₂ | 1800 | 373 | 1.9 |
|  | 39' | Ti-22V-4Al | Only aging | — | 0 | 480 | 1.7 |
|  | 40' | Ti-15Mo-5Zr-3Al | 400° C. × 20 h | TiO₂, TiOx | 15 | 448 | 1.9 |
|  | 41' | Ti-15Mo-5Zr-3Al | 300° C. × 40 h | TiO₂, TiOx | 10 | 384 | 1.4 |
|  | 42' | SUS630 | — | — | 0 | 465 | 1.4 |
|  | 43' | YHD50 | — | — | 0 | 432 | 1.2 |
|  | 44' | Be—Cu | — | — | 0 | 418 | 1.0 |

As can be seen from the test results in Table 6, the test bearings Nos. 36–43 show larger values for the rolling life ratio compared with the test bearings Nos. 36' and 39'. This is because the oxide compound layer is not formed on the surface of the bearing rings made of the titanium alloys in the test bearings Nos. 36' and 39', whereas the oxide compound layer is formed on the surface of the bearing rings made of the titanium alloys in the test bearings Nos. 36–43. Further, the test bearings Nos. 36–43 show larger values for the rolling life ratio compared with the test bearings No. 38'. This is because the oxygen compound layer does not contain $TiO_x$ (0<x<2) in the test bearings No. 38', whereas the oxygen compound layer contains $TiO_x$ (0<x<2) in the test bearings Nos. 36–43. Further, the test bearings Nos. 36–43 are excellent in the rolling life compared with the test bearings Nos. 40' and 41'. This is because the thickness of the oxygen compound layer is less than 20 nm in the test bearings of Nos. 40' and 41', whereas the thickness of the oxygen compound layer is 20 nm or more in the test bearings Nos. 36–43.

Figure 9:
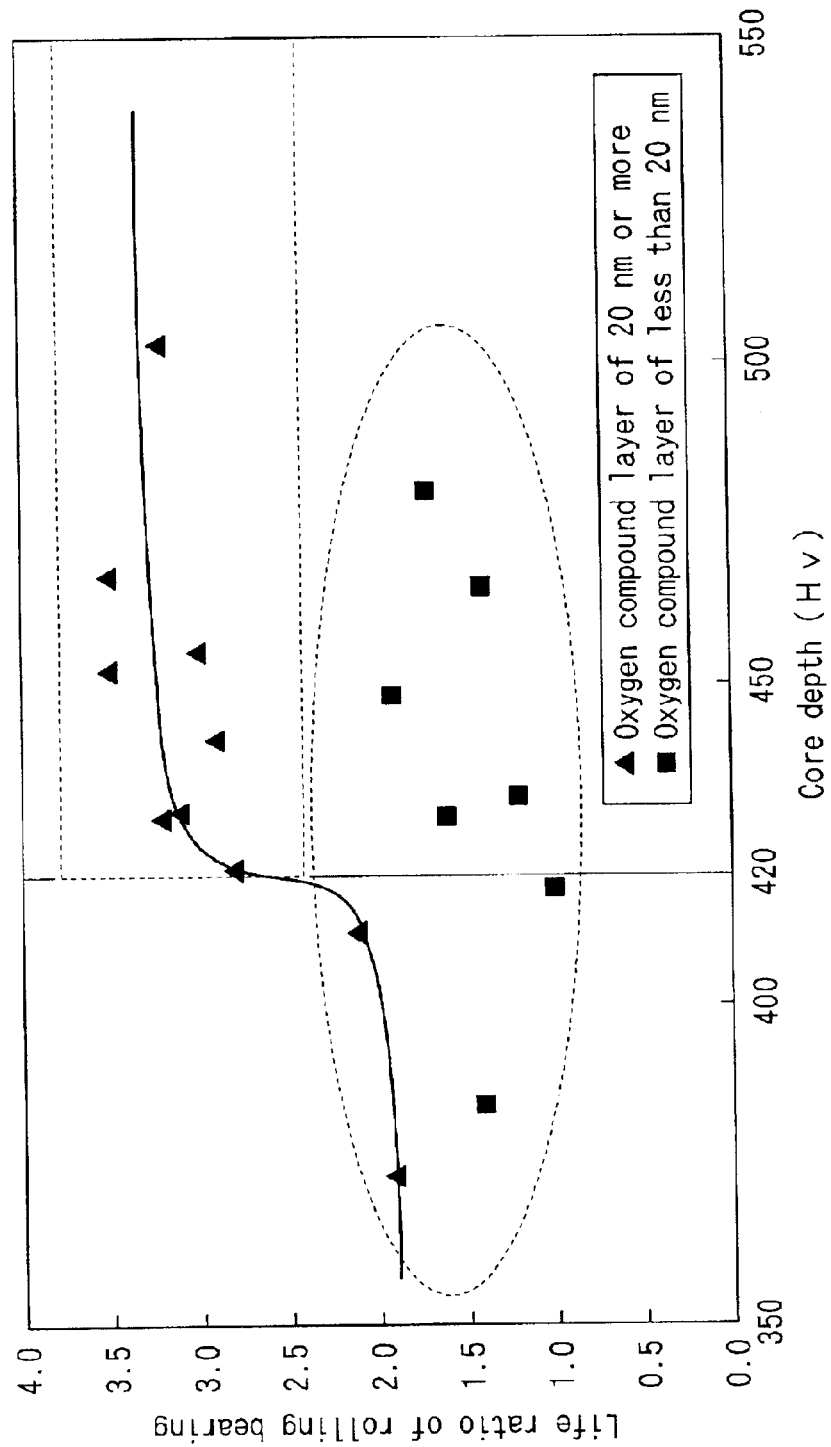
FIG. 9 is a view showing a relation between the result of a rolling life test of bearing ring made of titanium alloy and a hardness for the core.
Figure 10A:
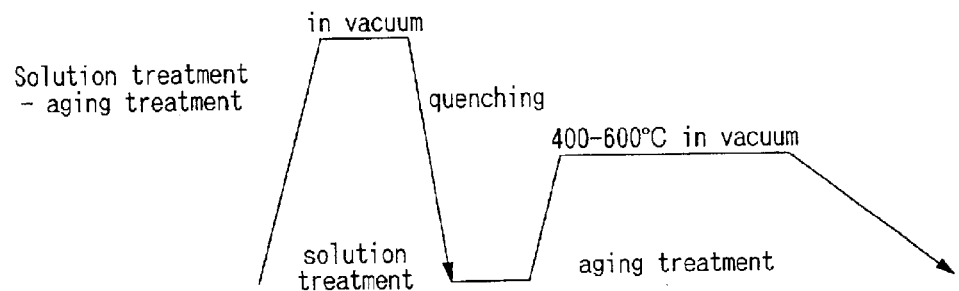
FIG. 10A is a view showing an existent method upon hardening a titanium alloy.
Figure 10B:
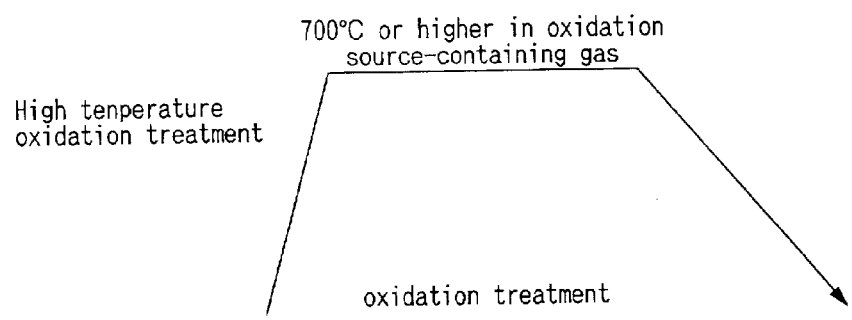
FIG. 10B is a view showing a method upon hardening a titanium alloy by a high temperature oxidizing treatment.
Figure 10C:
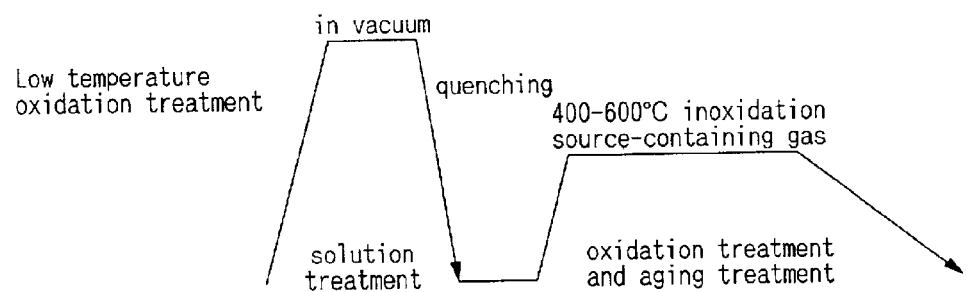
FIG. 10C is a view showing a method upon hardening a titanium alloy by a low temperature oxidizing treatment.

FIG. 9 shows a relation between the rolling life ratio for each of the test bearings and the core hardness of the rolling bearings made of the titanium alloys shown in Table 6. As shown in the figure, the rolling life of the bearing is about 2.0 as the comparative value when the core hardness of the bearing ring made of the titanium alloy is less than Hv 420, whereas the rolling life of the bearing is about 3.5 as the comparative value when the core hardness of the bearing ring made of the titanium alloy is Hv 420 or more. Accordingly, it can be seen that the rolling life of the rolling bearing can be increased by increasing the core hardness of the bearing ring made of the titanium alloy to Hv 420 or more.

Then, test specimens were manufactured with materials shown in Table 7 and a solution treatment and an aging treatment were applied to the test specimens Nos. 1–14 under the conditions shown in the table. Then, using the test specimens, measurement for the particle diameter of the ω-phase, Vickers' hardness test, salt spray test and Sawin type wear test were conducted.

TABLE 7

| No. | Kind of alloy | Solution condition | Aging condition |
|---|---|---|---|
| 1 | Ti-6Al-4V | Water cooling after keeping 1 hr at 950° C. | Air cooling after keeping 10 hr at 420° C. |
| 2 | Ti-15Mo-5Zr-3Al | Water cooling after keeping 1 hr at 800° C. | Air cooling after keeping 50 hr at 350° C. |
| 3 | Ti-15Mo-5Zr-3Al | Water cooling after keeping 1 hr at 800° C. | Air cooling after keeping 15 hr at 400° C. |
| 4 | Ti-15Mo-5Zr-3Al | Water cooling after keeping 1 hr at 800° C. | Air cooling after keeping 10 hr at 450° C. |
| 5 | Ti-15Mo-5Zr-3Al | Water cooling after keeping 1 hr at 800° C. | Air cooling after keeping 10 hr at 475° C. |
| 6 | Ti-15Mo-5Zr-3Al | Water cooling after keeping 1 hr at 780° C. | Air cooling after keeping 50 hr at 450° C. |
| 7 | Ti-15Mo-5Zr-3Al | Water cooling after keeping 1 hr at 800° C. | 50% cold rolling, keeping at 475° C. for 7 hr and then furnace cooling |
| 8 | Ti-15Mo-5Zr-3Al | Water cooling after keeping 1 hr at 800° C. | 70% cold rolling, keeping at 475° C. for 7 hr and then furnace cooling |
| 9 | Ti-15V-3Cr-3Sn-3Al | Water cooling after keeping 1 hr at 800° C. | Air cooling after keeping 15 hr at 400° C. |

TABLE 7-continued

| No. | Kind of alloy | Solution condition | Aging condition |
|---|---|---|---|
| 10 | Ti-15V-3Cr-3Sn-3Al | Water cooling after keeping 1 hr at 800° C. | Air cooling after keeping 10 hr at 450° C. |
| 11 | Ti-15V-3Cr-3Sn-3Al | Water cooling after keeping 1 hr at 800° C. | Air cooling after keeping 7 hr at 500° C. |
| 12 | Ti-15V-3Cr-3Sn-3Al | Water cooling after keeping 1 hr at 800° C. | Air cooling after keeping 100 hr at 450° C. |
| 13 | Ti-15V-3Cr-3Sn-3Al | Water cooling after keeping 1 hr at 800° C. | Air cooling after keeping 0.1 hr at 400° C. |
| 14 | SUS440C | Oil cooling after keeping 1 hr at 1050° C. | keeping 2 hr at 170° C. (tempering) |
| 15 | Be—Cu | No solution treatment | Air cooling after keeping 2 hr at 350° C. |

Particle Diameter Measurement for ω-Phase

Crystal tissue for the cross section of a test specimen was observed for dark view images using a test specimen for transmission type electron microscopic observation by using a transmission type electron microscope "JEM-2010" manufactured by Nippon Denshi Co. to measure the particle diameter for the ω phase. As a result of the observation, the crystal tissue of the titanium alloy was (β+ω) phase or (β+ω+α) in Nos. 1–10 and 13 and (β+α) phase in No. 11.

Vickers Hardness Test

After mirror-polishing the cross section of a test specimen, it was measured under the conditions at a load of 100 g by a micro Vickers hardness tester while abutting a presser to the mirror face of the test specimen.

Salt Water Spray Test

According to "JIS Z2371", and using an aqueous NaCl solution at 5% by weight concentration at a temperature of 35° C., the appearance of the test specimen after lapse of one week was observed visually. Those not recognized for the occurrence of rust was evaluated as having satisfactory corrosion resistance (○) and those recognized for the occurrence of rust was evaluated as having poor corrosion resistance (X) by the observation.

Sawin Type Wear Test

Figure 11A:
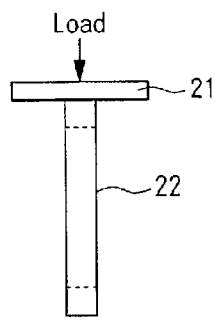
FIG. 11A is a side elevational view of a Sawin type wearing testing machine.
Figure 11B:
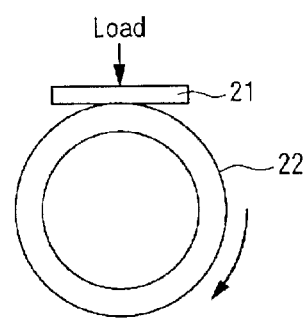
FIG. 11B is a front elevational view of a Sawin type wearing testing machine.

As shown in FIG. 11A and FIG. 11B, a fixed test specimen 21 comprising various kinds of alloys manufactured as described above and a rotational test specimen 22 comprising $Si_3N_4$ were attached to a Sawin type wear tester and the rotational test specimen 22 was rotated relative to the fixed test specimen 21 without lubrication while pressing the fixed test specimen 21 to the outer circumferential surface of the rotational test specimen 22 by a weight for loading and a weight for balancing. The fixed test specimen 21 is sized 19 mm×19 mm×3 mm thickness, while the ring-shaped rotational test specimen 22 is sized 45 mm: outer diameter, 6 mm: thickness and 6 mm: width.

The conditions for the rotation were at a pressing load of 39.2 N, at a rotational speed of the rotational test specimen 22 to the fixed test specimen 21 of 2.6 m/s as the circumferential speed and for a rotational distance of the rotational test specimen 22 of 400 m. The wear volume of the test specimen 21 along with rotation was measured and the ratio when assuming the wear volume of No. 11 as 1 was calculated as "wear ratio" for each of the specimens.

Table 8 shows the test results.

TABLE 8

| No. | ω phase particle diameter | Hardness (Hv) | Wear ratio | Corrosion resistance |
|---|---|---|---|---|
| 1 | 1 μm or less | 492 | 0.72 | ○ |
| 2 | 1 μm or less | 514 | 0.64 | ○ |
| 3 | 1 μm or less | 520 | 0.68 | ○ |
| 4 | 1 μm or less | 510 | 0.72 | ○ |
| 5 | 1 μm or less | 493 | 0.69 | ○ |
| 6 | 1 μm or less | 491 | 0.65 | ○ |
| 7 | 1 μm or less | 530 | 0.61 | ○ |
| 8 | 1 μm or less | 528 | 0.60 | ○ |
| 9 | 1 μm or less | 501 | 0.72 | ○ |
| 10 | 1 μm or less | 492 | 0.68 | ○ |
| 11 | No ω phase | 453 | 1.0 | ○ |
| 12 | 1 μ over | 430 | 1.4 | ○ |
| 13 | 10 nm or less | 480 | 0.88 | ○ |
| 14 | — | 690 | 0.1 | X |
| 15 | — | 421 | 2.3 | ○ |

As can be seen from the test result of Table 8, Nos. 1 to 10 and No. 13 corresponding to the examples of the present invention are more excellent in the wear resistance and favorable in the corrosion resistance by the use of a titanium alloy of a crystal tissue having the ω phase with the particle diameter of 1 μm or less, compared with a case of using a titanium alloy of a crystal tissue not having ω phase (No. 11), a case in which the particle diameter of the ω phase exceeds 1 μm (No. 12) and a case of using the Be—Cu alloy (No. 15). In a case of using stainless steel (No. 14), the hardness and the wear resistance were favorable but the corrosion resistance in salt water was poor.

In No. 5, the temperature for the aging treatment is 475° C., which is higher than the ω phase precipitation temperature and it is considered that the ω phase precipitated in a temperature region from 300 to 450° C. during cooling to form a (β+ω+α) phase since the cooling rate after the aging treatment was lowered by gradual cooling in the furnace.

In Nos. 7 and 8, since a great amount of plastic strains are introduced by cold rolling into the titanium alloy, a number of nuclei of the ω-phase are formed during gradual cooling to increase the existent ratio of the ω-phase in the titanium alloy (volume ratio) compared with the case of not applying cold rolling (No. 5). Thus, the hardness was increased and the wear resistance was also preferred particularly.

In No. 13, since the particle diameter of the ω phase was relatively small as 10 nm or less, the hardness and the wear resistance were somewhat inferior to those of Nos. 1 to 10, but it was within a range that is usable as bearing rings or rolling elements of rolling bearings.

From the foregoings, in the rolling bearing comprising the inner ring (raceway member) 2, the outer ring, (raceway member) 1, the rolling elements 3 and the cage 4, the inner ring 2 and the outer ring 1 comprising the titanium alloy of the crystal tissue having the ω phase with a particle diameter of 1 μm or less are obtained by manufacturing the inner ring 2 and the outer ring 1 in the same manner as for test specimens of Nos. 1 to 10 and 13. Then, by the combination of the inner ring 2 and the outer ring 1 with the rolling elements 3, for example, made of ceramics such as $Si_3N_4$ and, optionally, the cage 4, for example, made of plastics, a rolling bearing suitable to use in a corrosive circumstance or a circumstance requiring non-magnetic property can be obtained.

Figure 12:
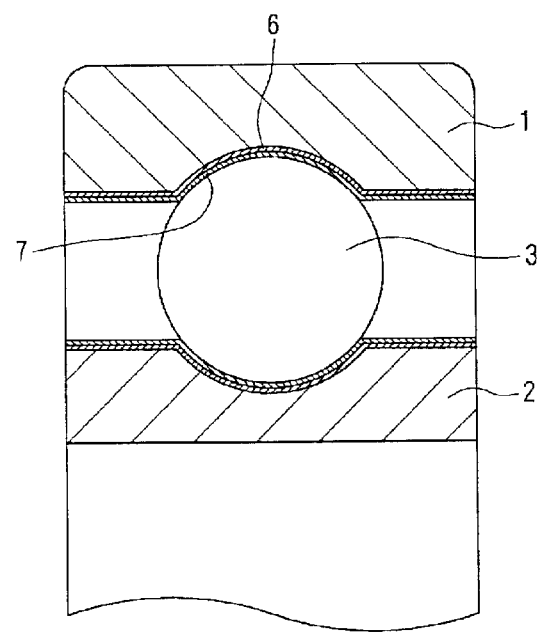
FIG. 12 is a fragmentary cross sectional view of a rolling bearing according to another embodiment of the present invention.

FIG. 12 is a cross sectional view of a deep groove ball bearing (bearing number: 608) as another embodiment of the present invention. In the drawing, the outer ring 1 and the inner ring 2 are formed of α+β type titanium alloy such as Ti-6Al 4V or α+β type titanium alloy such as Ti-15Mo-5Zr-3Al, Ti-15Mo-5Zr-3Al and the like. The rolling element 3 disposed between the outer ring 1 and the inner ring 2 is formed of ceramics such as silicon nitride, silicon carbide, zirconia and alumina. A hard film 6 is formed to the raceway surface of the bearing rings 1 and 2 along which the rolling elements 3 roll. The hard film comprises, for example, TiN, CrN, TiAlN or diamond-like carbon and a lubricating film 7 comprising a fluoro-containing a molybdenum disulfide, tungsten sulfide or fluoro-containing polymer having functional groups is formed on the surface of the hard film 6.

The titanium alloy is applied with a hardening treatment by a first or second method after machining into a predetermined shape for obtaining a hardness of Hv 350 or more by Vickers hardness.

The first method is a method of applying a solution treatment and an aging treatment to the titanium alloy to obtain a hardness of Hv 350 or more and the second method is a method of applying a gas nitridation treatment to the titanium alloy to obtain a hardness of Hv 350 or more.

In the first method, in a case where the titanium alloy is Ti-6Al-4V, the titanium alloy is placed in a temperature atmosphere at 950 to 1000° C. for one hour and, subsequently, the titanium alloy is water cooled to apply a solution treatment. Further, in a case where the titanium alloy is Ti-15Mo-5Zr-3Al or Ti-15Mo-5Zr-3Al, the titanium alloy is placed in a temperature atmosphere from 800 to 850° C. for about one hour and, subsequently, the titanium alloy is water cooled to apply a solution treatment.

In a case of precipitating the α phase of high hardness from the β phase of the titanium alloy, after the solution treatment, the titanium alloy is placed in a temperature atmosphere of 300 to 500° C. for about 3 to 40 hours to apply an aging treatment to the titanium alloy. The hardness of the titanium alloy is adjusted by controlling the time for the aging treatment. Cooling of the titanium alloy by the aging treatment is usually conducted by air cooling and for making the hardness of the titanium alloy harder, it is desirable to gradually cool the titanium alloy in the furnace in order to more finely precipitate the α phase from the β phase.

Figure 13:
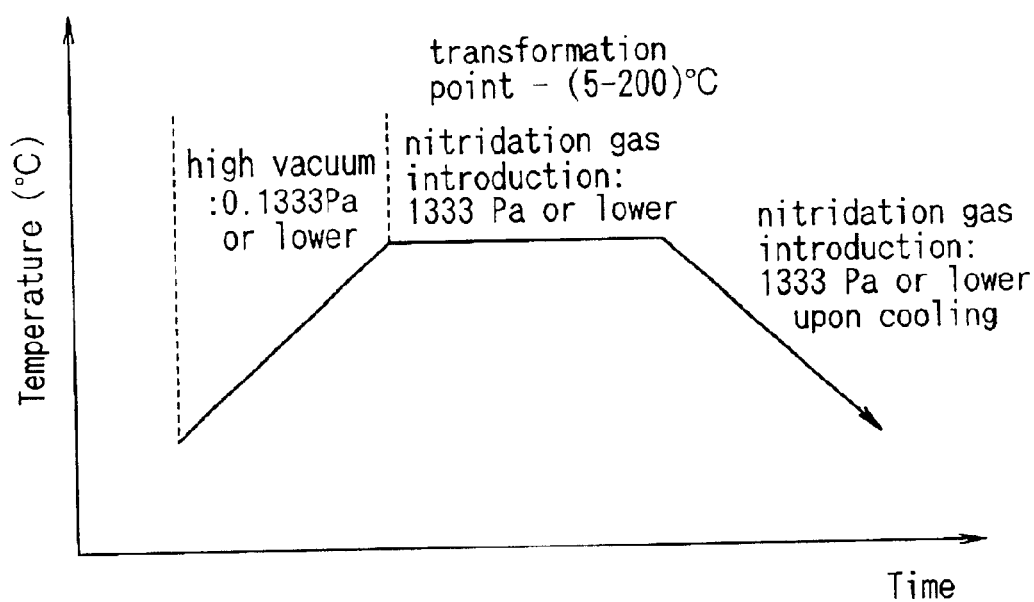
FIG. 13 is a view for explaining a gas nitridation treatment applied to a bearing ring made of a titanium alloy.

In a case of obtaining a hardness of Hv 350 or more by the second method, The titanium alloy is heated in a furnace under vacuum at a temperature lower than the transformation point in order to prevent oxidation on the surface of the titanium alloy. In this case, when the pressure in the furnace, exceeds 0.133 Pa, residual oxygen in the furnace and titanium react chemically to form an oxide layer on the surface of the titanium alloy that hinders the nitridation treatment. Accordingly, in a case of obtaining a hardness of Hv 350 or more by the nitridation treatment of the titanium alloy, the pressure in the furnace is lowered to 0.133 Pa or less as shown in FIG. 13.

When the nitridation treatment temperature for the titanium alloy is high, reactivity between titanium and nitrogen is favorable. The diffusion rate of nitrogen intruding into the titanium alloy increases therealong and, as a result, a nitrogen diffusion layer is formed to the surface of layer of the titanium alloy. However, when the nitridation treatment temperature is higher than the transformation point (temperature from α phase to β phase) or higher, crystal grains grow abruptly to give undesired effects on the fatigue strength of the bearing ring. Accordingly, when the titanium alloy is nitrided with a treating gas such as a nitrogen gas or $NH_3$, the nitridation treatment temperature is controlled to a temperature lower by about 5 to 200° C. than the transformation point.

In a case of nitriding the titanium alloy with a treating gas such as a nitrogen gas or $NH_3$, when the pressure of the treating gas is excessively high, nitridation on the surface of the titanium alloy proceeds rapidly to make the nitride layer formed on the surface of the titanium alloy coarse and brittle. In order to avoid this, it is desirable to control the gas pressure in the furnace to 1333 Pa or less. Further, also during cooling, it is desirable to conduct cooling in the furnace while keeping a predetermined gas pressure in order to prevent oxidation.

Then, a method of forming the hard film 6 to the raceway surface of the outer ring 1 and the inner ring 2 is to be explained.

The hard film 6 was formed by using a film deposition treatment apparatus utilizing an arc vapor deposition method (refer to FIG. 14). Specifically, a test bearing was placed on a turn table 42 having a rotational shaft 47. Then, the inside of a vacuum vessel 41 was evacuated by a vacuum pump 46 to condition the pressure to $1 \times 10^4$ Pa or less, under which DC bias was applied to a pair of cathodes 43 and 43 while introducing an Ar gas from a gas introduction port 44 to apply ion bombarding by Ar and apply cleaning for a work 48 (outer ring 1 and inner ring 2).

Then, the temperature of the work 48 was elevated to 400 to 500° C. and a Ti material in a case of forming a Ti series hard film 6 or a Cr material in a case of forming a Cr film hard film 6 are attached, respectively, to targets 49 and 50. Then, while rotating the turn table 42, a bias at −200 to −300 V, 80 to 150 A was applied to the targets 49 and 50.

Further, a nitrogen gas was introduced as a treating gas in a case of forming the nitride type hard film 6 or a methane gas ($CH_4$) was introduced as a treating gas in a case of forming the carbide type film 6 from the gas introduction port 45 and an identical DC bias was applied to the targets 49 and 50 while rotating the turn table 42.

By the procedures described above, the hard film 6 could be formed at least on the entire inner circumferential surface of the outer ring 1 and at least on the entire outer circumferential surface of the inner ring 2. The thickness of the hard film 6 was controlled by the treatment time. For those applied with the gas nitridation treatment, the nitrogen compound layer formed on the surface by the gas nitridation treatment was removed by finish polishing to expose the nitrogen diffusion layer to condition the surface hardness to Hv 550 or more, and a hard film 6 was formed to the upper layer thereof.

The method of forming the hard film 6 is not restricted to the method as described above but, for example, an HCD ion plating method, sputtering method, plasma CVD method or the like may be adopted.

Then, the result of evaluation for the peeling life of the hard film is to be explained. Bearings used were thrust ball bearings manufactured by the same method as described above (bearing No.: 51305).

Figure 15:
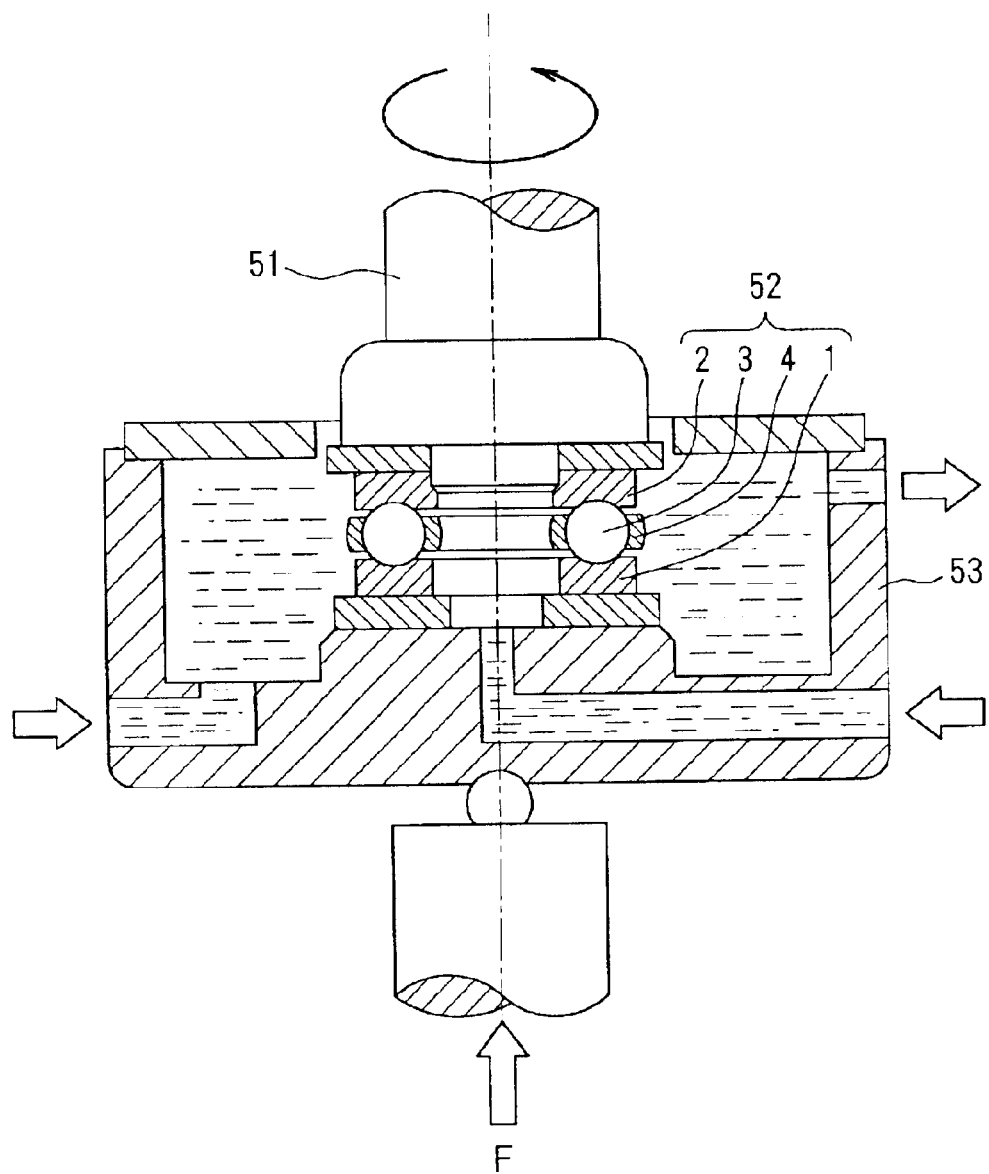
FIG. 15 is a cross sectional view of a test apparatus used upon testing durability of a thrust rolling bearing.

As shown in FIG. 15, a thrust ball bearing 12 comprising an outer ring 1, an inner ring 2, rolling elements 3 and a cage 4 was attached to a rotational shaft 51 of a thrust life testing machine and a rotation test was conducted in a state of filling a lubricant in a housing 53 under the conditions at a load of 9800 N, a rotational speed of 1000 rpm, using brass as the material of the cage, silicone nitride as the material of roiling element and #68 turbine oil (68 cSt/40° C.) as the lubricant.

Table 9 shows the surface hardness Hv for the base material of the outer ring 1 and the inner ring 2, the kind of the hard film and the result of peeling life, respectively.

TABLE 9

| | No. | Type of base material hardening | Hardness of base material surface | Hard film | Peeling life ratio |
|---|---|---|---|---|---|
| Example | 1 | A | 450 | TiN | 33 |
| | 2 | A | 500 | TiN | 52 |
| | 3 | A | 500 | TiAlN | 78 |
| | 4 | A | 500 | SiC + DLC | 45 |
| | 5 | B | 603 | TiN | 85 |
| | 6 | B | 889 | TiN | 83 |
| | 7 | B | 889 | TiAlN | 132 |
| | 8 | B | 889 | SiC + DLC | 111 |
| | 9 | A | 376 | TiN | 10.5 |
| | 10 | A | 376 | TiAlN | 13.2 |
| | 11 | A | 350 | TiN | 8.5 |
| | 12 | A | 350 | TiAlN | 10.1 |
| Comp. | 3' | None | 290 | TiN | 1 |
| Example | 4' | A | 290 | TiAlN | 1.8 |

A: Solution treatment + age hardening treatment
B: Gas nitridation

The base material for the outer ring 1 and the inner ring 2 in Table 9 is β type titanium alloy: Ti-15Mo-5Zr-3Al. For the judgment of the peeling life, the instance at which a vibration level detected by an acceleration pick up reached five times the initial value was defined as the life. Then, it is indicated as a comparative value based on the life of a raw material (base material not applied with hardening treatment) covered with a hard film comprising TiN (No. 1' in Table 9) being assumed as 1.

Figure 16:
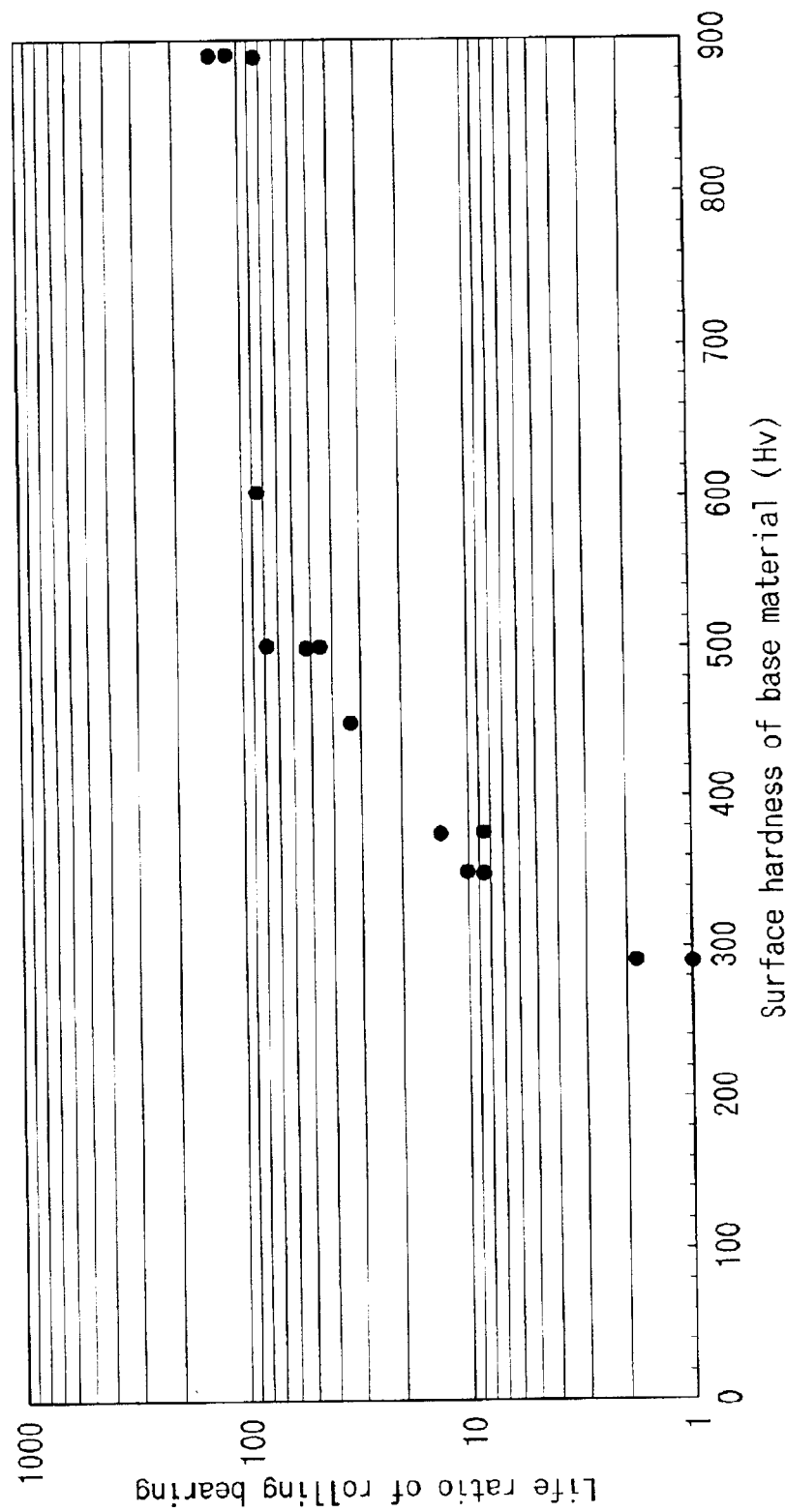
FIG. 16 is a view showing a relation between the surface hardness of bearing ring made of a titanium alloy and a peeling life of a hard film formed on the surface of the bearing ring.

FIG. 16 shows a relation between the surface hardness Hv of the base material and the peeling life of the hard film is shown. As can be seen from FIG. 16, when the surface hardness of the base material is Hv 350 or more, the peeling life of the hard film is improved and it was further improved at Hv 450 or more.

As can be seen from Table 9 and FIG. 16, Nos 1 to 12 corresponding to the examples of the present invention show larger values for the peeling life ratio of the hard film compared with No. 3' and No. 4' as the comparative examples. This is because the surface hardness of the raceway surface formed with the hard film is Hv 290 or less in the bearings No. 31 and No. 4', whereas the surface hardness of the raceway surface formed with the hard film is Hv 350 or more in the bearings Nos. 1 to 12.

Comparing Nos. 1 to 4 with Nos. 9 to 12 shown in Table 9, it can be seen that the peeling life ratio of Nos. 1 to 4 shows larger values than the peeling life ratio of Nos. 9 to 12. This is because the surface hardness of the raceway surface is Hv 376 or less in the bearings Nos. 9 to 12, whereas the surface hardness of the raceway surface is Hv 450 or more in the bearings Nos. 1 to 4.

Accordingly, durability of the hard film can be improved and early peeling or the like of the hard film can be prevented by increasing the surface hardness of the raceway surface formed with the hard film to Hv 350 or more preferably, Hv 450 or more.

Then, the result for the evaluation of the durability of rolling bearing in a vacuum atmosphere is to be explained. The bearing used is a deep groove ball bearing manufactured by the same method as described above (bearing number: 608, inner diameter 8 mm×outer diameter 22 mm×width 7 mm).

Figure 17:
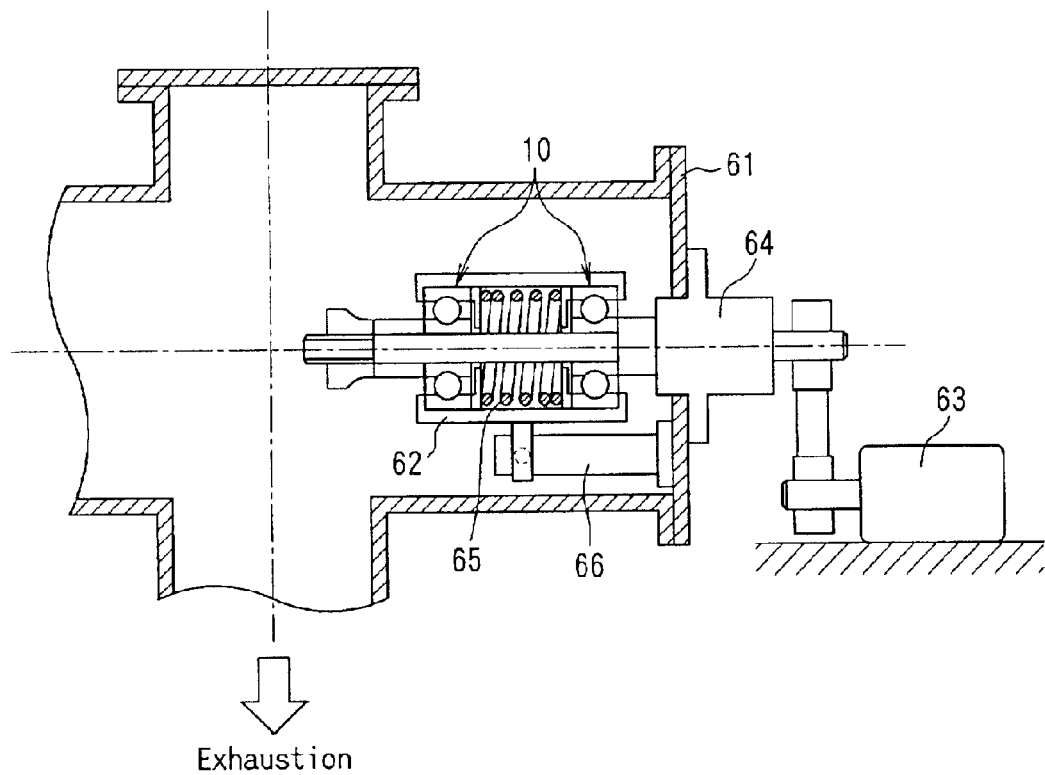
FIG. 17 is a schematic view of an apparatus for testing durability of a radial rolling bearing in vacuum.

A deep groove ball bearing having an outer ring 1, an inner ring 2 and rolling elements 3 was attached in a bearing housing 62 in a vacuum chamber 61 of a vacuum duration test apparatus (refer to FIG. 17) and duration test under vacuum atmosphere was conducted. Rotation of a motor 63 is introduced by way of a magnetic seal unit 64 to the test bearing 10. Further, the axial load is applied by a coil spring 65 to the test bearing 10 and the rotational torque of the test bearing 10 is measured by a leaf spring appended with a not illustrated strain gage. Further, inside of the vacuum chamber 61 is evacuated by a not illustrated turbo molecular pump and an ion pump.

The test conditions in this case are as shown below;

| Axial load | 49 N |
|---|---|
| Rotational speed | 1000 Rpm |
| Vacuum degree | $10^{-5}$ Pa or less |

Table 10 shows the kind of the base material for the outer ring 1 and the inner ring 2, the type of the hardening treatment applied to the base material, the surface hardness Hv of the base material, the kind of the hard film 6, the kind of the lubricating film 7, the material for the rolling element 3 and the life (result of vacuum duration test), respectively. "DFO" in the column for the kind of the lubricating film means a fluoro-containing polymer having functional groups. Further, the life was indicated by a relative value based on the life of a raw material (base material not applied with hardening treatment) covered with a hard film comprising TiN (No. 3' in Table 10) being assumed as 1.

TABLE 10

|  | No. | Material for base material | Hardening | Hardness of base material Hv | Kind of hard film | Kind of lubricant film | Material of rolling element | Life ratio |
|---|---|---|---|---|---|---|---|---|
| Example | 13 | Ti-6Al-4V | B | 554 | TiN | DFO | Silicon nitride | 42 |
|  | 14 | Ti-15Mo-5Zr-3Al | A | 450 | TiN | DFO | Silicon nitride | 48 |
|  | 15 | Ti-15Mo-5Zr-3Al | B | 603 | CrN | DFO | Silicon nitride | ≧100 |
|  | 16 | Ti-15Mo-5Zr-3Al | B | 603 | TiAlN | DFO | Silicon nitride | ≧100 |
|  | 17 | Ti-15Mo-5Zr-3Al | B | 603 | DLC | DFO | Silicon nitride | ≧100 |
|  | 18 | Ti-15Mo-5Zr-3Al | B | 603 | TiN | DFO | Zirconia | ≧100 |
|  | 19 | Ti-15Mo-5Zr-3Al | B | 603 | TiN | DFO | Silicon carbide | ≧100 |
|  | 20 | Ti-15Mo-5Zr-3Al | B | 603 | TiN | DFO | Alumina | ≧100 |
|  | 21 | Ti-15Mo-5Zr-3Al | B | 603 | TiN | DFO | 2) | ≧100 |
|  | 22 | Ti-15Mo-5Zr-3Al | B | 603 | DLC | $MoS_2$ | Silicon nitride | 35 |
|  | 23 | Ti-15Mo-5Zr-3Al | B | 603 | DLC | $WS_2$ | Silicon nitride | 41 |
|  | 24 | Ti-15Mo-5Zr-3Al | B | 603 | DLC | None | Silicon nitride | 22 |
|  | 25 | Ti-15Mo-5Zr | B | 667 | TiN | DFO | Silicon nitride | ≧100 |
|  | 26 | Ti-15Mo-5Zr | A | 552 | TiN | DFO | Silicon nitride | ≧100 |
|  | 27 | Ti-15Mo-5Zr-3Al | A | 376 | TiN | DFO | Silicon nitride | 33 |
|  | 28 | Ti-15Mo-5Zr-3Al | A | 376 | TiN | $MoS_2$ | Silicon nitride | 18 |
|  | 29 | Ti-15Mo-5Zr-3Al | A | 376 | TiN | $WS_2$ | Silicon nitride | 19 |
|  | 3' | Ti-15Mo-5Zr-3Al | None | 290 | TiN | DFO | Silicon nitride | 1 |
|  | 4' | Ti-15Mo-5Zr-3Al | B | 603 | None | DFO | Silicon nitride | 7.6 |

1) A: Solution treatment + age hardening treatment B: Gas nitridation treatment
2) Silicon nitride + TiN film As can be seen from Table 10, Nos. 13 to 29 corresponding to the examples of the present invention show larger values for the life ratio compared with No. 3' as the comparative example. This is because the surface hardness of the raceway surface is Hv 290 or less in bearing No. 3', whereas the surface hardness is Hv 350 or more for the raceway surface in bearings Nos. 13 to 29. Further, Nos. 13 to 29 corresponding to the examples of the present invention show larger values for the life ratio in vacuum compared with No. 4' as the comparative example. This is because a lubricating film is formed directly on the raceway surface of a bearing ring made of the titanium alloy in bearing No. 4', whereas the lubricating film is formed on the surface of the hard film formed on the raceway surface in the bearing Nos. 13 to 29.

Accordingly, it can be seen that a rolling bearing that can be used favorably for a long period of time even under a vacuum atmosphere where a lubricant such as grease can not be used can be obtained by forming the hard film on the raceway surface of the bearing ring made of the titanium alloy and forming the lubricant film on the surface of the hard film.

As the base material, Ti-6Al-4V of α+β type titanium alloy and Ti-15Mo-5Zr-3Al and Ti-15Mo-5Zr of β type titanium alloy are used, but the kind of the titanium alloys is not restricted to those described above and other kinds of titanium alloys may also be used so long as the surface hardness of the base material can be Hv 350 or more, preferably, Hv 450 or more.

Table 11 shows the conditions for the solution treatment and the conditions for the aging treatment for the bearing rings made of titanium alloys.

TABLE 11

| Symbol | Material for bearing ring | Solution treatment condition | Aging treatment condition |
|---|---|---|---|
| A | Ti-15Mo-5Zr-3Al | 730–850° C. × 1 Hr | 450° C. × 20 Hr |
| B | ↑ | 800–850° C. × 1 Hr | 450° C. × 20 Hr |
|  |  |  | 475° C. × 10 Hr |
| C | Ti-15Mo-5Zr | 730–850° C. × 2 Hr | 400° C. × 90 Hr |
| D | ↑ | 730–850° C. × 2 Hr | 450° C. × 20 Hr |
| E | Ti-15V-3Cr-3Sn-3Al | 730–850° C. × 3 Hr | 450° C. × 20 Hr |
| F | Ti-22V-4Al | 730–850° C. × 4 Hr | 450° C. × 20 Hr |
| G | Ti-6Al-4V | 900° C. × 1 Hr | 540° C. × 10 Hr |

Vacuum Rotation Test

Test bearings were manufactured by using bearing rings made of titanium alloys shown in Table 11 and rolling elements made of materials shown in Table 12 and a wear resistance test was conducted for each of the test bearings under vacuum. Specifically, the rotation test was conducted in vacuum for each of the test bearings under the conditions at an axial load of 19.6 N and at a rotational speed of 1000 rpm and in a lubrication state of no lubrication, and the amount of wear in each of the bearing rings after $1 \times 10^7$ rotation was calculated as [wear ratio] based on the ratio defining the amount of wear in No. 1' being assumed as 1.

Table 12 shows the test result of the vacuum rotation test.

TABLE 12

| | No. | Inner/outer ring | Material for rolling element | heat conductivity (W/m · K) | Wear ratio of bearing ring |
|---|---|---|---|---|---|
| Example | 1 | B | WC-6% Co | 62 | 0.42 |
| | 2 | B | WC-6% TiC-13% TaC-6% Co | 50 | 0.45 |
| | 3 | B | TiC-20% TiN-15% WC-10% Mo$_2$C-5% Ni | 35 | 0.52 |
| | 4 | B | TiC-25% TiN-15% WC-5% Mo$_2$C-15% Ni | 51 | 0.42 |
| | 5 | B | WC-6% TiC-13% TaC-6% Co | 43 | 0.48 |
| | 6 | A | WC-6% TiC-13% TaC-6% Co | 50 | 0.47 |
| | 7 | C | WC-6% TiC-13% TaC-6% Co | 50 | 0.44 |
| | 8 | D | TiC-20% TiN-15% WC-10% Mo$_2$C-5% Ni | 35 | 0.62 |
| | 9 | E | TiC-20% TiN-15% WC-10% Mo$_2$C-5% Ni | 35 | 0.63 |
| | 10 | F | WC-6% TiC-13% TaC-6% Co | 43 | 0.54 |
| | 11 | G | WC-6% TiC-13% TaC-6% Co | 43 | 0.51 |
| Comp. | 1' | C | Si$_3$N$_4$ | 31 | 1.00 |
| Example | 2' | C | WO-2% TaC-15% Co | 32 | 0.91 |
| | 3' | C | TiC-20% TiN-15% WC-12% Mo$_2$C-15% Ni | 29 | 0.82 |

The wear ratio for each of the bearing rings shown in Table 12 is a comparative value in a case of evaluation based on the wear amount of No. 1' being assumed as 1.

As can be seen from the test result of Table 12, Nos. 1 to 12 corresponding to the examples of the present invention show larger values for the life ratio compared with No. 1' as the comparative example. This is because the material for the rolling element of the rolling bearing No. 1' is SiN$_4$, whereas the material for the rolling element of the rolling bearings Nos. 1 to 12 is superhard alloy or cermet.

Further, the bearings Nos. 1 to 12 show larger values for the life ratio compared with No. 2' and No. 3' as the comparative examples. This is because the heat conductivity of the superhard alloy or cermet of the bearings No. 2' and No. 3' is 31 W/(m·K) or less, whereas the heat conductivity of the superhard alloy or cermet of the rolling bearings Nos. 1 to 12 is 35 W/(m·K) or more.

Accordingly, it can be seen that rolling bearings that can be used favorably for a long period of time even under a vacuum atmosphere can be obtained by forming the rolling element of the superhard alloy or cermet and increasing the heat conductivity of the superhard alloy or cermet to 35 W/(m·K) or more.

Figure 18:
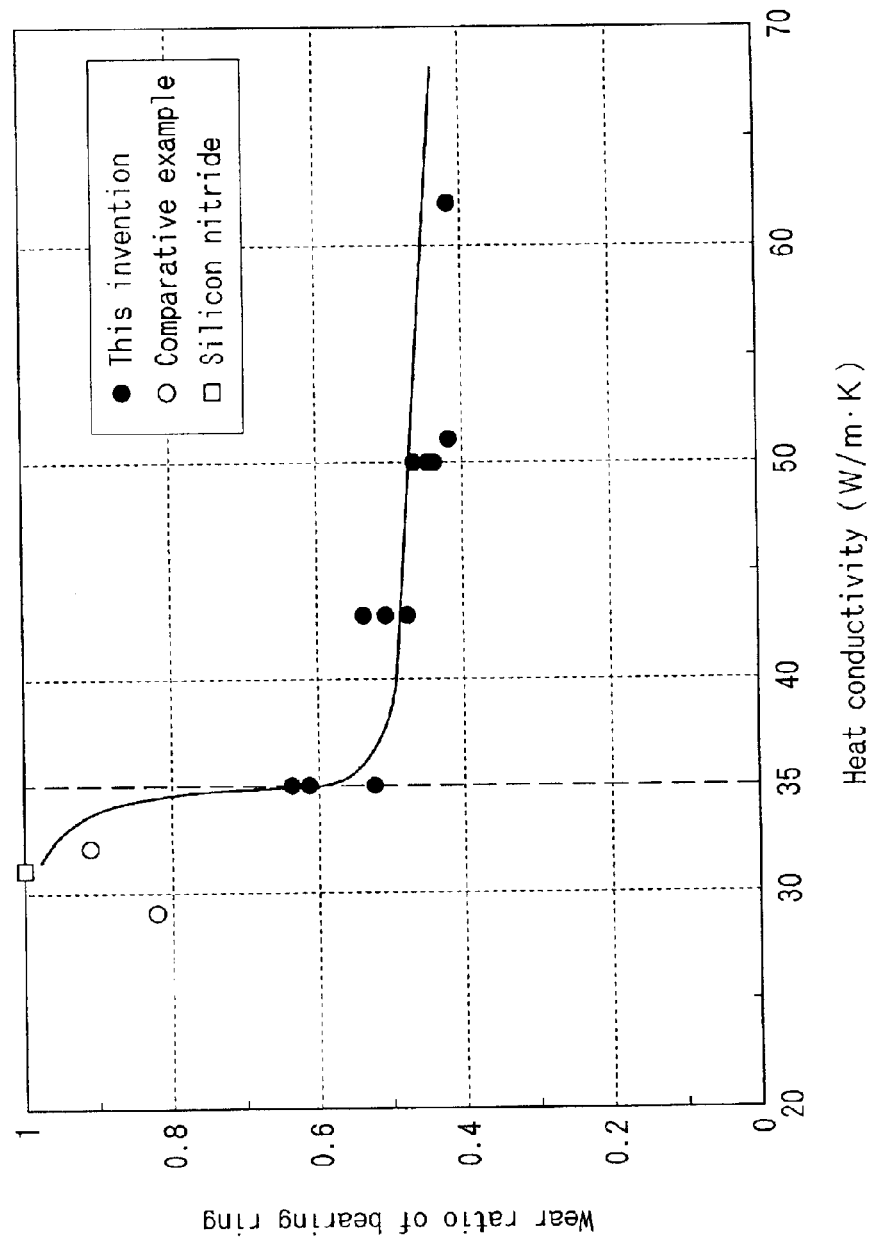
FIG. 18 is a view showing a relation between heat conductivity and a wearing ratio of a rolling element.

FIG. 18 shows a relation between the wear ratio shown in Table 12 and the heat conductivity of the superhard alloy or cermet. As shown in the figure, the wear ratio of the bearing ring made of the titanium alloy increases as the heat conductivity of the superhard alloy or cermet is higher till the heat conductivity reaches 50 W/(m·K), but the wear ratio of the bearing ring made of titanium does not increase so much even when the heat conductivity of the superhard alloy or the cermet increase when the heat conductivity exceeds 50 W/(m·K).

From the foregoings, it is desirable to set the heat conductivity of the superhard alloy or cermet within a range from 30 to 50 W/(m·K) in a case of forming the rolling element of the superhard alloy or cermet.

Rolling bearings for test were manufactured with the materials shown in Table 13 and the following salt water rolling test and a magnetic flux density change measuring test were conducted to each of the thus manufactured test bearings. In Table 13, the materials A, B, C and G for the bearing rings are materials shown in Table 11 and NR8 is WC-Ni series superhard alloy, NR 11 is WC—Ni—Cr series superhard alloy and DUX 30 is TiC—TaN—Ni—Mo series cermet as the material for the rolling element.

TABLE 13

| | No. | Material for bearing ring | Material for rolling element | Heat conductivity of rolling element (W/m · K) | Rolling test in salt water Bearing ring wear ratio | rusting | Change of magnetic flux density |
|---|---|---|---|---|---|---|---|
| Example | 12 | A | Superhard alloy NR8 | 75 | 0.38 | No | No |
| | 13 | B | ↑ | ↑ | 0.35 | No | No |
| | 14 | C | ↑ | ↑ | 0.31 | No | No |
| | 15 | D | ↑ | ↑ | 0.35 | No | No |
| | 16 | G | ↑ | ↑ | 0.41 | No | No |
| | 17 | A | Superhard alloy NR11 | 63 | 0.40 | No | No |
| | 18 | B | ↑ | ↑ | 0.36 | No | No |
| | 19 | C | ↑ | ↑ | 0.31 | No | No |
| | 20 | D | ↑ | ↑ | 0.38 | No | No |
| | 21 | G | ↑ | ↑ | 0.44 | No | No |
| | 22 | A | Cermet DUX30 | 35 | 0.50 | No | No |
| | 23 | B | ↑ | ↑ | 0.43 | No | No |
| | 24 | C | ↑ | ↑ | 0.49 | No | No |
| | 25 | D | ↑ | ↑ | 0.45 | No | No |

TABLE 13-continued

| | No. | Material for bearing ring | Material for rolling element | Heat conductivity of rolling element (W/m · K) | Rolling test in salt water Bearing ring wear ratio | rusting | Change of magnetic flux density |
|---|---|---|---|---|---|---|---|
| | 26 | G | ↑ | ↑ | 0.61 | No | No |
| Comp. Example | 4' | B | $Si_3N_4$ | 31 | 1.0 | No | No |

Rolling Test in Salt Water

Using the test apparatus shown in FIG. 2, a rolling life test in an aqueous NaCl solution at 5 wt % concentration was conducted for each of test bearings to examine the wear ratio and presence or absence of rusting in each of bearing rings. The test conditions in this case are as shown below;

| Radial Load | 49.2 N |
| Axial load | 19.2 N |
| Rotational speed | 1000 rpm |
| Lubrication | no lubrication |

Magnetic Flux Density Change Measuring Test

As shown in FIG. 5, after attaching a test bearing 10 to a rotational shaft 13 rotated in a magnetic field of a permanent magnet 16, the rotational shaft 13 was rotated at a speed of about 500 rpm and the change of the magnetic flux density was measured by a tesla meter 17. Then, those showing the output of the tesla meter of 0.1 Mt or more at the maximum were defined as with change of the magnetic flux density and those showing less than 0.1 Mt were defined as with no change of the magnetic flux density. Table 13 shows the test result. As can be seen from the test result in the table, Nos. 1 to 26 corresponding to the examples of the present invention showed excellent wear resistance even under corrosive circumstance in salt water and of course no rusting was observed. Further, since there was no change of the magnetic flux density at all, it was confirmed that they were excellent also in view of non-magnetic property.

Since the superhard alloy or cermet has high hardness (Hv 900 or more) and high melting point corresponding to ceramics, they cause less adhesion or wear even if the lubricating condition is stringent. Further, since they have high hardness, the amount of plastic deformation during working is very small and a small degree of unevenness is less caused. Therefore, rolling elements at an extremely high accuracy can be manufactured. Further, with respect to the toughness, since it is higher than that of ceramics, cracking or chipping is less caused during manufacture and they are less fractured against impact load.

By the use of the superhard alloy or cermet having the heat conductivity of 35 W/(m·K) or more as the material for the rolling element, the amount of heat generation at the face of contact between the bearing ring and the rolling element can be suppressed to suppress the adhesive wear of the bearing ring made of titanium alloy. Further, since the superhard alloy or cermet has a larger Young' modulus compared with ceramics, the area of contact between the rolling element and the bearing ring is reduced, so that the rotational torque can be suppressed to stabilize the rotational characteristics.

The superhard alloy and the cermet are alloys formed of nine kinds of metals belonging to the group IVa, the group Va and the group VIa of the periodical table, namely, W, Mo, Cr, Ta, Nb, V, Hf, Zr and Ti as targets by sinter bonding the powder of such carbides by using iron group metals such as Fe, Co and Ni. The cermets are sintered alloys formed by bonding mainly TiC, TiN or TiCN, among them, with Ni.

The superhard alloys when classified in accordance with alloy systems, include, for example, WC—Co series, WC—$Cr_3C_2$—Co system, WC—TaC—Co system, WC—TiC—Co series, WC—NbC—Co system, WC—TaC—NbC—Co series, WC—TiC—TaC—NbC—Co series, WC—TiC—TaC—Co series, WC—ZrC—Co series, WC—TiC—ZrC—Co series, WC—TaC—VC—Co series, WC—$Cr_3C_2$—Co series and WC—TiC—$Cr_3C_2$—Co series. Those improved with the corrosion resistance include, for example, WC—Ni series, WC—Co—Ni series, WC—$Cr_3C_2$—$Mo_2C$—Ni series, WC—Ti(C,N)—TaC series, WC—Ti(C,N) series and $Cr_3C_2$—Ni series.

A typical composition for the WC-Co series comprises W:Co:C=70.41–91.06:3.0–25.0:4.59–5.94. A typical composition of WC—TaC—NbC—Co series comprises W:Co:Ta:Nb:C= 65.7–86.3:5.8–25.0:1.4–3.1:0.3–1.5:4.7–5.8. A typical composition of the WC—TiC—TaC—NbC—Co series comprises W:Co:Ta:Ti:Nb:C= 65.0–75.3–6.0–10.7:5.2–7.2:3.2–11.0:1.6–2.4:6.2–7.6. A typical composition for the WC—TaC—Co series comprises W:Co:Ta:C=53.51–90.30:3.5–25.0:0.30–25.33:4.59–5.90. A typical example of the WC—TiC—Co series comprise W:Co:Ti:C=57.27–78.86:4.0–13.0:3.20–25.59:5.88–10.14. A typical example for the WC—TiC—TaC—Co comprises W:Co:Ta:Ti:C= 47.38–87.31:3.0–10.0:0.94–9.38:0.12–25.59:5.96–10.15.

The cermets include, for example, TiC—Ni series, TiC—Mo—Ni series, TiC—Co series, TiC—$MO_2C$—Ni series, TiC—$Mo_2C$—ZrC—Ni series, TiC—$MO_2C$—Co series, $Mo_2C$—Ni series Ti(C, N)—$MO_2C$—Ni series, TiC—TiN—$Mo_2C$—Ni series, TiC—TiN—$MO_2C$—Co series, TiC—TiN—$Mo_2C$—TaC—Ni series, TiC—TiN—$Mo_2C$—WC—TaC—Ni series, TiC—WC—Ni series, Ti(C,N)—WC—Ni series, TiC—Mo series, and Ti(C, N)—Mo series. Ti(C,N)—$MO_2C$—Ni series, Ti(C,N)—WC—Ni series or Ti(C,N)—Mo series is an alloy formed by sintering TiC—$Mo_2C$—Ni series, TiC—WC—Ni series or TiC—Mo series in a nitrogen gas ($N_2$).

The typical composition of the cermet comprises, for example, TiC-30% Ni, TiC-10% Mo-30% Ni, TiC-20% Mo-30% Ni, TiC-30% Mo-30% Ni, TiC-11% $MO_2C$ 11% $Mo_2C$-24% Ni, TiC-30% $MO_2C$-20% Ni, TiC-19% $Mo_2C$-24% Ni, TiC-8% $Mo_2C$-15% Ni, Ti(C,N)-25%$Mo_2C$-15%, TiC-14% TiN-19% $Mo_2C$-24% Ni, $TiC_{0.7}N_{0.3-11}$% $Mo_2C$-24% Ni, $TiC_{0.7}N_{0.3-19}$% $Mo_2C$-24% Ni, $TiC_{0.7}N_{0.3-27}$% $Mo_2C$-24% Ni, TiC-20% Mo-15% Ni, TiC-30% Mo-15% Ni.

High resistance and non-magnetic property can be coped with by the change of the ingredient systems of the superhard alloy or cermet of the rolling element. Further, in a case of using the rolling bearing according to the present invention for high speed rotation, it is desirable to use a cermet of low density as the material for the rolling element. Further in a case where a large load is applied or an impact load is given to the rolling bearing according to the present invention, it is desirable to use a superhard alloy of higher toughness as the material of the rolling element.

Rolling bearings for test (inner diameter: 12 mm, outer diameter: 28 mm, width: 8 mm, roll diameter: 4.76 mm, number of balls; 8) were measured with the materials shown in Table 14 and the following impact resistance test and the rolling life test were conducted to each of the thus manufactured test bearings.

(iii) After machining a material comprising Ti-15Mo-5Zr, it was applied with a solution treatment of keeping at 800 to 8500C for one hour and then water cooled. Then, an aging treatment of keeping at 450° C. for 20 hours and, subsequently, leaving in a furnace till 200° C. or lower was conducted. Then, grinding for finishing was conducted. Thus, an inner ring and an outer ring comprising a titanium alloy of a crystal tissue in which the α phase finer than that in (i) above was dispersed in a matrix comprising β phase and having a surface hardness of Hv 550–550 was obtained.

(iv) At first, a material comprising SUS 440C was machined into a predetermined shape. Then, after oil hardening under the conditions at a keeping temperature of 1000 to 1050° C. and at an oil temperature of 60° C., tempering was conducted under the conditions at 150 to 200° C. for 2 hours. Then, grinding for finishing was conducted. Thus, an

TABLE 14

| | No. | Inner ring and outer ring Material | Surface hardness | Rolling element Material | Surface hardening | Surface hardness | Impact resistance evalution value | Corrosion resistance evalution value |
|---|---|---|---|---|---|---|---|---|
| Example | 1 | Ti-6A1-4V | 425–430 | SUJ2 | Chromizing | 1050–1100 | 1.6 | 2.7 |
| | 2 | Ti-6A1-4V | 425–430 | 13% CrSUS | Nv nitridation | 1230–1350 | 1.7 | 3.0 |
| | 3 | Ti-15Mo-5Zr-3A1 | 475–480 | SUJ2 | Chromizing | 1050–1100 | 1.6 | 3.1 |
| | 4 | Ti-15Mo-5Zr-3A1 | 475–480 | 13% CrSUS | Nv nitridation | 1230–1350 | 1.8 | 3.6 |
| | 5 | Ti-15Mo-5Zr | 550–555 | SUJ2 | Chromizing | 1050–1100 | 1.7 | 2.9 |
| | 6 | Ti-15Mo-5Zr | 550–555 | 13% CrSUS | Nv nitridation | 1230–1350 | 1.7 | 3.5 |
| Comp. Example | 1' | SUS440C | 670–675 | $Si_3Ni_4$ | — | 1450–1570 | 1.0 | 1.0 |
| | 2' | SUS440C | 670–675 | SUJ2 | Chromizing | 1050–1100 | 1.0 | 1.0 |
| | 3' | SUS440C | 670–675 | 13% CrSUS | Nv nitridation | 1230–1350 | 1.2 | 1.1 |
| | 4' | Ti-6A1-4V | 425–430 | $Si_3Ni_4$ | — | 1450–1570 | 1.2 | 2.3 |
| | 5' | Ti-15Mo-5Zr-3A1 | 475–480 | $Si_3Ni_4$ | — | 1450–1570 | 1.3 | 2.6 |
| | 6' | Ti-15Mo-5Zr | 550–555 | $Si_3Ni_4$ | — | 1450–1570 | 1.2 | 2.5 |
| | 7' | Ti-6A1-4V | 425–430 | SUJ2 | No | 730–740 | 1.4 | 0.4 |
| | 8' | Ti-15Mo-5Zr-3A1 | 475–480 | 13% CrSUS | No | 720–730 | 1.6 | 1.3 |
| | 9' | Ti-15Mo-5Zr | 550–555 | 13% CrSUS | No | 720–730 | 1.5 | 1.2 |

The inner rings and the outer rings shown in Table 14 were obtained by any of the following methods (i) to (iv).

(i) At first, after machining a material comprising Ti-6Al-4V as the α+β type titanium alloy, it was applied with a solution treatment of keeping at 950 to 1000° C. for one hour and then water cooled. Then, an aging treatment of keeping at 450° C. for 20 hours and, subsequently, leaving in a furnace till 200° C. or lower was conducted. Then, grinding for finishing was conducted. Thus, an inner ring and an outer ring comprising a titanium alloy of a crystal tissue in which fine α phase was dispersed in a matrix comprising the β phase and having a surface hardness of Hv 425 to 430 were obtained.

(ii) At first, after machining a material comprising Ti-15Mo—SZr-3Al as the β type titanium alloy, it was applied with a solution treatment of keeping at 800 to 850° C. for one hour and then water cooled. Then, an aging treatment of keeping at 425° C. for 17 hours, and further keeping at 475° C. for 7 hours, subsequently, leaving in a furnace till 200° C. or lower was conducted. Then, grinding for finishing was conducted. Thus, an inner ring and an outer ring comprising a titanium alloy of a crystal tissue in which the α phase finer than that in (i) above was dispersed in a matrix comprising the β phase and having a surface hardness of Hv 475 to 480 was obtained.

inner ring and the outer rings comprising SUS 440C and having a surface hardness of Hv 670 to 675 was obtained.

Further, the rolling element was obtained in any of the following methods (v) to (ix) which was manufactured such that the deviation from spherical form was JIS grade G3 or higher, the surface roughness Ra was 0.003 μm or less and the inter diametrical difference was 0.05 μm or less.

(v) At first, after machining a material comprising SUJ2 (high carbon chromium bearing steel class 2) into a predetermined shape, the chromium diffusion penetration treatment (indicated as [chromizing] in Table 14) was conducted under the conditions at 980 to 1050° C. for 10 hours. Then, after conducting oil hardening under the condition at a keeping temperature of 830 to 850° C. and an oil temperature of 60° C., tempering was conducted under the conditions at 150 to 200° C. for 2 hours. Then, grinding for finishing was conducted. Thus, a ball formed at the surface with a chromium diffusion layer with a depth of 10 to 15 μm (size corresponding to 2 to 3% of ball diameter) and having a surface hardness of Hv 1050 to 1500 was obtained.

(vi) At first, a material comprising 13% Cr stainless steel (SUS) was machined into a predetermined shape. Then, after conducting oil hardening under the conditions at a keeping temperature of 1000 to 1050° C. and at an oil temperature of 60° C., tempering was conducted under the conditions at 150 to 200° C. 2 hours. Then, the Nv nitridation treatment described above (indicated as [Nv nitridation] in Table 14) was conducted under the conditions at 410 to 460° C. for 24 to 48 hours. Then, grinding for finishing was conducted. Thus, a ball formed at the surface with a chromium diffusion layer with a depth of 10 to 15 μm (size corresponding to 2 to 3% of ball diameter) and having a surface hardness of Hv 1230 to 1310 was obtained.

(vii) After machining a material comprising silicone nitride ($Si_3N_4$) into a predetermined shape, a grinding for finishing was conducted. Thus a ball having a hardness of Hv 1450 to 1570 was obtained.

(viii) At first, a material comprising SUJ 2 was machined into a predetermined shape. Then after conducting oil hardening under the conditions at a keeping temperature of 830 to 850° C. and at on oil temperature of 60° C., tempering was conducted under the conditions at 150 to 200° C. for 2 hours. Then, grinding for finishing was conducted. Thus, a ball comprising SUJ 2 and having a surface hardness HV 730 to 740 was obtained.

(ix) A material comprising 13% Cr stainless steel was machined into a predetermined shape. Then after conducting oil hardening under the conditions at a keeping temperature of 1000 to 1050° C. and at an oil temperature of 60° C., tempering was conducted under the conditions at 150 to 200° C. for 2 hours. Then, grinding for finishing was conducted. Thus, a ball comprising 13% Cr stainless steel and having a surface hardness Hv 720 to 730 was obtained.

Impact Resistance Test

An impact resistance test was conducted by the following method. At first, each of the test bearings was attached to the rotational shaft of an impact acceleration testing machine. Then, the test bearings were dropped from various heights in the axial direction (30–100 cm) in a state of attaching the rolling bearings and applying a preload at 9.6 N and the impact acceleration upon dropping was measured by an acceleration gage. The test bearing was rotated before and after the dropping to measure the axial vibration acceleration (G value).

After the measurement, the minimum dropping height at which the difference between the G value after dropping and the G value before dropping was 5 mG or more was examined and the impact resistance was judged according to the impact acceleration at the dropping height. The impact resistance evaluation value in Table 14 is a comparative value in a case of evaluation based on the test result for No. 1' (impact acceleration at the minimum dropping height where the difference of the G value before and after dropping was 5 mG or more) being assumed as 1.

Rolling Life Test

While rotating the test bearing under the following conditions, an aqueous solution of NaCl at 5 wt % solution was sprayed under the condition of 1 ml on every 1 min to the rolling bearing. The rotation was conducted while always measuring the axial vibratory acceleration (G value) and the corrosion resistant rolling life was defined as a time to reaching the G value five times as much as the initial value. The evaluation value for the corrosion resistance in Table 14 is a comparative value in a case of evaluation based on the test result for No. 1' (time to reach the G value five times as much as the initial value) being assumed as 1.

| <Rotation condition> | |
|---|---|
| Radial load | 78 N |
| Axial load | 20 N |
| Rotational speed | 1000 rpm |

The results are shown together in Table 14.

As can be seen from each of the test results in Table 14, Nos. 1 to 6 corresponding to the examples of the present invention showed larger values for both of the impact resistance and the corrosion resistance compared with Nos. 1' to 9' as the comparative examples.

For the titanium alloy, β type (also including near β type) or (α+β) type is preferably used. The hardness of the titanium alloys can be increased to Hv 400 to more by precipitation hardening of precipitating fine α phase in β phase by applying a solution treatment from a temperature just below or just above the α/β transformation point to form β phase and then applying an aging treatment at 350 to 600° C.

For the rolling element, the following constitution (a) or (b) is preferred;
(a) having a chromium diffusion layer as a corrosion resistant surface hardening layer by the application of a chromium diffusion penetration treatment as a surface hardening treatment after formed with a high carbon chromium bearing steel.
(b) having a dense and uniform nitride layer chromium diffusion layer as a corrosion resistant surface hardening layer by the application of a nitridation treatment as a surface hardening treatment after formed with iron and steel material containing 3.0% by weight or more (preferably, 8.0% by weight or more) of chromium.

The chromium diffusion penetration treatment (a) above is conducted, for example, as described below. At first, a material to be treated comprising high carbon chromium bearing steel and a chemical formulated from powdery chromium (Cr), powdery alumina ($Al_2O_3$) and powdery ammonium chloride ($NH_4Cl$) are tightly sealed in a steel case and the case is placed in a furnace. Then, the inside of the furnace is heated to 900–1100° C. and kept for a predetermined time while flowing a hydrogen ($H_2$) gas or argon (Ar) in the casing.

Thus, chemical is reacted in the case to form vapors of chromium chloride ($CrCl_2$). The chromium chloride conducts substitution reaction with atoms forming the surface of the material to be treated by which chromium diffuses and penetrates to the surface of the material to be treated. Alternatively, chromium formed by precipitation of chromium chloride by reduction with hydrogen diffuses and penetrates to the surface of the material to be treated. As a result, a chromium diffusion layer is formed on the surface of the material to be treated. The chromium diffusion layer has corrosion resistance and the surface hardness is Hv 1050 to 1100.

Since the hardness of the core is lowered when applying gradual cooling after the chromium diffusion and penetration treatment, it is preferred to harden the core by conducting hardening and tempering after the treatment.

The nitridation treatment (b) is conducted, for example, as described below. At first, fluoridation treatment was conducted to the material to be treated comprising iron and steel material having 3.0% by weight (preferably, 8.0% by weight or more) of chromium by using, for example, a nitrogen fluoride (NF$_3$) gas at 200 to 400° C. Then, a nitridation treatment is conducted by using an ammonia (NH$_3$) gas at 400 to 500° C. This method is referred to as an Nv nitridation treatment (registered trade mark of Air Water Co.).

In this method, an extremely dense and uniform nitride layer can be formed even when the nitridation treatment is conducted at a low temperature of 400 to 500° C. by applying a fluoridation treatment as the pretreatment. The nitride layer has corrosion resistance and a surface hardness of Hv 1230 to 1350. Further, fine deformations can be prevented from being formed on the surface of the material to be treated by applying the nitridation treatment at low temperature. Therefore, degradation of the dimensional accuracy of the rolling element by the surface hardening treatment is prevented.

The reason for using the iron and steel material having 3.0% by weight or more (preferably, from 8.0% by weight or more) of chromium is that the hardness for the surface hardening layer is increased to a necessary hardness for obtaining satisfactory wear resistance. That is, while the hardness of the surface hardening layer (b) can be improved by forming fine chromium nitride with chromium and nitrogen, a hardness required for obtaining a satisfactory wear resistance can not be obtained when the chromium content is less than 3.0% by weight.

Further, in order not to cause coarse eutectic carbides by the Nv nitridation treatment, it is preferred to use an iron and steel material capable of satisfying: [C (%)]≦−0.05 [Cr(%)]+1.41.

The thickness (depth) of the surface hardening layer (a) and (b) is preferably a size corresponding to 1.5 to 6% of the diameter for the rolling element and is 100 μm or less.

The Young's modulus of the surface hardening layer formed by the treatment (a) and (b) is substantially equal with the Young's modulus of the stainless steel or the bearing steel as the material to be treated (200–210 GPa), which is lower than the Young's modulus of 250 to 400 GPa of ceramics.

In the rolling bearing according to the present invention, the area of contact between the rolling element and the bearing ring is increased to decrease the contact face pressure compared with the rolling bearing described in Japanese Published Unexamined Patent Application Hei 11-223221. Accordingly, the sharing stress formed between the rolling element and the bearing ring during rotation is moderated to cause less rolling fatigue. Further, fine indentations are less caused to the rolling element and the bearing ring when an impact load is applied from the outside.

Figure 19:
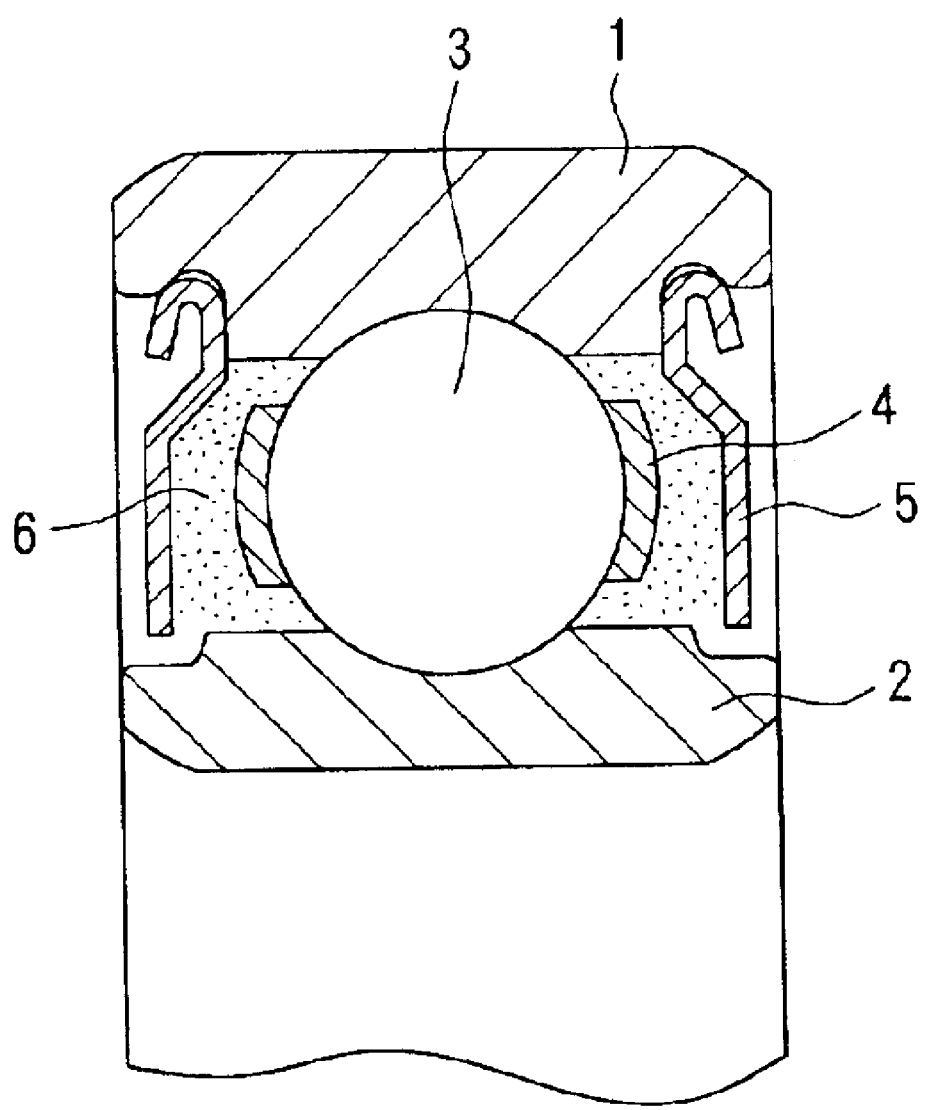
FIG. 19 is cross sectional view of a rolling bearing in another embodiment of this invention.

FIG. 19 shows a rolling bearing according to another embodiment of the present invention. As shown in the drawing, the rolling bearing of this embodiment comprises bearing rings 1 and 2 made of titanium alloy, rolling elements 3 interposed between the bearing rings 1 and 2, and a seal 5 sealed between the bearing rings 1 and 2 for preventing leakage of grease or intrusion of obstacles.

As the material for the bearing rings 1 and 2, a titanium alloy with a ratio of the hardness to the Young' modulus (H/E) of 3.7 or more is used and any of titanium alloys can be used suitably irrespective of their kinds so long as the titanium alloy can satisfy: 3.7≦(H/E). However, it is preferred to use α+β type or β type (also including near β type) titanium alloys capable of attaining high hardness by precipitation hardening by solution treatment and aging treatment. They include, for example, α+β type titanium alloy: Ti-6Al-4V or β type titanium alloy: Ti-24V-4Al, Ti-15V-3Cr-3Sn-3Al and Ti-15Mo-5Zr-3Al.

In this case, when the β phase is formed with the solution treatment and the α phase is precipitated to the soft β phase by the aging treatment, the hardness at least from the surface to 2.5% Da (Da; diameter for rolling element) can be set to Hv 420 or more thereby increasing (H/E) to 3.7 or more.

Further, for the rolling element 3 as the rolling element, a rolling element made of iron and steel material or ceramic material can be used.

However, when the corrosion resistance is required, it is preferred to use a rolling element made of stainless steel or ceramic as the rolling element 3. When reduction weight is required particularly, it is preferred to use a rolling element made of ceramics such as silicon nitride series, silicon carbide series, aluminum oxide series or zirconium oxide series. Further, in a case where a violent impact is loaded, it is preferred to use a rolling element made of iron and steel material constituted with high carbon chromium steel such as SUJ2, martensitic stainless steel such as SUS 440C, 13 Cr system or high speed steel represented by M50 which are excellent in toughness and having lower Young's modulus compared with ceramics.

Further, the grease to be sealed has no particular restriction and any of greases having a usable temperature range may be used.

The seal 5 has no particular restriction on the material and any material can be used so long as it is within a usable temperature range but a seal made of rubber such as nitrile rubber that is easily deformed elastically along with elastic deformation of the bearing rings 1 and 2 is used preferably.

Then, the operation and the like of the rolling bearing of the constitution described above are to be explained.

Since the bearing rings 1 and 2 are bearing rings made of titanium alloys, they have low Young's modulus and are easily deformed elastically. Accordingly, when impact is transmitted, for example, from axles to the bearing, since the bearing rings locally deform elastically to play a role of a spring that absorbs impact, impact transmitted to the machine main body is decreased. Accordingly, in such an application use as care-aid instruments such as a wheel chair, sports instruments such as a roller blade or bicycles in which impacts or vibrations are directly transmitted from axles to the instrument main body or user, since the impact or vibration is moderated by the use of the rolling bearings according to the present invention, it can be used suitably.

Further, since the material is made of titanium alloy and the ratio of the hardness to the Young' modulus (H/E) is set to 3.7 or more, the indentation resistance and the rolling life are improved. Accordingly, it can be used suitably even in a case where impact or vibration is loaded to the bearing or in a case where there is a worry that obstacles intrude into the bearings.

Furthermore, when the grease is used as the lubricant, since the grease functions as a damper for the vibration or impact, moderation of impact and vibration and indentation resistance are further improved.

While ball bearings are shown as the example of the rolling bearing in the embodiments described above, it may be a roller bearing.

The rolling bearing according to the present invention was manufactured by the method shown below. Grease was sealed as a lubricant.

For the bearing ring, one of α+β type titanium alloy (Ti-6Al-4V) or β type titanium alloy (Ti-15V-3Cr-3Sn-3Al, Ti-22v-4Al, Ti-15Mo-5Zr-3Al) was used to manufacture a bearing ring for the rolling bearing of bearing No. 6001. After machining, solution treatment and aging treatment were applied and then grinding was applied.

The solution treatment was conducted by the following method. That is, for the α+β titanium alloy: Ti-6Al-4V, the solution treatment was conducted by keeping at a temperature of 950 to 1000° C. for one hour and then water-cooling. Further, for the β type titanium alloys: Ti-15V-3Cr-3Sn-3Al, Ti-22V-4Al and Ti-15Mo-5Zr-3Al, the solution treatment was conducted by keeping at a temperature of 750 to 850° C. for one hour and water-cooling.

For the aging treatment, after keeping at a temperature of 400° C. to 600° C. for 6 to 30 hours, cooling in the furnace was conducted down to 200° C. to conduct the aging treatment.

element 3 made of silicon nitride having a diameter of 4.76 mm was pressed against the raceway surface of the bearing ring (outer ring 1) cut into ¼ and a load at 980N was loaded to the raceway surface of the bearing ring 1 by way of the rolling element 3 in this state. Then, the maximum depth of the indentation formed to the raceway surface at a portion applied with the load was measured.

Figure 20:
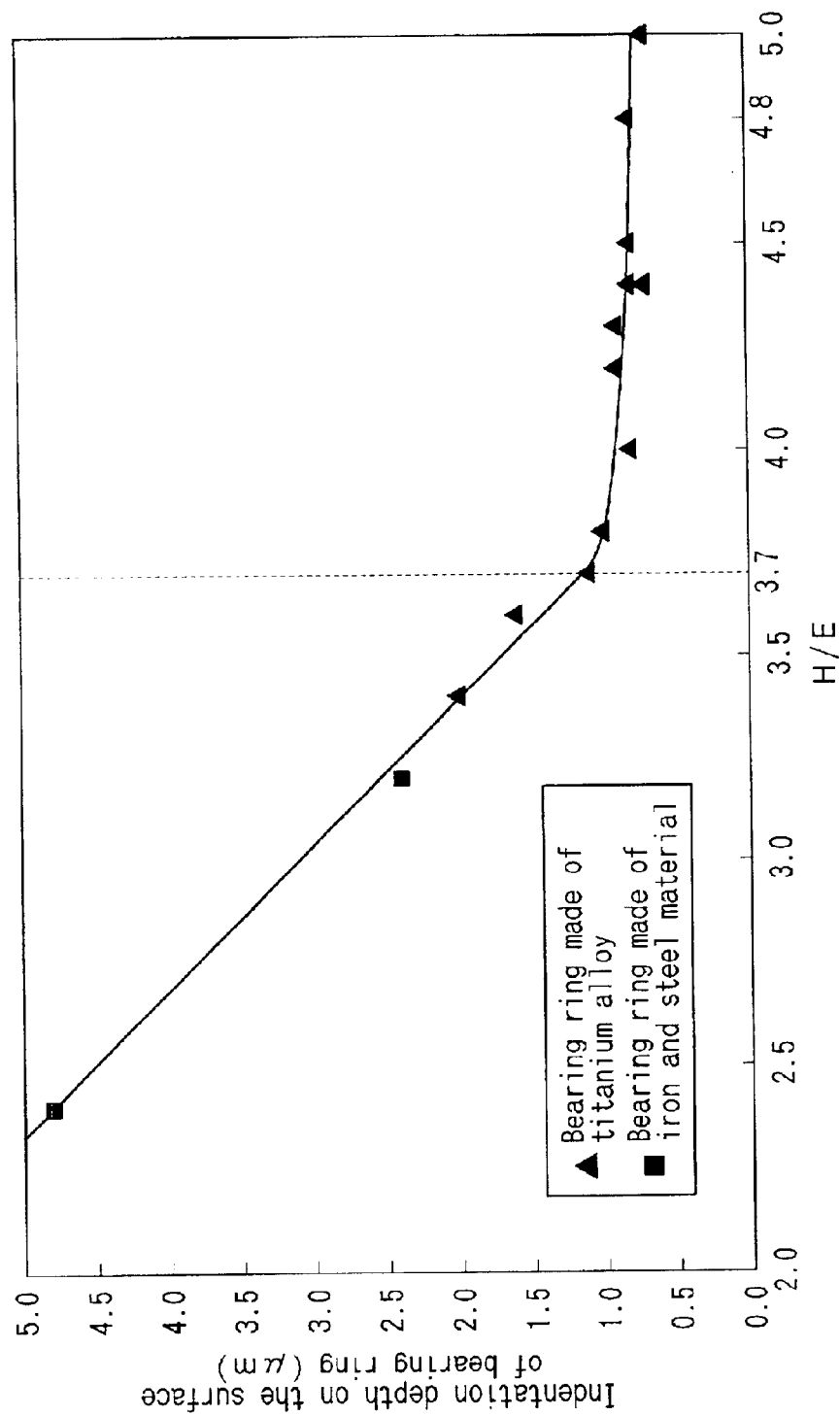
FIG. 20 is a view showing a relation between indentation resistance test and H/E of a rolling bearing.

Table 15 shows the test results for the indentation resistance test (indentation depth) and FIG. 20 shows a relation between the test result of the indentation resistance test and H/E.

TABLE 15

| | No. | Material for bearing ring | Material for rolling element | 2–5% Da hardness H (Hv) | Young's modulus E (GPa) | H/E | Indentation depth (µm) | Rolling life ratio |
|---|---|---|---|---|---|---|---|---|
| Example | 1 | Ti-6Al-4V | Alumina ceramics | 421 | 113 | 3.7 | 1.1 | 2.4 |
| | 2 | Ti-6Al-4V | 13Cr stainless steel | 434 | 113 | 3.8 | 1.0 | 2.5 |
| | 3 | Ti-15V-3Cr-3Sn-3Al | Silicon carbide ceramics | 436 | 109 | 4.0 | 0.8 | 2.4 |
| | 4 | Ti-22V-4Al | Silicon nitride ceramics | 440 | 105 | 4.2 | 0.9 | 2.6 |
| | 5 | Ti-22V-4Al | 13Cr stainless steel | 463 | 105 | 4.4 | 0.8 | 2.7 |
| | 6 | Ti-15Mo-5Zr-3Al | Alumina ceramics | 473 | 109 | 4.3 | 0.9 | 2.6 |
| | 7 | Ti-15Mo-5Zr-3Al | 13Cr stainless steel | 483 | 109 | 4.4 | 0.7 | 2.8 |
| | 8 | Ti-15Mo-5Zr-3Al | Silicon carbide ceramics | 495 | 109 | 4.5 | 0.8 | 2.8 |
| | 9 | Ti-15Mo-5Zr-3Al | Silicon nitride ceramics | 519 | 109 | 4.8 | 0.8 | 2.6 |
| | 10 | Ti-15Mo-5Zr-3Al | Zirconia ceramics | 548 | 110 | 5.0 | 0.7 | 2.7 |
| Comp. Example | 1' | Ti-6Al-4V | Silicon nitride ceramics | 385 | 113 | 3.4 | 2.0 | 2.0 |
| | 2' | Ti-22V-4Al | 13Cr stainless steel | 405 | 111 | 3.6 | 1.6 | 1.9 |
| | 3' | SUS440 | 13Cr stainless steel | 667 | 210 | 3.2 | 2.4 | 1.7 |
| | 4' | SUS630 | Silicon nitride ceramics | 485 | 200 | 2.4 | 4.8 | 1.0 |

For the rolling element, a rolling element made of ceramics such as, silicon nitride series, silicon carbide series, zirconium oxide series and aluminum oxide series and a rolling element made of 13% Cr system martensitic stainless steel were used.

A mineral oil type grease is used for the grease. Further, nitrile rubber seal was used for the seal 5 and a case made of polyamide was used for the cage.

Further, as comparative examples, bearing rings were manufactured with martensitic stainless steel (SUS440C) and precipitation hardening type stainless steel (SUS 630). The martensitic stainless steel (SUS 440c) was applied with oil hardening from a temperature of 900 to 950° C. and applied with tempering at 150 to 200° C. The precipitation hardening type stainless steel (SUS 630) was applied with a solution treatment at a temperature from 920–970° C. and applied with an aging treatment at 450–500° C.

For each of the rolling bearings manufactured under the conditions described above, an indentation resistance test and a rolling type test were conducted.

Indentation Resistance Test

For the indentation resistance test, an outer ring 1 made of titanium alloy cut into ¼ size was used. A spherical rolling As can be seen from Table 15 and FIG. 20, Nos. 1 to 10 corresponding to the examples of the present invention show smaller values for the depth of indentations formed on the raceway surface compared with Nos. 1' to 4' as the comparative examples. This is because the ratio of the hardness to the Young's modulus (H/E) of the material for the bearing ring is 2.4 to 3.6 in the bearings Nos. 1 to 4', whereas the ratio of the hardness to the Young's modulus (H/E) for the material of the bearing ring is 3.7 or more in Nos. 1 to 10.

Rolling Life Test

A rolling life test was conducted by the following method. At first, an initial vibration value of the bearing is measured when the inner ring is rotated under the conditions at a number of rotation of 500 rpm, a radial load of 69N and an axial load of 20N. Then, the rolling bearing is detached from a rolling life testing machine and the bearing is dropped from 1 m height in a state of applying a preload of 20 N with the end face of the rolling bearing being directed to the surface of the floor. Subsequently, the bearing is again set to the rolling life testing machine and the vibration value of the bearing when the inner ring is rotated under the same conditions as described above is measured. Then, the instance that the measured value exceeds five times the initial vibration value was evaluated as the rolling life.

Figure 21:
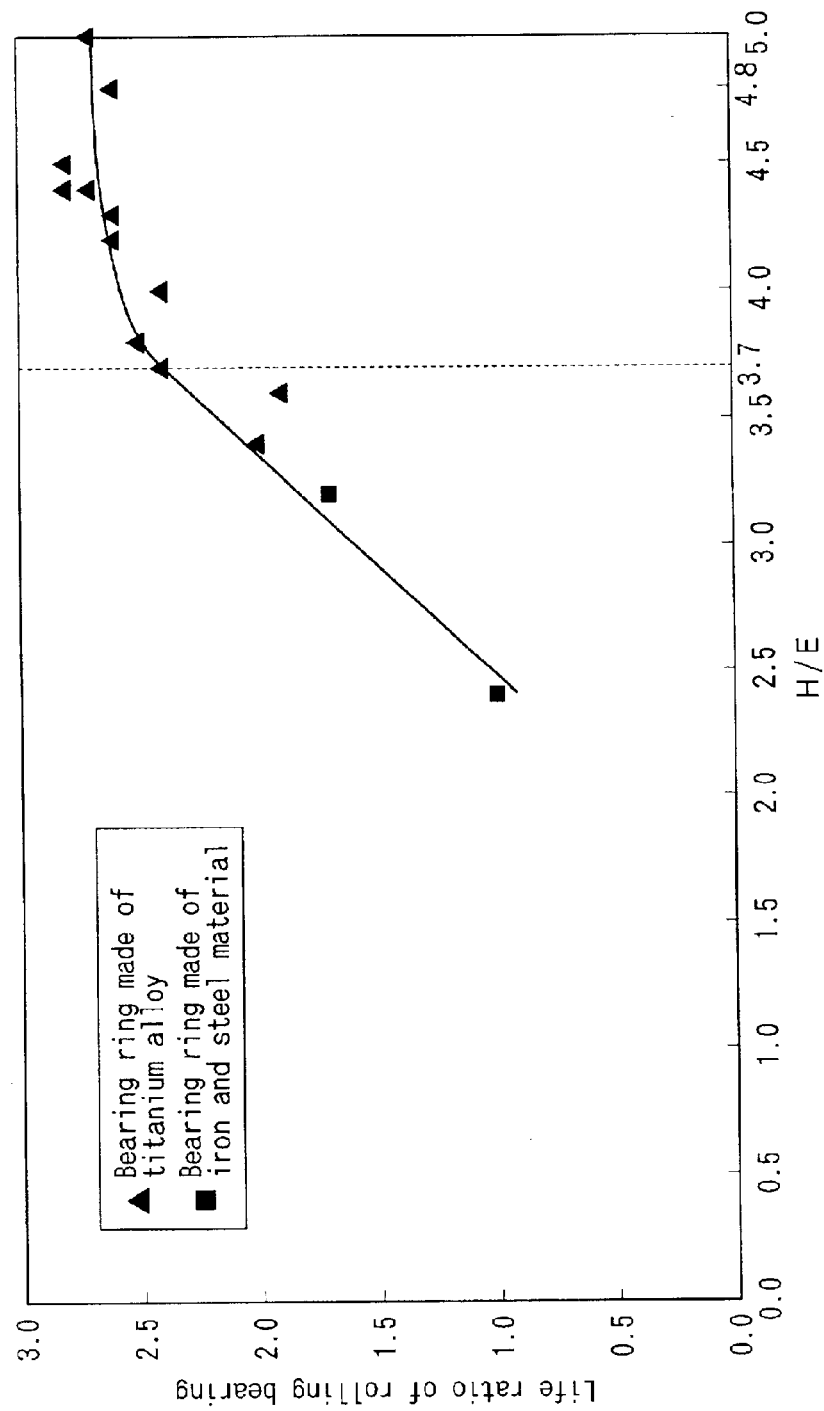
FIG. 21 is a view showing a relation between rolling life test and H/E of a rolling bearing.

FIG. 15 shows the test result of the rolling life test (rolling life ratio) and FIG. 21 shows a relation between the test results of the rolling life test and H/E. the roiling life ratios in Table 15 and FIG. 21 are comparative values when evaluation is made based on the rolling life of No. 4' being assumed as 1.

As can be seen from Table 15 and FIG. 21, Nos. 1 to 10 corresponding to the examples of the present invention show larger values for the rolling life ratio compared with Nos. 1' to 4' as the comparative examples. This is because the ratio of the hardness to the Young's modulus (H/E) for the material of the bearing ring is 2.4 to 3.6 in the bearings Nos. 1' to 4', whereas the ratio of the hardness to the Young's modulus (H/E) for the material of the bearing ring is 3.7 or more in the bearings Nos. 1 to 10.

Accordingly, it is possible to improve the impact resistance and the wear resistance of the bearing ring made of the titanium alloy by increasing H/E of the bearing ring made of the titanium alloy as: $3.7 \leq (H/E)$.

Further, as apparent from the result of the indent resistance test and the rolling life test as described above, there is no substantial difference in the effect between a case where H/E is 3.7 to 4.8 and exceeds 4.8 and since heat treatment or shot peening is required for increasing the H/E value and the cost is increased by so much, H/E is preferably within a range from 3.7 to 4.8 for the bearing ring made of the titanium alloy.

Figure 22:
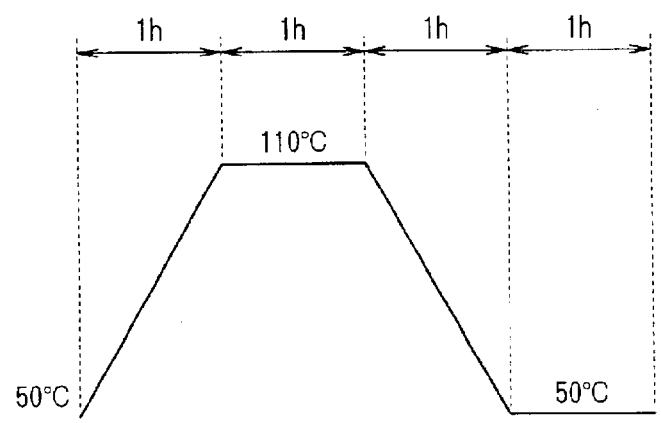
FIG. 22 is a view showing a fluctuation pattern of circumstantial temperature.

Rolling bearings for test were manufactured with the materials shown in Table 16 and the following rolling life test was conducted as below for each of the test bearings. That is, the vibration values were measured when the inner ring for each of the test bearings was rotated under the conditions at a radial load of 49N and a rotational speed of 1000 m$^{-1}$ and the rolling life of the bearing was evaluated as an instance that the measured value reached twice the initial vibration value just after starting the rotation. In this case, the circumstantial temperature was changed in accordance with the pattern shown in FIG. 22.

In a case where the material for the bearing ring is made of Ti-6Al-4V, a titanium alloy after applied with a solution treatment at a temperature of 920 to 1000° c. and then applied with an aging treatment at a temperature of 450 to 550° C. was used as shown in Table 16. Further, in a case where the material for the bearing ring was made of Ti-15Mo-5Zr-3Al, a titanium alloy applied with a solution treatment at a temperature of 770 to 850° C. and then applied with an aging treatment at a temperature of 400 to 500° C. for 10 to 60 hours was used. Further, in a case where the material of the bearing ring was made of Ti-22V-4Al, a titanium alloy applied with a solution treatment at a temperature of 700 to 800° C. and then applied with an aging treatment at a temperature of 400 to 500° C. for 5 to 40 hours was used. Cooling in the solution treatment was conducted by water-cooling and cooling in the aging treatment was conducted by furnace cooling.

TABLE 16

|  | No. | Inner ring/outer ring | Rolling element | $\alpha_2/\alpha_1$ | Rolling life ratio |
|---|---|---|---|---|---|
| Example | 1 | Ti-6Al-4V | Silicone carbide ceramics | 0.4 | 2.0 |
|  | 2 | Ti-6Al-4V | Zirconia ceramics | 1.2 | 2.6 |
|  | 3 | Ti-15Mo-5Zr-3Al | WC—Co superhard alloy | 0.7 | 2.5 |
|  | 4 | Ti-15Mo-5Zr-3Al | Silicon carbide ceramics | 0.5 | 2.1 |
|  | 5 | Ti-15Mo-5Zr-3Al | Alumina ceramics | 0.9 | 2.8 |
|  | 6 | Ti-15Mo-5Zr-3Al | Zirconia ceramics | 1.3 | 2.3 |
|  | 7 | Ti-22V-4Al | TiC—Ni cermet | 0.9 | 2.5 |
|  | 8 | Ti-22V-4Al | Alumina ceramics | 0.9 | 2.7 |
| Comp. Example | 1' | Ti-GAl-4V | Silicon nitride ceramics | 0.3 | 1.0 |
|  | 2' | Ti-15Mo-5Zr-3Al | SUJ2 | 1.4 | 1.2 |
|  | 3' | Ti-22V-4Al | SUJ2 | 1.5 | 0.9 |
|  | 4' | Beryllium copper | Silicon carbide ceramics | 0.2 | 0.3 |
|  | 5' | Beryllium copper | WC—Co superhard alloy | 0.3 | 0.5 |
|  | 6' | SUS630 | Silicon nitride ceramics | 0.3 | 1.2 |

Figure 23:
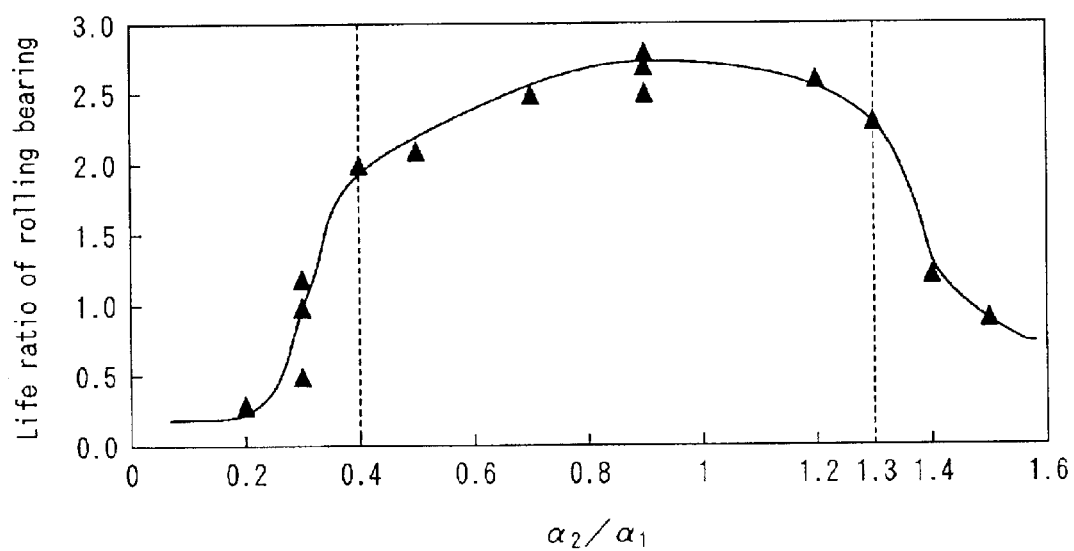
FIG. 23 is a view showing the relation between the ratio of the linear expansion coefficient of a bearing ring and a linear expansion coefficient of a rolling element and a rolling life of a rolling bearing.

Table 16 shows the test result of the rolling life test (rolling life ratio) and FIG. 23 shows a relation between the test results of the rolling life test and the linear expansion coefficient ratio $\alpha_2/\alpha_1$ ($\alpha_1$: linear expansion coefficient of the material for the bearing ring, $\alpha_2$: linear expansion coefficient of the material for the rolling element). The rolling life ratio in Table 16 and FIG. 23 are comparative values when evaluated based on the rolling life for No. 1' being assumed as 1.

As can be seen from Table 16 and FIG. 23, Nos. 1 to 8 corresponding to the examples of the present invention show larger values for the rolling life ratio compared with Nos. 2' and 3' as the comparative examples. This is because the linear expansion coefficient ratio between the material for the bearing ring and the material for the rolling element is: $\alpha_2/\alpha_1 \geq 1.4$ in Nos. 2' and 3', whereas the linear expansion coefficient ratio between the material for the bearing ring and the material for the rolling element is: $\alpha_2/\alpha_1 \leq 1.3$ in Nos. 1 to 8. Further, Nos. 1 to 8 corresponding to the examples of the present invention show larger values for the rolling life ratio compared with Nos. 1', 4' to 6' as the comparative examples. This is because the linear expansion coefficient ratio between the material for the bearing ring and the material for the rolling element is: $\alpha_2/\alpha_1 \leq 0.3$ in Nos. 1' and 4' to 6', whereas the linear expansion coefficient ratio between the material for the bearing ring and the material for the rolling element is: $\alpha_2/\alpha_1 \geq 0.4$ in. Nos. 1 to 8.

Accordingly, it can be seen that rolling life of excellent durability can be obtained even in a circumstance where circumstantial temperature varies greatly by setting the linear expansion coefficient ratio between the material for the bearing ring and the material for the rolling element as $0.4 \leq \alpha_2/\alpha_1 \leq 1.3$. Further, since change for the gap in the bearing and preload and fitting stress can be moderated by setting the linear expansion coefficient ratio between the material for the bearing ring and the material for the rolling element to $0.4 \leq \alpha_2/\alpha_1 \leq 1.3$, the rotational performance of the bearing is stabilized even when the circumstantial temperature fluctuates.

Figure 24:
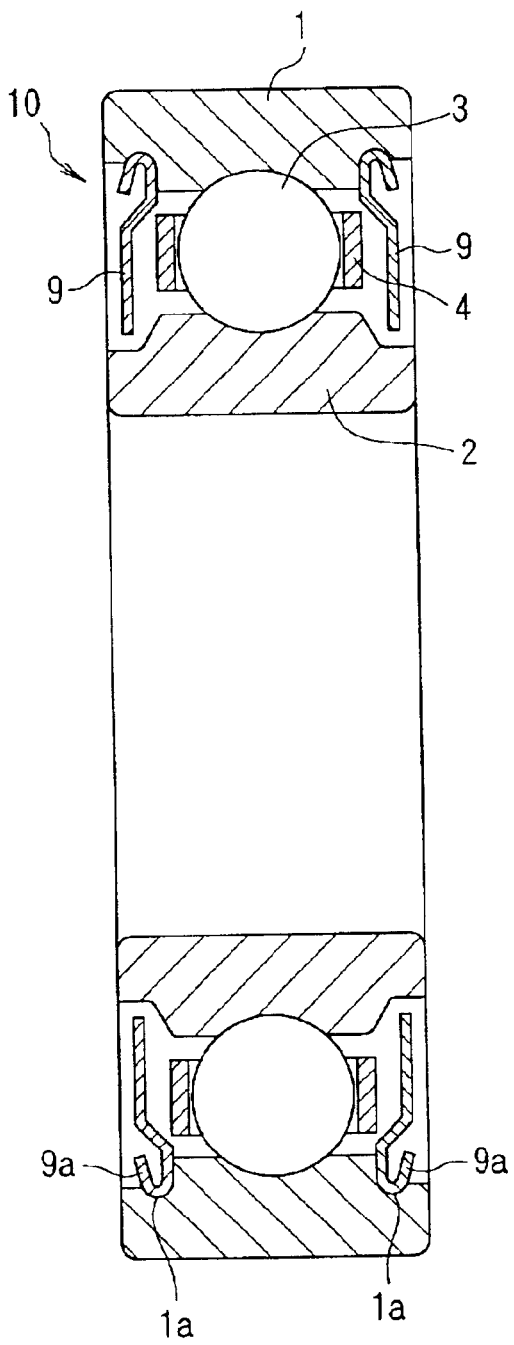
FIG. 24 is a cross sectional view of a rolling bearing as an other embodiment according to this invention.

FIG. 24 shows a further embodiment of the rolling bearing according to the present invention. In the drawing, the rolling bearing comprises an inner ring 2 externally fitted and secured to the outer circumferential surface of a shaft to be supported (not illustrated), an outer ring 1 disposed to the outer circumference of the inner ring 2 and plural spherical rolling elements 3 disposed rotationally between the outer ring 1 and the inner ring 2 and a cage 4 for holding the spherical rolling elements 3 in an equi-distance relative to the circumferential direction of the rolling rings 11 and 12. Shield plates 9 are disposed on both axial ends of the bearing rings 11 and 12 for closing the open space formed on both sides of the rolling element 3.

In this embodiment, the inner ring 1 and the outer ring 1 each comprises a titanium alloy having a hardness of Hv 420 or more (for example, $\alpha+\beta$ type titanium alloy, near $\beta$ type titanium alloy and $\beta$ type titanium alloy) with the specific permeability being 1.001 or less. The rolling element 3 comprises ceramics such as electroconductive zirconia or silicon nitride, preferably, electroconductive ceramics with the specific permeability being 1.001 or less.

The cage 4 is formed, for providing the cage itself with an electric insulation and self lubricancy, for example, by adding a solid lubricant such as PTFE, MAC, graphite, N-lauro L-lysin, hBN and fluoro mica to a resin material, for example, fluoro-containing resin, PEEK, PEEK-PBI, PPS, TPI, PEN, PFA, ETFE, FEP, PCTFE, ECTFE and PVDF.

The shield plate 9 comprises titanium at a purity of 99.5% or higher and the specific permeability of the shield plate 9 is 1.001 or less. Further, the shield plate 9 is formed as a ring, and fitting portions 9a that fit detachably to shield plate holding grooves 1a and 1a formed to the inner circumferential surface of the outer ring 1 are formed to the outer circumferential surface of the plate.

As described above, when the inner ring 2 and the outer ring 1 are formed of the titanium alloy and the rolling element 3 is formed of ceramics, the specific permeability of the inner ring 2, the outer ring 1 and the rolling element 3 is 1.001 or less. Thus, since the magnetic flux density at the periphery of the bearing does not change greatly by the rotation of the inner ring 2 or the outer ring 1, it can be used to equipments using electron beams such as wafer inspection apparatus. Further, when the shield plate 9 is formed of titanium at a purity of 99.5% or higher, the specific permeability of the shield plate 9 is 1.001 or less. Thus, since electron beams irradiated to the rolling element 4 or the cage 4 can be shielded by the shield plate 9, charge up of the rolling element 3 by the electron beams can be prevented to prevent occurrence of halation. Further, when the resin of the cage 4 is formed with a resin, since the specific permeability of the cage 4 is 1.001 or less, and the cage 4 is not charged up by electron beams when it is irradiated by the electron beams, occurrence of halation can be prevented. Further, since a solid lubricant is added in the resin constituting the cage 4 to provide the cage 4 with self-lubricancy, the cage itself functions as a lubricant and it can be used preferably even in a vacuum atmosphere where the use of lubricant or grease is difficult.

Rolling bearings for test shown in Table 17 were manufactured and the following magnetic flux density change measuring test and the bearing wear test were conducted to each of the manufactured test bearings. As the titanium alloy (material for inner and outer rings) shown in Table 17, those applied with the solution treatment and the aging treatment under the conditions shown in Table 18 were used.

TABLE 17

|  | No. | Material for inner ring/outer ring material | Rolling element | Material for shield plate | Material for cage | Change of magnetic field | Halation upon electron irradiation | Outer diametrical surface wear ratio |
|---|---|---|---|---|---|---|---|---|
| Example | 1 | Ti-15Mo-5Zr-3Al | Conductive zirconia | Pure Ti (JIS 2nd type) | Fluoro resin | No | No | 0.22 |
|  | 2 | Ti-15Mo-5Zr-3Al | Silicon nitride | ↑ | ↑ | No | No | 0.18 |
|  | 3 | Ti-15Mo-5Zr-3Al (oxidation) | Silicon nitride | ↑ | ↑ | No | No | 0.12 |
|  | 4 | Ti-15Mo-5Zr-3Al | Silicon nitride (Ti film) | ↑ | ↑ | No | No | 0.18 |
|  | 5 | Ti-15Mo-5Zr-3Al | Alumina ceramics (TiN film) | ↑ | ↑ | No | No | 0.19 |
|  | 6 | Ti-15V-3Cr-3Sn-3Al | Conductive zirconia | ↑ | ↑ | No | No | 0.22 |
|  | 7 | Ti-22V-4Al | Silicon nitride | ↑ | ↑ | No | No | 0.25 |
|  | 8 | Ti-6Al-4V | Silicon nitride | ↑ | ↑ | No | No | 0.19 |
|  | 9 | Ti-22V-4Al | Silicon nitride (TiN film) | ↑ | ↑ | No | No | 0.24 |

TABLE 17-continued

| | No. | Material for inner ring/outer ring material | Rolling element | Material for shield plate | Material for cage | Change of magnetic field | Halation upon electron irradiation | Outer diametrical surface wear ratio |
|---|---|---|---|---|---|---|---|---|
| | 10 | Ti-6Al-4V | Silicon nitride TiN film | ↑ | ↑ | No | No | 0.29 |
| Comp. Example | 1' | Ti-15Mo-5Zr-3Al | Silicon nitride | — | Fluoro resin | No | Present | 0.23 |
| | 2' | Ti-15Mo-5Zr-3Al | Silicon nitride | SUS 304 | Fluoro resin | present | No | 0.21 |
| | 3' | Ti-22V-4Al | Silicon nitride | SPCC | Fluoro resin | Present | No | 0.20 |
| | 4' | Ti-15V-3Cr-3Sn-3Al | Silicon nitride | Pure Ti (JIS 2nd type) | SUS 304 | Present | No | 0.23 |
| | 5' | Ti-15V-3Cr-3Sn-3Al | Silicon nitride | Pure Ti (JIS 2nd type) | SPCC | Present | No | 0.22 |
| | 6' | Be—Cu | Be—Cu | Be—Cu | Be—Cu | No | No | 1.00 |

TABLE 18

| Kind | Solution condition | Aging condition |
|---|---|---|
| Ti-15V-3Cr-3Sn-3Al | 750–800° C. × 1 Hr (water cooling) | Atmospheric air: 450° C. × 20 Hr (gradual cooling) |
| Ti-22V-4Al | 750–800° C. × 1 Hr (water cooling) | Atmospheric air: 450° C. × 20 Hr (gradual cooling) |
| Ti-6Al-4V | 950–1000° C. × 1 Hr (water cooling) | Atmospheric air: 400° C.– 500° C. × 20 Hr (air cooling) |
| Ti-15Mo-5Zr-3Al (Oxidation) | 735–850° C. × 1 Hr (water cooling) | Atmospheric air: 425° C. × 20 Hr (gradual cooling) + Atmospheric air: 475° C. × 7 Hr (gradual cooling) |
| Ti-15Mo-5Zr-3Al | 735–850° C. × 1 Hr (water cooling) | Vacuum: 425° C. × 20 Hr (gradual cooling + Vacuum: 475° C. × 7 Hr (gradual cooling) |

Magnetic Flux Density Change Measuring Test

A magnetic flux density change measuring test was conducted by the following method. That is, as shown in FIG. 5, after attaching a test bearing 10 to a rotational shaft 13 disposed in magnetic fields of a permanent magnet 16, the rotational shaft 13 was rotated at a speed of about 200 rpm during which the change of magnetic flux density was measured by a tesla meter 17. Then, for the maximum output of the tesla meter shown in FIG. 6, those showing 0.1 mT or more are evaluated as with change of the magnetic flux density and those with less than 0.1 mT were evaluated as with no change of the magnetic flux density.

Bearing Wear Test

Figure 25:
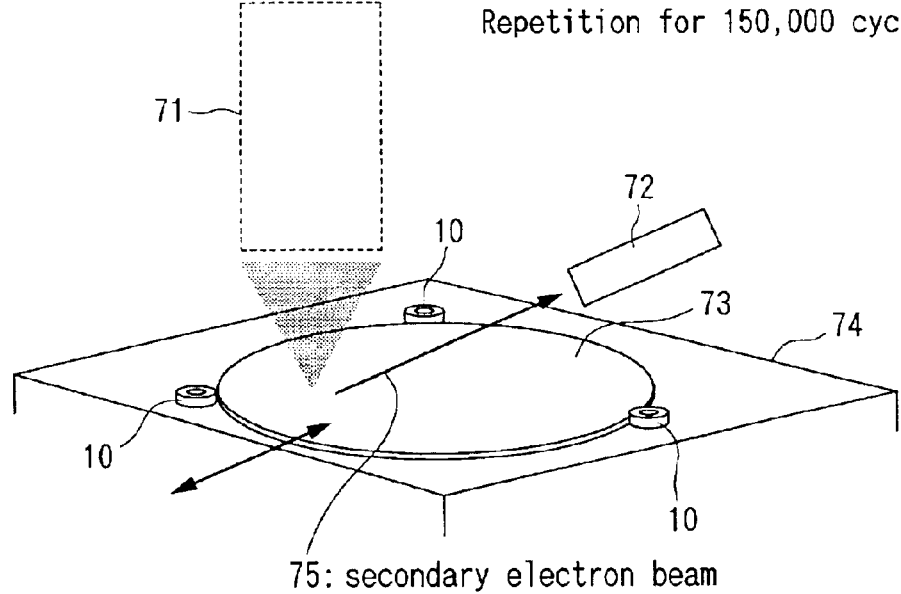
FIG. 25 is a schematic view of a testing apparatus for testing wear resistance of a rolling bearing.

A bearing wear test was conducted by the following method. That is, as shown in FIG. 25, a silicon wafer 33 was supported by three test bearings 10 and the silicon wafer 33 was loaded and unloaded while irradiating electron beams from an electron gun 32 to the silicon wafer 33. Then, after repeating loading/unloading of the silicon wafer 33 for 150,000 cycles, the amount of wear for the outer ring of the test bearing 10 was measured. Simultaneously, absence or presence for the occurrence of halation at the portion of the rolling bearing in a case of irradiating electron beams was confirmed by a detector 31.

Table 17 shows the test results for the magnetic flux density change measuring test and the bearing wear test. The wear ratio as the result of the bearing wear test in Table 17 is a comparative value in a case of evaluation based on the amount of wear in the outer ring of No. 6' being assumed as 1.

As can be seen from the test result in Table 17, Nos. 1 to 10 as the examples of the present invention show smaller values for the wear amount on the surface of the outer ring compared with No. 6'. This is because the bearing ring of No. 6' is formed of beryllium copper, whereas the bearing ring of Nos. 1 to 10 are formed of titanium alloys harder than beryllium copper.

Further, Nos. 1 to 10 as the examples of the present invention show smaller values for the change of the magnetic flux density compared with Nos 4' and 5' as the comparative examples. This is because the cage for Nos. 4' and 5' are formed of iron and steel materials such as SUS 304 and SPCC, whereas the cage for Nos. 1 to 10 are formed of resins such as fluoro resin.

Further, Nos. 1 to 10 as the examples of the present invention show smaller values of the probability for the occurrence of halation due to electron beams compared with Nos. 2' and 3'. This is because the shield plate of the bearings for 2' and 3' are formed of iron and steel materials such as SUS 304 and SPCC, whereas the shield plate for the bearings of Nos. 1 to 10 are formed of titanium at a purity of 99.5% or higher.

Accordingly, it can be seen that a rolling bearing which can be used suitably in a circumstance where corrosion resistance and non-magnetic property are required by forming the rolling element with ceramics, forming the cage with the resin and forming the shield plate with titanium at a purity of 99.5% or higher.

Nos. 4, 5, 8 as the examples of the present inventions are examples of forming a hard film such as of TiN on the surface of a rolling element made of ceramics and electroconductivity can be ensured by forming the hard film such as of TiN on the surface of the rolling element made of ceramics.

As the kind of the titanium alloys used as the constituent material for the bearing ring, titanium alloys hardened by aging treatment (for example, α+β type titanium alloy, near β type titanium alloy and β type titanium alloy) are preferred and they can include, specifically, Ti-6Al-4V, Ti-62 46, Ti-15Mo-5Zr-3Al, Ti-22V-4Al, Ti-15Mo-3Cr-3Sn-3Al. In addition, any of titanium alloys having a hardness of Hv 420 or more by age-hardening treatment can be used suitably.

When more excellent seizure resistance and wear resistance are required, the sliding property on the surface of the bearing ring can further be improved by heating the titanium alloy in atmospheric air to apply oxidation thereby forming an oxide layer comprising TiOx (0<x<2) on the surface of the titanium alloy. In this case, when the temperature for the oxidation treatment is set to 400 to 500° C., which is the temperature for the aging treatment, the age-hardening treatment and the oxidation treatment can be conducted simultaneously, as well as the oxide layer formed within this temperature range becomes highly dense and the close adhesion can be improved preferably. Further when the titanium alloy is applied with the solution treatment at a temperature of 700 to 1000° C. and further applied with oxidation treatment after polishing, an oxide film can be formed on the rolling surface of the bearing ring of the titanium alloy. In this case, a further preferred sliding property can be obtained by applying super finishing to the rolling surface of the bearing ring made of the titanium alloy and then applying the oxidation treatment.

In equipments utilizing electron beams such as a wafer inspection apparatus, it is required to form an surrounding atmosphere to a high vacuum atmosphere of $10^{-4}$ Pa or higher. Therefore, in the rolling bearing used in equipments that utilize electron beams, a lubricating oil or grease can not be used as the lubricant. When the cage is formed of a resin having a self-lubricity, the lubricating property can be enhanced to improve the ware resistance of the rolling bearing. Further, when the cage is formed of a resin, the specific permeability of the cage is 1.001 or less, so that the magnetic flux density does not change greatly depending on the material of the cage and it is suitable for use in semiconductor manufacturing apparatus utilizing electron beams.

As the material for the cage, fluoro-containing resin, polyether ether ketone (PEEK), copolymer of polyether ether ketone and polybenzoimidazole (PEEK-PBI), polyphenylene sulfide (PPS), thermoplastic polyimide (TPI), polyether nitrile (PEN), thermoplastic aromatic polyamideimide, tetrafluoroethylene-perfluoro alkylvinyl ether copolymer (PFA), tetrafluoroethylene-ethylene polymer (ETFE), tetrafluroethylene-hexafluoropropylene copolymer (FEP), polychlorotrifluoroethylene (PCTFE), chlorotrifluoroethylene-ethylene copolymer (PCTFE) and polyvinylidene fluoride (PVDF) are suitable.

As the solid lubricant to be added to the resin described above, at least one of tetrafluoroethylene resin powder (PTFE), graphite, hexagonal boron nitride (hBN), fluoro mica, melamine cyanurate (MCA), amino acid compound having layered crystal tissue (N-lauro-L-lysine), fluoro graphite, fluoro pitch, molybdenum disulfide ($MoS_2$), tungsten disulfide ($WS_2$) can be used. Among them, PTFE, MAC, graphite, N-lauro-L-lysine, hBN and fluoro mica used alone or in a combination of two or more of them are more preferred in view of lubricity.

Since the ceramics forming the rolling element and the resin forming the cage are insulative material, when insulators are present at the wafer supporting portion of a semiconductor manufacturing apparatus, particularly, within a range which is visible as images near the electron beams, the rolling element or the cage which is an insulator is charged up to cause halation.

Further, in the bearing for supporting the wafer, if the bearing itself has no electroconductivity, since current does not flow to the inside of the bearing, no desired images can be obtained, for example, in a case of length measuring SEM. Accordingly, the ceramics used as the constituent material for the rolling element desirably have electroconductivity and, specifically, electroconductive zirconia series ceramics are suitable.

Further, in a case of insulative ceramics such as silicon nitride series ceramics and alumina series ceramics, ceramic coating films such as of TiN, TiC, TiCN, TiAlN having conductivity is preferably applied to the surface of the rolling element by a coating treatment such as PVC (Physical Vapor Deposition), CVD (Chemical Vapor Deposition) and the like.

On the other hand, regarding the cage, it gives no effects on the conductivity of the bearing but since it is an insulator as described above, halation occurs upon irradiation of electron beams. Further, since the resin material for the cage is difficult to be applied with the film deposition treatment, charge up can not be prevented by the conductive ceramic coating as in the case of the rolling element. In view of the above, when the rolling bearing used in equipments utilizing electron beams is constituted as a shield type rolling bearing having a metal shield plate, since the portion of the cage is concealed by the shield plate, occurrence of halation due to electron beams can be prevented.

Further, also in a case of using insulative ceramics to the rolling element, occurrence of halation can be prevented with no effects on the peripheral magnetic fields by using a shield plate made of pure titanium.

Since the shield plate is manufactured by press molding, plastic fabrication at a room temperature is required. The material used for the shield plate has been austenitic stainless steel typically represented by SUS 304 and cold rolled steel plates (JIS SPCC, SPCD, SPCE) but any of them is a material mainly comprising steel, the specific permeability is 1.001 or more which gives undesired effects on the peripheral magnetic fields.

On the other hand, when the shield plate is formed of titanium at a purity of 99.5% or higher, the specific permeability of the shield plate is 1.001 or less. Thus, since the rotation of the shield plate does not cause such a change of the magnetic flux density as flexing the electron beam in the peripheral magnetic fields, it is suitable as a shield plate for the rolling bearing used near the electron beam generation portion. Since pure titanium has excellent cold moldability, a thin plate can be manufactured and since it can be fabricated by press molding, the shield plate can be manufactured at a reduced cost.

As the titanium used for the shield plate material, any of JIS classes 1 to 4 can be used suitably, with first and second classes of less impurity content being particularly preferred in view of the press moldability.

Suitable application use of the rolling device according to the present invention described above is as shown below.

Non Magnetic Property

Along with the trend of increasing the integration degree in semiconductor devices, dimensional reduction of integrated circuit patterns formed to the wafer has been proceeded. While laser beams have been utilized, for example, in semiconductor production apparatus or wafer inspection apparatus but higher resolution power has been required along with the dimensional reduction of the circuit pattern and the system has now been shifted to apparatus utilizing electron beams at a shorter wavelength and having higher resolution than the laser beams.

Electron beams are easily deflected even by slight magnetic fields to lower the writing accuracy and inspection accuracy of wafers. Therefore, along with the use of electron beams, a requirement for the non-magnetic property of the rolling bearing used, for example, in the wafer transportation stage or a wafer supporting portion has been increased. In such semiconductor production apparatus utilizing the electron beams, when a rolling bearing made of non-magnetic stainless steel having a specific permeability of about 1.01 to 1.1 is used, since it gives effects on the electron beams and causes fluctuation of the magnetic fields, a rolling bearing made of beryllium copper with a specific permeability of 1.001 or less is used.

Since the titanium alloy is a completely non-magnetic material with the specific permeability of 1.001 or less, it is suitable as a constituent material for the rolling bearing or linear guide used in the semiconductor production apparatus utilizing electron beams.

In a case of using the rolling bearing or the linear guide in the vicinity of an electron gun as an electron generation source, since the rotational motion of the rolling bearing or the linear motion of the linear guide causes fluctuation in the magnetic field to deflect the electron beams, it is necessary that the specific permeability of the rolling bearing or the linear guide is reduced to 1.001 or less.

The semiconductor production apparatus utilizing the electron beams can include specifically, for example, length measuring SEM, stepper, electron beam lithography system, and wafer defect inspection apparatus and the rolling device according to the present invention can be used suitably, for example, in a wafer supporting holder or a stage moving portion of the apparatus described above.

Further, the measuring apparatus utilizing the electron beams can include, specifically, a rotational portion of spectralized crystals or a specimen stage of an electron probe micro analyzer (EPMA), scanning electron microscope (SEM), focusing ion beam FIB, transmission electron microscope (TEM), ESCA and Auger electron spectroscopic apparatus, and the rolling device according to the present invention can be used suitably, for example, to an operating portion near the electron generation source.

Further, the semiconductor production apparatus using magnetic fields can include, for example, an etching apparatus of applying a voltage under magnetic fields by an powerful permanent magnet, and the rolling device according to the present invention can be used suitably, for example, to a joint portion of a conveyor robot arm for conveying wafers in the chamber.

The rolling bearing used in strong magnetic fields, for example, the rolling bearing for supporting axle used near a super electroconductive magnet of a linear motor car rotates while intersecting the strong magnetic fields from a superelectroconductive magnet during rotation of the axle. Accordingly, when the rolling bearing is made of ferroelectric material such as martensitic steel, it may be a worry that eddy current is caused to generate heat in the rolling element or the bearing ring of the bearing and bring about seizure along with temperature elevation.

It is necessary that the bearing used in such strong magnetic fields be formed as non-magnetic material. The bearing ring of the rolling bearing according to the present invention is formed of the titanium alloy and has a lower specific permeability than that of the non-magnetic steel. Accordingly, it causes less eddy current and can be used suitably.

The rolling bearing used in a nuclear magnetic resonance diagnostic apparatus lowers the inspection accuracy by the fluctuation of magnetic fields along with rotation of the bearing. Since the bearing ring made of the titanium alloy in the rolling bearing according to the present invention is completely non-magnetic with the specific permeability being 1.001 or less, it can be used suitably, for example, in the rolling portion of the nuclear magnetic resonance diagnostic apparatus.

Corrosion Resistance

In a case of a rolling device such as a rolling bearing, a linear moving guide device or a ball screw used, for example, in a wafer cleaning apparatus, an alkaline solution such as an ammonia solution or a strongly acidic solution is used for the cleaning of the semiconductor wafer. Accordingly, intrusion of impurities into the semiconductor manufacturing steps due to the scattering of the alkaline solution or strongly acidic solution or exposure in the vapors thereof results in a significant problem. Further, since a corrosive gas is used in the etching apparatus, the corrosion resistance is required.

Since the rolling device according to the present invention has a sufficient corrosion resistance even in an alkaline solution such as an ammonia solution, it is possible to provide a bacteriocidal property by the titanium oxide coating.

In the same manner, since corrosive chemicals are used in photographic developing machines in the developing step or the fixing step, the rolling bearing according as the present invention can be used suitably also to the bearings for supporting transportation conveyors in the photographic developing machine or as the bearing used in the pump for supplementing chemicals.

Reduced Weight—Compact Resistance/Young's Modulus

Since the bearing ring made of the titanium alloy of the rolling bearing according to the present invention has a specific gravity of about ⅔ for that of the steel, the weight of the bearing ring can be reduced.

Since a hand piece in dental equipments for conducting drilling or cutting, since a dental cutting tool attached to a shaft is used while being rotated at a super-high speed of 300,000 rpm or higher, a reduced weight and quietness are required. Accordingly, reduced weight and low noise are required also for the bearing used in the hand piece of the dental equipments.

Since the bearing ring made of the titanium alloy has a specific gravity as low as about ⅔ for that of the steel, the weight of the hand piece is reduced. Further, since the rotational torque of the bearing is reduced and the noise can be reduced, the rolling bearing according to the present invention can be used suitably as a rolling bearing for use in the dental hand piece.

Further, in driving motors, high power motors are used so that the number of a rotation reaches the maximum number of rotation in a short period of time and driving motors having a great reserve in the power for actually required power upon conducting cutting or the like at the maximum number of rotation are used.

For decreasing the power of the driving motor, it may be considered to reduce the rising time from start up to the maximum number of rotation, to decrease the maximum number of rotation or to decrease the inertia of the rotational shaft that is rotationally driven by the driving motor. However, since the working efficiency is reduced when the rising time is made longer or the maximum number of rotation is kept lower, it is most effective to decrease the inertia of the rotational shaft in order to reduce the power of the driving motor while maintaining the working efficiency at a high accuracy.

For decreasing the inertia of the rotational shaft, it is necessary to decrease the weight of the rotational shaft and it is effective to use titanium alloys (specific gravity: about 4.0–5.0) having a smaller specific gravity compared with existent iron and steel materials (specific gravity: about 7.8) is preferred since the size of the device can be reduced and the consumption power of the driving motor can be decreased without deteriorating the desired working efficiency.

Since the bearing rings made of titanium alloys have small Young's modulus, the weight of bearing rings can be reduced in ball bearings, cylindrical roller bearings, tapered corn roll bearings, self aligned roller bearings for use in the driving system, for example, in general industrial machines or automobile transmissions and the weight of the entire apparatus can be reduced. Further, the rolling bearing according to the present invention is suitable since it is reduced in the weight and higher speed rotation is possible. Further, since the Young's modulus of the bearing ring is small as ½ for that of the steel when an identical load is applied, the rolling bearing made of the titanium alloys has an effect of decreasing the surface pressure at a portion in contact with rolling elements to decrease the stress at the portion of contact, so that it has an effect capable of increasing the rolling fatigue strength.

In addition, when the rolling bearings according to the present invention are used as the angular ball bearings and the cylindrical roller bearings used under a high speed rotation of dmn=200,000 or more such as in spindles of machine tools and turbo chargers, since the inertia at high speed rotation is decreased, they can be used suitably.

In the bearing for use in a rotating anode X-ray tube, X-rays are generated by impinging thermoelectrons to a target attached to the top end of a rotating anode that supports the bearing, in which the shaft has to be grounded to the earth by way of the bearing in order to prevent charging on the target. Further, not ceramics but heat resistant iron and steel materials such as SKH are used irrespective of conditions at vacuum, high speed and high temperature. Since the rolling bearing according to the present invention is reduced in the weight, it can be rotated at a high speed, does not suffer from lowering in the hardness even at high temperature and further has electroconductivity, it can be used suitably as a bearing for use in the rotating anode X-ray tube. In this case, electroconductive ceramics are suitable as the rolling element.

In part mounting machines used for electronic equipment production steps such as for computers and portable telephones, the speed of operations of taking out precision parts such as semiconductor devices and mounting them to substrate has been increased and, particularly, along with recent demand for reducing the size of electronic equipments themselves, the size of semiconductor devices arranged on the substrates is decreased and integration on the substrates has been progressed, so that the positioning accuracy in a case of mounting parts reaches an order of as fine as several $\mu$m. Further, since the attaching speed has also tended to be increased in order to improve the production efficiency of substrates and parts are mounted at a high speed of 0.5 to 1.0 sec or less for 1 cycle, the operation speed of a linear moving device that supports the head is also increased. Further, a wire bonder that connects semiconductor devices mounted on the substrate to circuits has a structure in which bearing portions of the linear guide rail are fixed and rails having a part mounting head secured at the top end is moved vertically. In many actual mounting machines, since a series of attaching steps such as adsorption of parts, mounting and fixing of them on substrates are conducted continuously, a machine gun system has been adopted in which plural rails are arranged on a drum and the parts are mounted continuously while rotating the drum. Vertical movement for mounting the parts, as well as rotational acceleration by the rotation of the drum in synchronization with the vertical movement are given to a linearly moving rail, and the inertia caused by the own weight of the rail and the own weight of the head exerts as a bending moment on the rail. Particularly, when the cycle time for the vertical movement of the rail is reduced to 0.1 sec or less, acceleration exerting on the rail increases to about several G—several tens G and, in addition, acceleration in the circumferential direction of the drum also increases to about several G. Since the rolling device according to the present invention can be reduced greatly in the weight compared with existent devices made of steel, it can decrease acceleration loaded on the rail and can be used suitably as a linear moving guide device for use in part mounting machines.

Further, along with reduction in the size and the weight of automobiles, improvement in the performance and increase in the power have been demanded in addition to the reduction in the size and the weight also for engine auxiliaries such as alternators, and larger vibrations and greater loads (about 4G-20G as gravitational acceleration) along with high speed rotation under more stringent working conditions than usual are exerted simultaneously by way of belts, for example, on the bearings for use in alternators upon operation of the engine and they are used under high temperature condition (about 90–130° C.).

The rolling bearing according to the present invention is preferred since it is reduced in the weight and can reduce the weight of the engine auxiliaries described above.

Further, in severe circumstances of large vibrations, great load and high temperature, tissue whitening changes are formed particularly near the maximum shearing stress position of a load area of an outer ring as a fixed ring in existent bearings made of steels and early peeling occurs starting from the change of tissue as a trigger in about ⅕ to ¹/₂₀ of the designed bearing life. Since the bearing made of titanium alloy in the rolling bearing according to the present invention has a stable tissue and causes no change in the tissue as exemplified by the tissue whitening change, the life can be extended.

Low Heat Conductivity

Since rolling bearings for use in business equipments such as copying machines, laser beam printers (LBP) and facsimiles (for example, bearings for heat rolls and bearings for pressure rolls used in the fixing portion of LBP) are used under high temperature, for example, at about 200 to 250° C., working conditions are further severe (about 100 to 150° C. at the portions other than the fixing portion). In addition, recycle use of the fixing portion is required for resource saving. Further, a characteristics of less releasing heat from the heat roll at high temperature to the outside is also required for the heat roll at high temperature for energy saving.

Since the heat conductivity of the titanium alloy is low among other metal materials, when the rolling bearing using the bearing ring made of titanium alloy as the bearing for use in the heat roll, the amount of heat transmitted from the heat roll by way of the bearing to the outside can be reduced.

Linear Expansion Coefficient

In information recording apparatus such as video tape recorders (VTR) or hard disk devices (HDD), fineness of reproduced images and higher density for the information recording amount are desired and rotational accuracy has been improved. As a bearing for satisfying the requirement of high rotational accuracy, a so-called combined bearing unit in which preload is applied between two opposed rolling bearings has been adopted. Loading of preload between the bearings can provide effects such as improvement of the rigidity for the main shaft, decrease of rotation with deflection and avoidance of resonance frequency.

When the rolling element of the rolling bearing is formed of silicon nitride, the preload is sometimes decreased to lower the rotational accuracy of the main shaft. This is attributable to that the linear expansion coefficient of the rolling element within the range of the working temperature of the bearing (1–9.0×10$^{-6}$/K) is much smaller compared with that of the bearing ring comprising bearing steel or stainless steel. That is, the amount of heat expansion of the rolling element is smaller relative to the amount of heat expansion of the bearing ring by the temperature elevation upon rotation of the bearing and, correspondingly, the amount of the gap inside of the bearings increases, to reduce the preload initially applied between the bearings and, depending on the case, this may cause complete loss of preload. The loss of preload causes lowering of the rotational performance such as reduction of the rigidity of the shaft, increase in the rotation of the shaft with reflection and change of the resonance frequency of the shaft.

Further, another problem in a case of forming the rolling element with silicon nitride is that the impact resistance of the bearing is decreased. That is, when an excess impact load is applied from the outside to the bearing, stress is localized to the rolling element and to the portion of contact between the bearing ring and the rolling element and, as a result, minute indentation may sometimes be formed to the raceway surface of the bearing ring. Occurrence of the indentation remarkably deteriorates the acoustic performance and vibrational performance of the bearing to result in lowering of the performance of VTR or HDD. This is because the Young's modulus of the rolling element is higher and the bearing ring less deforms elastically compared with the case of forming the rolling element with bearing steel or stainless steel, which remarkably localizes the stress that causes indentations to the raceway surface tending to cause indentations.

In this case, when the bearing ring is formed of the titanium alloy, since the linear expansion coefficient of the bearing ring is 8.0 to 9.0×10$^{-5}$/K, loss of preload is less caused. Further, it is suitable to form the rolling element with the zirconia series ceramics since the difference of the linear heat expansion coefficient between the bearing ring and the rolling element can be decreased.

Further, with regard to the impact resistance, since the Young's modulus of the rolling element is lower compared with a case of forming the rolling element of the bearing steel or stainless steel and the occurrence of indentations due to localized stress can be suppressed even in a case of undergoing excess impact load, the acoustic performance or the vibrational performance of the bearing is not reduced.

What is claimed is:

1. A rolling device comprising an outer member and an inner member each having a raceway surface and rolling elements having a rolling surface interposed between the raceway surfaces of the outer member and the inner member and rolling on the raceway surfaces by rotational or linear movement of the outer member or the inner member in which the outer member and/or the inner member comprises titanium alloy that has at least one of beta ($\beta$) phase, near beta ($\beta$) phase and mixed phases of alpha ($\alpha$) and beta ($\beta$), at the room temperature respectively, wherein the outer member and/or the inner member has a raceway surface hardness from Hv 400 or more to Hv 592 or less, the outer member and/or the inner member has a core hardness of Hv420 or more and has an oxygen compound layer at the raceway surface, and the oxygen compound layer comprises titanium oxide containing rutile type $TiO_2$ and has a thickness from 20 nm or more to 95 nm or less.

2. A rolling device as defined in claim 1, wherein the core hardness of the outer member and/or the inner member is Hv 450 or more and the thickness of the oxygen compound layer comprises titanium oxide containing rutile type $TiO_2$ is from 50 nm or more to 95 nm or less.

3. A rolling device as defined in claim 1, wherein the rolling elements comprise at least one of titanium alloys, silicon nitride, silicon carbide, zirconia series ceramics, alumina series ceramics and SIALON series ceramics.

4. A rolling device as defined in claim 1, wherein the outer member and/or the inner member has a hard film on the raceway surface.

5. A rolling device as defined in claim 4, wherein the raceway surface formed with the hard film has a surface hardness of Hv of 350 or more.

6. A rolling device as defined in claim 4, wherein the raceway surface formed with the hard film has a surface hardness of Hv of 450 or more.

7. A rolling device as defined in claim 4, wherein the hard film comprises at least one of TiN, TiC, TiCN, TiAlN, CrN, SiC and diamond-like carbon.

8. A rolling device as defined in claim 1, wherein all of the rolling elements comprise a superhard alloy or cermet.

9. A rolling device comprising an outer member and an inner member each having a raceway surface, rolling elements having rolling surfaces interposed between the raceway surfaces of the outer member and the inner member and rolling on the raceway surfaces by rotational or linear movement of the outer member or the inner member and a cage for holding the rolling elements in which the outer member and/or the inner member comprises titanium alloy that has at least one of beta ($\beta$) phase, near beta ($\beta$) phase and mixed phases of alpha ($\alpha$) and beta ($\beta$) at the room temperature respectively, and the outer member and/or the inner member has a raceway surface hardness from Hv 400 or more to Hv 592 or less and the cage has a heat conductivity of 20 W/(m·K) or more.

10. A rolling device as defined in claim 9, wherein the cage comprises one of copper, tellurium copper, brass, aluminum bronze, phosphorus bronze, nickel silver, cupro nickel and beryllium copper.

11. A rolling device comprising an outer member and an inner member each having a raceway surface and rolling elements having rolling surfaces interposed between the raceway surfaces of the outer member and the inner member and rolling on the raceway surfaces by rotational or linear movement of the outer member or the inner member in which
  at least one of the outer member, the inner member and the rolling elements comprises titanium alloy that has at least one of beta (β) phase, near beta (β) phase and mixed phases of alpha (α) and beta (β) at the room temperature respectively and one of the raceway surfaces of the outer member and the inner member and the rolling surfaces of the rolling elements has omega (ω) phase with the size of the crystal particles of 1 μm or less.

12. A rolling device as defined in claim 11 wherein the size of the crystal particles is 800 nm or less.

13. A rolling device as defined in claim 11, wherein the size of the crystal particles is 10 nm or less.

14. A rolling device comprising an outer member and an inner member each having a raceway surface and rolling elements having a rolling surface interposed between the raceway surfaces of the outer member and the inner member and rolling on the raceway surfaces by rotational or linear movement of the outer member or the inner member in which the outer member and/or the inner member comprises titanium alloy that has at least one of beta (β) phase, near beta (β) phase and mixed phases of alpha (α) and beta (β), at the room temperature respectively,
  wherein the outer member and/or the inner member has a raceway surface hardness from Hv400 or more to Hv592 or less,
  the outer member and/or the inner member has a hard film on the raceway surface and has a lubricating film of 0.1 μm to 10 μm on the hard film.

15. A rolling device as defined in claim 14, wherein the outer member and/or inner member has a lubricating film of 0.1 μm to 5 μm on the hard film.

16. A rolling device as defined in comprising an outer member and an inner member each having a raceway surface and rolling elements having a rolling surface interposed between the raceway surfaces of the outer member and the inner member and rolling on the raceway surfaces by rotational or linear movement of the outer member or the inner member in which the outer member and/or the inner member comprises titanium alloy that has at least one of beta (β) phase, near beta (β) phase and mixed phases of alpha (α) and beta (β), at the room temperature respectively,
  wherein the outer member and/or the inner member has a raceway surface hardness from Hv400 or more to Hv592 or less,
  the all of the rolling elements comprise a superhard alloy or cermet and have a heat conductivity of 35 W/(m·K) or more.

17. A rolling device as defined in claim 16, wherein all of the rolling elements have a heat conductivity of 50 W/(m·K) or more.

18. A rolling device comprising an outer member and an inner member each having a raceway surface and rolling elements having a rolling surface interposed between the raceway surfaces of the outer member and the inner member and rolling on the raceway surfaces by rotational or linear movement of the outer member or the inner member in which the outer member and/or the inner member comprises titanium alloy that has at least one of beta (β) phase, near beta (β) phase and mixed phases of alpha (α) and beta (β), at the room temperature respectively,
  wherein the outer member and/or the inner member has a raceway surface hardness from Hv400 or more to Hv592 or less,
  all of the rolling elements have a surface hardening layer comprising an iron and steel material and has a corrosion resistance on the surface.

19. A rolling device as defined in claim 18, wherein the surface hardening layer is formed by applying a chromium diffusion penetration treatment on the surface of a base material comprising all of the rolling elements.

20. A rolling device as defined in claim 18, wherein the surface hardening layer contains a nitride layer formed by applying a nitridation treatment to the surface of a base material comprising all of the rolling elements.

21. A rolling device comprising an outer member and an inner member each having a raceway surface and rolling elements having a rolling surface interposed between the raceway surfaces of the outer member and the inner member and rolling on the raceway surfaces by rotational or linear movement of the outer member or the inner member in which the outer member and/or the inner member comprises titanium alloy that has at least one of beta (β) phase, near beta (β) phase and mixed phases of alpha (α) and beta (β), at the room temperature respectively,
  wherein the titanium alloy satisfies the condition: $3.7 \leq$ (H/E) where E (Gpa) represents the Young's modulus and H (Hv) represents the minimum hardness from the raceway surface to a depth of $2/100$ to $5/100$ of the diameter of the rolling element,
  the outer member and/or the inner member has a raceway surface hardness from Hv400 or more to Hv592 or less.

22. A rolling device comprising an outer member and an inner member each having a raceway surface and rolling elements having a rolling surface interposed between the raceway surfaces of the outer member and the inner member and rolling on the raceway surfaces by rotational or linear movement of the outer member or the inner member in which the outer member and/or the inner member comprises titanium alloy that has at least one of beta (β) phase, near beta (β) phase and mixed phases of alpha (α) and beta (β), at the room temperature respectively,
  wherein the titanium alloy satisfies the condition: $4.0 \leq$ (H/E) where E (Gpa) represents the Young's modulus and H (Hv) represents the minimum hardness from the raceway surface to a depth of $2/100$ to $5/100$ of the diameter of the rolling element,
  the outer member and/or the inner member has a raceway surface hardness from Hv400 or more to Hv592 or less.

23. A rolling device as defined in claim 21 or 22 wherein (H/E) is 4.5 or less.

24. A rolling device comprising an outer member and an inner member each having a raceway surface and rolling elements having a rolling surface interposed between the raceway surfaces of the outer member and the inner member and rolling on the raceway surfaces by rotational or linear movement of the outer member or the inner member in which the outer member and/or the inner member comprises titanium alloy that has at least one of beta (β) phase, near beta (β) phase and mixed phases of alpha (α) and beta (β), at the room temperature respectively,
  wherein the outer member and/or the inner member has a raceway surface hardness from Hv400 or more to Hv592 or less,
  the ratio $\alpha_2/\alpha_1$ between the heat expansion coefficient $\alpha_1$ of the outer member and/or the inner member and the heat expansion coefficient $\alpha_2$ of the rolling element is within a range of 0.4 to 1.3.

25. A rolling device comprising an outer member and an inner member each having a raceway surface and rolling elements having a rolling surface interposed between the raceway surfaces of the outer member and the inner member and rolling on the raceway surfaces by rotational or linear movement of the outer member or the inner member in which the outer member and/or the inner member comprises titanium alloy that has at least one of beta (β) phase, near beta (β) phase and mixed phases of alpha (α) and beta (β), at the room temperature respectively, wherein the rolling device further comprises a shield plate for shielding an opening formed between the outer member and the inner member and the shield plate is formed of titanium at a purity of 99.5% or higher, the outer member and/or the inner member has a raceway surface hardness from Hv400 or more to Hv592 or less.

26. A rolling device as defined in claim 24, wherein each of the outer member and the inner member has an oxide film containing $TiO_x$ (x=0–2) on its surface.

27. A rolling device as defined in any one of claims 11, 4, 15, 23 and 24 wherein all of the rolling elements comprise at least one of titanium alloys, silicon nitride, silicon carbide, zirconia series ceramics, alumina series ceramics and SIALON series ceramics.

28. A rolling device as defined in any one claims 4, 15, 17, 20, 23 and 24 wherein the rolling device further comprises a cage for holding the rolling elements and the cage comprises one of copper, tellurium copper, brass, aluminum bronze, phosphorus bronze, nickel silver, cupro nickel and beryllium copper.

* * * * *